United States Patent
Mule' et al.

(10) Patent No.: US 6,954,576 B2
(45) Date of Patent: *Oct. 11, 2005

(54) GUIDED-WAVE OPTICAL INTERCONNECTIONS EMBEDDED WITHIN A MICROELECTRONIC WAFER-LEVEL BATCH PACKAGE

(75) Inventors: Tony Mule', Atlanta, GA (US); Chirag Patel, College Park, GA (US); James D. Meindl, Marietta, GA (US); Thomas K. Gaylord, Atlanta, GA (US); Elias N. Glytsis, Dunwoody, GA (US); Kevin P. Martin, Atlanta, GA (US); Stephen M. Schultz, Tucson, AZ (US); Muhannad Bakir, Atlanta, GA (US); Hollie Reed, Smyrna, GA (US); Paul Kohl, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/895,685

(22) Filed: Jul. 21, 2004

(65) Prior Publication Data

US 2004/0264840 A1 Dec. 30, 2004

Related U.S. Application Data

(63) Continuation of application No. 10/074,420, filed on Feb. 11, 2002, now Pat. No. 6,785,458.
(60) Provisional application No. 60/268,142, filed on Feb. 11, 2001.

(51) Int. Cl.[7] .................................................. G02B 6/10
(52) U.S. Cl. ........................................ 385/131; 438/31
(58) Field of Search ............................... 385/14, 15, 37, 385/39, 125, 129–132; 438/31

(56) References Cited

U.S. PATENT DOCUMENTS

| | | | |
|---|---|---|---|
| 4,959,540 A | 9/1990 | Fan et al. | 250/227.12 |
| 5,250,816 A | 10/1993 | Kitamura | 257/81 |
| 5,278,925 A | * 1/1994 | Boysel et al. | 385/14 |
| 5,293,626 A | 3/1994 | Priest et al. | 713/401 |
| 5,416,861 A | 5/1995 | Koh et al. | 385/14 |
| 5,430,567 A | 7/1995 | Shaw et al. | 359/107 |
| 5,434,524 A | 7/1995 | Shaw et al. | 327/187 |
| 5,508,835 A | 4/1996 | Takahashi et al. | 359/140 |
| 5,515,194 A | 5/1996 | Kanterakis et al. | 359/127 |
| 5,677,778 A | 10/1997 | Kanterakis et al. | 359/127 |
| 5,708,671 A | 1/1998 | Siao et al. | 372/20 |
| 5,737,458 A | * 4/1998 | Wojnarowski et al. | 385/15 |
| 5,812,708 A | 9/1998 | Rao | 385/14 |
| 5,889,903 A | 3/1999 | Rao | 385/14 |
| 6,008,918 A | 12/1999 | Kanterakis et al. | 359/117 |

(Continued)

*Primary Examiner*—Edward J. Glick
*Assistant Examiner*—Thomas Artman
(74) *Attorney, Agent, or Firm*—Thomas, Kayden, Horstemeyer & Risley, LLP

(57) ABSTRACT

Wafer-level electronic packages having waveguides and methods of fabricating chip-level electronic packages having waveguides are disclosed. A representative chip-level electronic package includes at least one waveguide having a waveguide core. In addition, another representative chip-level electronic package includes a waveguide having an air-gap cladding layer around a portion of the waveguide core. A representative method for fabricating a chip-level electronic package includes: providing a substrate having a passivation layer disposed on the substrate; disposing a waveguide core on a portion of the passivation layer; disposing a first sacrificial layer onto at least one portion of the passivation layer and the waveguide core; disposing an overcoat layer onto the passivation layer and the first sacrificial layer; and removing the first sacrificial layer to define an air-gap cladding layer within the overcoat polymer layer and around a portion of the waveguide core.

10 Claims, 40 Drawing Sheets

U.S. PATENT DOCUMENTS

| | | |
|---|---|---|
| 6,125,217 A | 9/2000 | Paniccia et al. ............... 385/14 |
| 6,165,890 A * | 12/2000 | Kohl et al. ................. 438/619 |
| 6,285,813 B1 | 9/2001 | Schultz et al. ................ 385/37 |
| 6,621,972 B2 * | 9/2003 | Kimerling et al. .......... 385/132 |
| 6,785,458 B2 * | 8/2004 | Mule' et al. ................ 385/131 |
| 6,807,352 B2 * | 10/2004 | Mule' et al. ................ 385/131 |

* cited by examiner

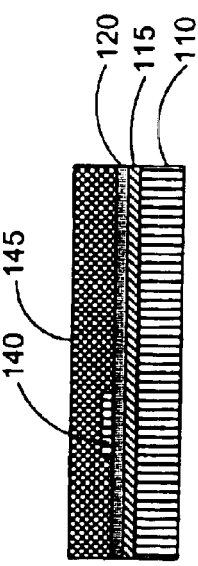
FIG. 2E
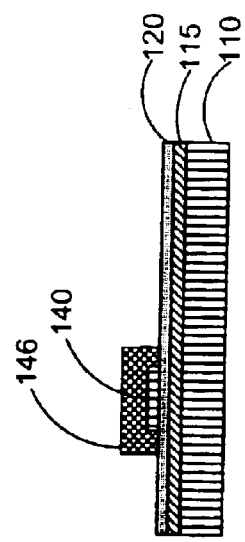
FIG. 2F
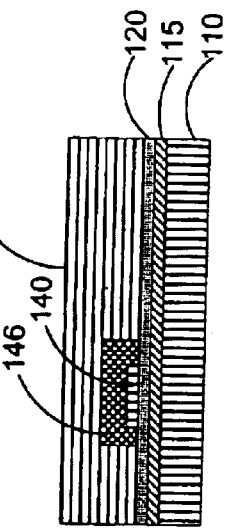
FIG. 2G
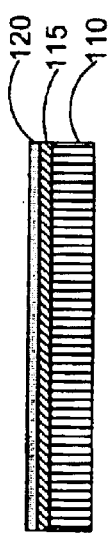
FIG. 2A
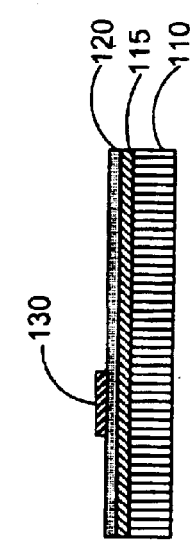
FIG. 2B
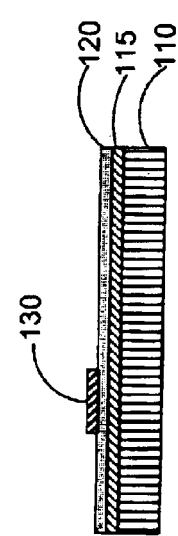
FIG. 2C
FIG. 2D

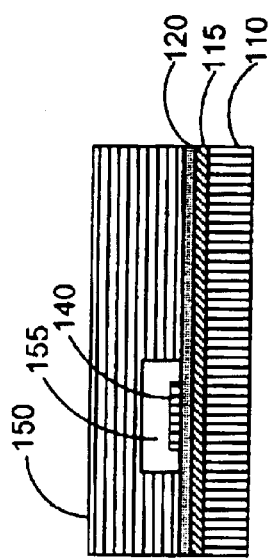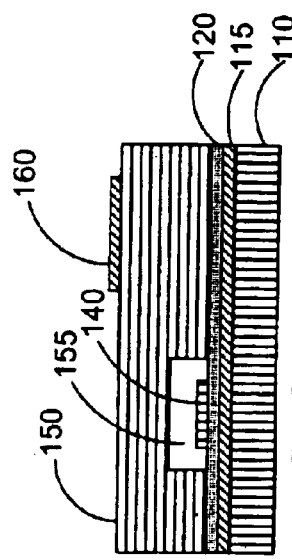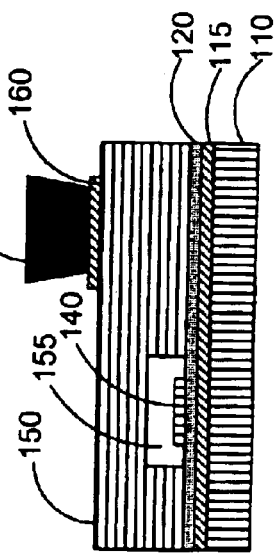

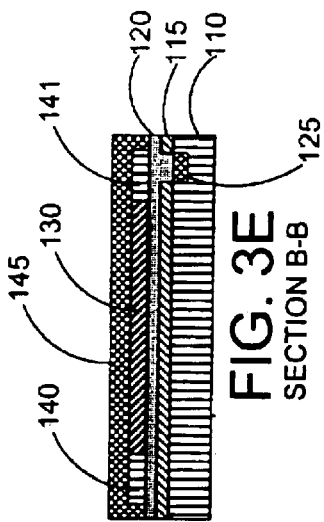
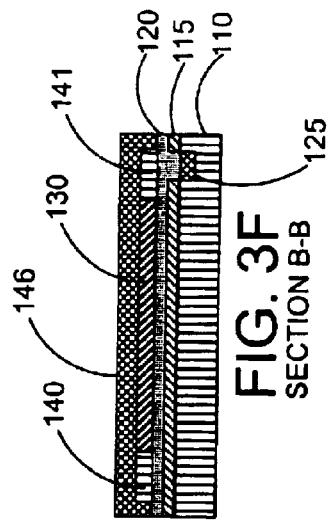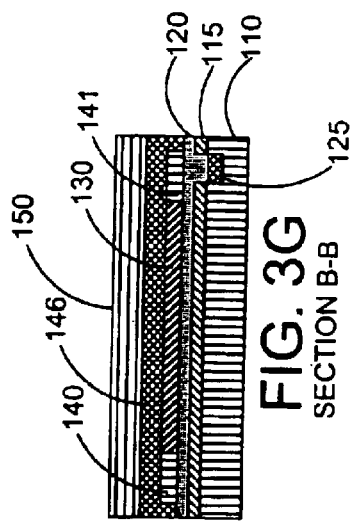
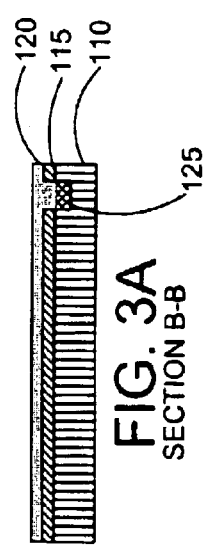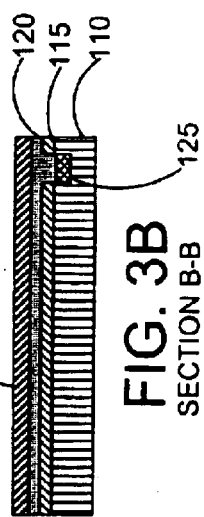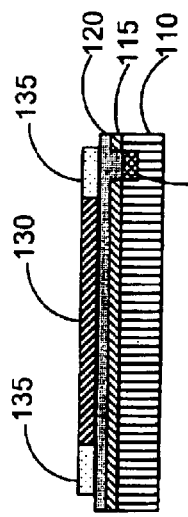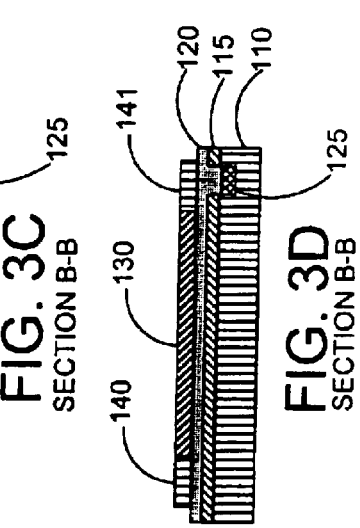

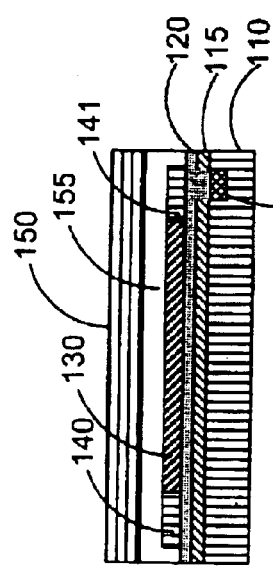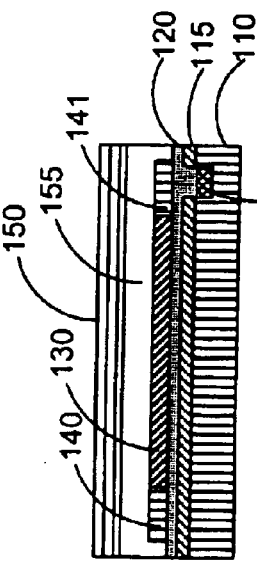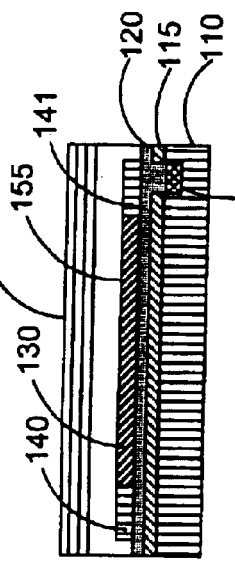

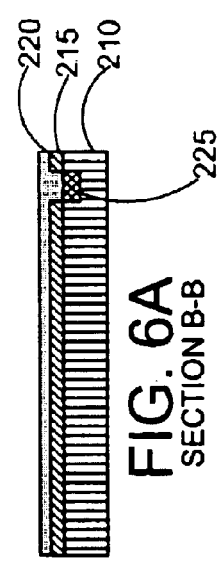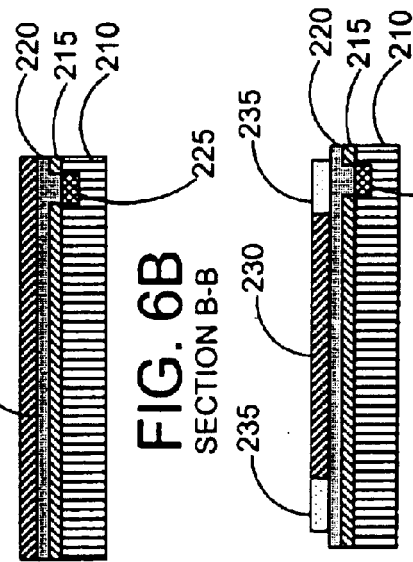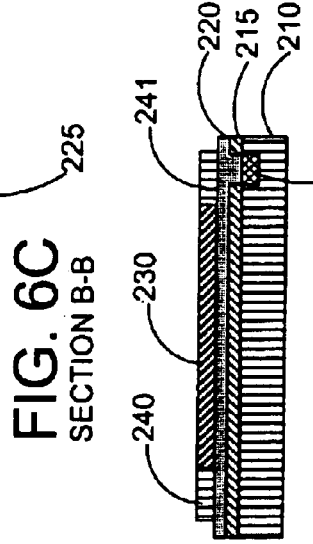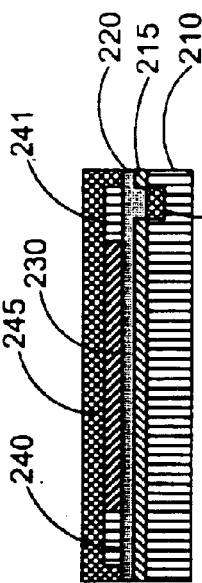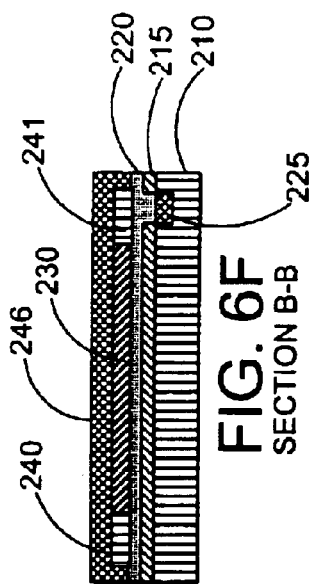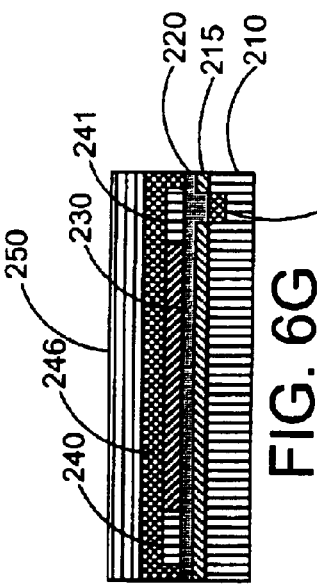

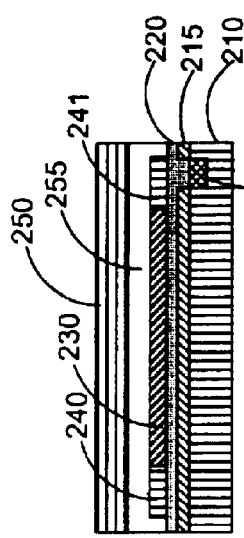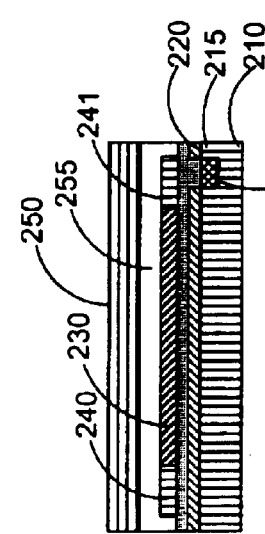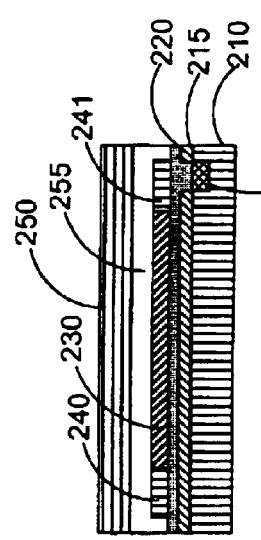

FIG. 9A
SECTION B-B
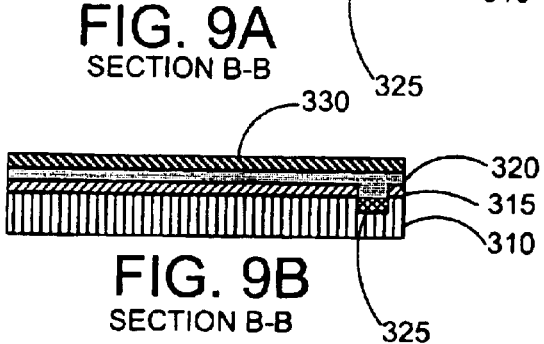
FIG. 9B
SECTION B-B
FIG. 9C
SECTION B-B
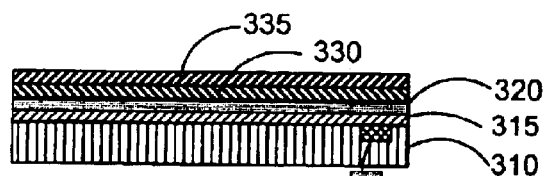
FIG.9D
SECTION B-B
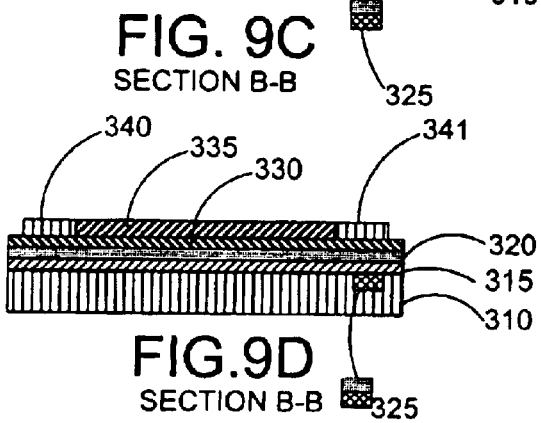
FIG. 9E
SECTION B-B
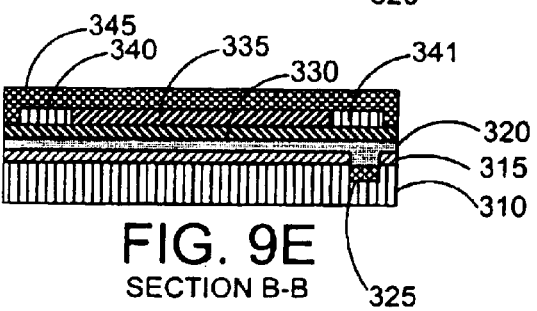
FIG. 9F
SECTION B-B
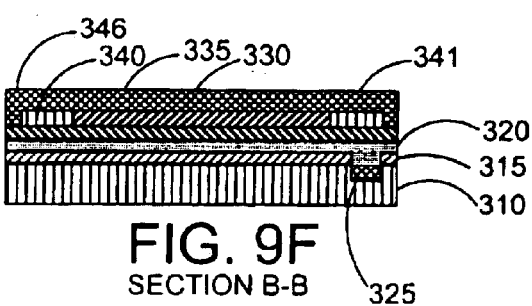

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

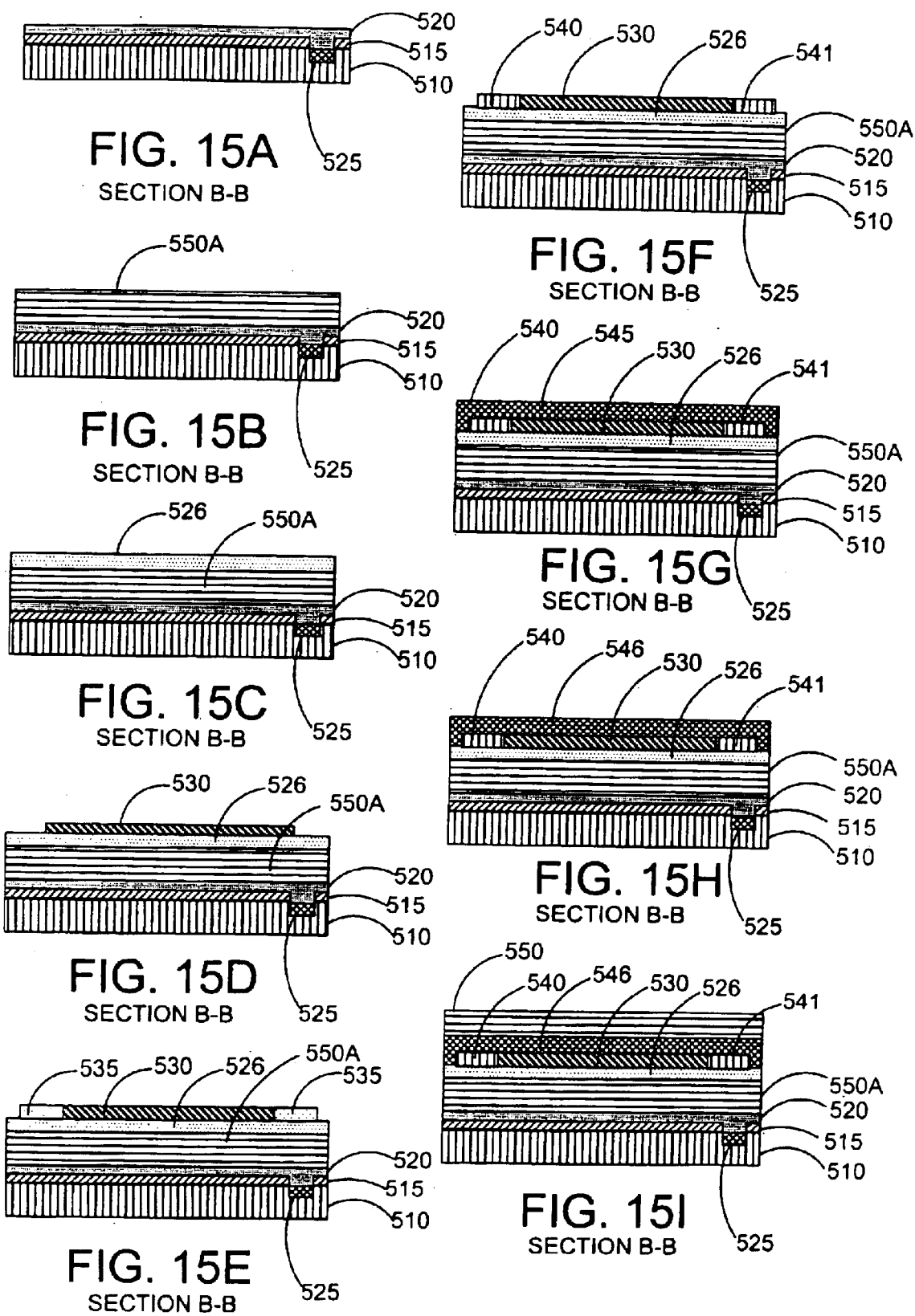

SECTION B-B

SECTION B-B

SECTION B-B

FIG. 18A SECTION B-B
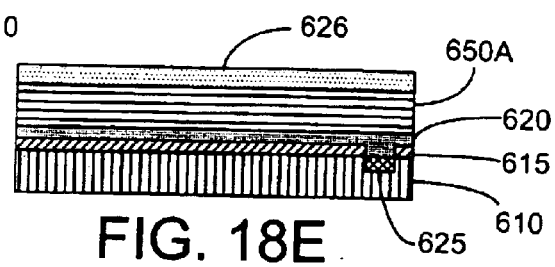
FIG. 18E SECTION B-B
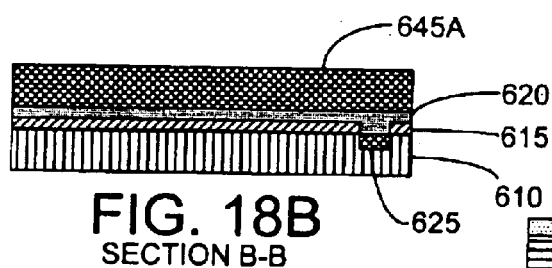
FIG. 18B SECTION B-B
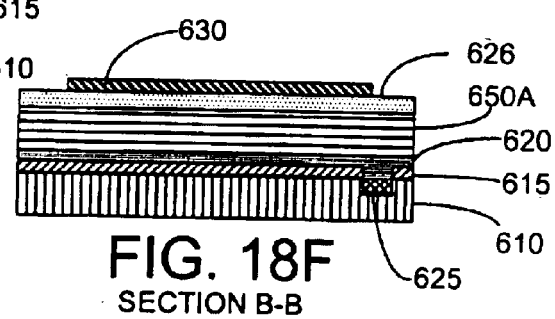
FIG. 18F SECTION B-B
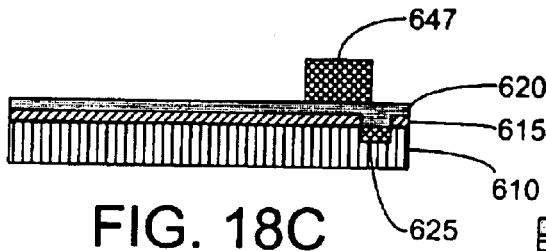
FIG. 18C SECTION B-B
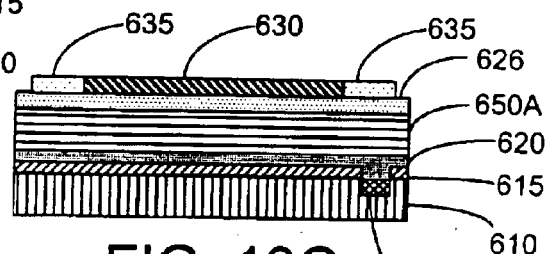
FIG. 18G SECTION B-B
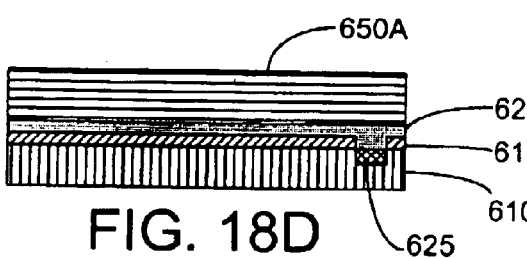
FIG. 18D SECTION B-B
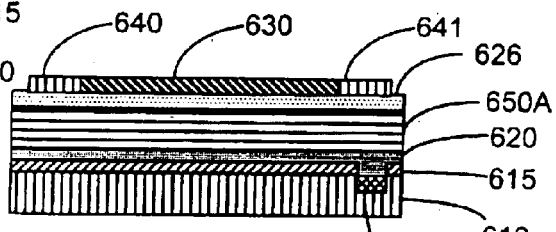
FIG. 18H SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

SECTION B-B

GUIDED-WAVE OPTICAL INTERCONNECTIONS EMBEDDED WITHIN A MICROELECTRONIC WAFER-LEVEL BATCH PACKAGE

CROSS-REFERENCE TO RELATED APPLICATION

This application claims priority to U.S. provisional application entitled, "Guided-wave Optical Interconnection Using Volume Grating Coupler and Air Gap Technologies Embedded Within A Microelectronic Package," having Ser. No. 60/268,142, filed Feb. 11, 2001, which is entirely incorporated herein by reference.

This application is related to co-pending U.S. utility patent application entitled "Waveguides," filed on Feb. 11, 2002, which is entirely incorporated herein by reference.

This application is a continuation application, which is based on and claims priority to U.S. Utility patent application Ser. No. 10/074,420, filed on Feb. 11, 2002 now U.S. Pat. No. 6,785,458, and which is incorporated herein in its entirety.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of MDA972-99-1-0002 awarded by the DARPA of the U.S. Government.

TECHNICAL FIELD

The present invention is generally related to guided-wave interconnections and, more particularly, is related to guided-wave interconnections within a microelectronic package.

BACKGROUND OF THE INVENTION

High performance microprocessors with heat sink capabilities will likely be required to dissipate hundreds of watts from sub-volt power supplies in near and long-term microelectronic technology generations. A need exists for low cost and high pin count microelectronic package technology that can satisfy power supply and heat removal requirements within such chips.

The mechanical performance of a microelectronic package is important for wafer-level testing, protection, and reliability. Wafer-level testing requires simultaneous reliable contact to all die across a non-planar wafer surface. In-plane (i.e., x-y axis) compliance is generally required to account for thermal expansion between the chip and printed wiring board (or other attachment substrate). Wafer-level testing and burn-in demands significant out-of-plane (i.e., z-axis) compliance in order to establish reliable electrical contact between wafer-level pads and test-card or printed wiring board probes due to the non-planarity of each surface.

Unlike conventional packaging, wafer-level packaging (WLP) is a continuation of integrated circuit manufacturing. In WLP, additional masking steps can be used after fabricating die pads to simultaneously package all die across a wafer. A unique class of WLP is called "compliant wafer-level packaging" (CWLP). In CWLP, additional masking steps can be used after fabricating die pads to batch fabricate compliant x-y-z axis I/O leads between the die pads and the board pads. The use of compliant leads allows for the elimination of underfill between chip and substrate, and hence improves manufacturability and cost. A mechanically x-y-z flexible lead is formed between the die pad and the bump interconnection that would be joined with the board. Accordingly, there is a need in the industry for x-y-z compliant leads that provide high density, high electrical performance, low cost, and ability of batch fabrication.

Thus, a heretofore unaddressed need exists in the microelectronics industry to address the aforementioned deficiencies and/or inadequacies.

SUMMARY OF THE INVENTION

Briefly described, the present invention provides for chip-level electronic packages. A representative chip-level electronic package includes at least one waveguide having a waveguide core. In addition, another representative wafer-level electronic package includes a waveguide having an air-gap cladding layer around a portion of the waveguide core.

The present invention also involves a method of fabricating chip-level electronic packages. A representative method includes the following steps: providing a substrate having a passivation layer disposed on the substrate; disposing a waveguide core on a portion of the passivation layer; disposing a first sacrificial layer onto at least one portion of the passivation layer and the waveguide core; disposing an overcoat layer onto the passivation layer and the first sacrificial layer; and removing the first sacrificial layer to define an air-gap cladding layer within the overcoat polymer layer and around a portion of the waveguide core.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 1B and 1C are cross-sectional views of FIG. 1A in the A—A and B—B direction, respectively, as shown by the arrows in FIG. 1A.

FIGS. 2A–2J are cross-sectional views of the fabrication process relative to the view illustrated in FIG. 1A, while FIGS. 3A–3J are cross-sectional views of the fabrication process relative to the view in FIG. 1C, section B—B of FIG. 1A.

FIGS. 4B and 4C are cross-sectional views of FIG. 4A in the A—A and B—B direction, respectively, as shown by the arrows in FIG. 4A.

FIGS. 5A–5J are cross-sectional views of the fabrication process relative to the view illustrated in FIG. 4A, while FIGS. 6A–6J are cross-sectional views of the fabrication process relative to the view in FIG. 4C, section B—B of FIG. 4A.

FIGS. 7B and 7C are cross-sectional views of FIG. 7A in the A—A and B—B direction, respectively, as shown by the arrows in FIG. 7A.

FIGS. 8A–8J are cross-sectional views of the fabrication process relative to the view illustrated in FIG. 7A, while FIGS. 9A–9J are cross-sectional views of the fabrication process relative to the view in FIG. 7C, section B—B of FIG. 7A.

FIGS. 10B and 10C are cross-sectional views of FIG. 10A in the A—A and B—B direction, respectively, as shown by the arrows in FIG. 10A.

FIGS. 11A–11J are cross-sectional views of the fabrication process relative to the view illustrated in FIG. 10A, while

FIGS. 13B and 13C are cross-sectional views of FIG. 13A in the A—A and B—B direction, respectively, as shown by the arrows in FIG. 13A.

FIGS. 14A–14L are cross-sectional views of the fabrication process relative to the view illustrated in FIG. 13A, while FIGS. 15A–15L are cross-sectional views of the fabrication process relative to the view in FIG. 13C, section B—B of FIG. 13A.

FIGS. 16B and 16C are cross-sectional views of FIG. 16A in the A—A and B—B direction, respectively, as shown by the arrows in FIG. 16A.

FIGS. 17A–17N are cross-sectional views of the fabrication process relative to the view illustrated in FIG. 16A, while

FIGS. 19B and 19C are cross-sectional views of FIG. 19A in the A—A and B—B direction, respectively, as shown by the arrows in FIG. 19A.

FIGS. 20A–20L are cross-sectional views of the fabrication process relative to the view illustrated in FIG. 19A, while

FIGS. 22B and 22C are cross-sectional views of FIG. 22A in the A—A and B—B direction, respectively, as shown by the arrows in FIG. 22A.

FIGS. 23A–23N are cross-sectional views of the fabrication process relative to the view illustrated in FIG. 22A, while

DETAILED DESCRIPTION

Figure 1A:
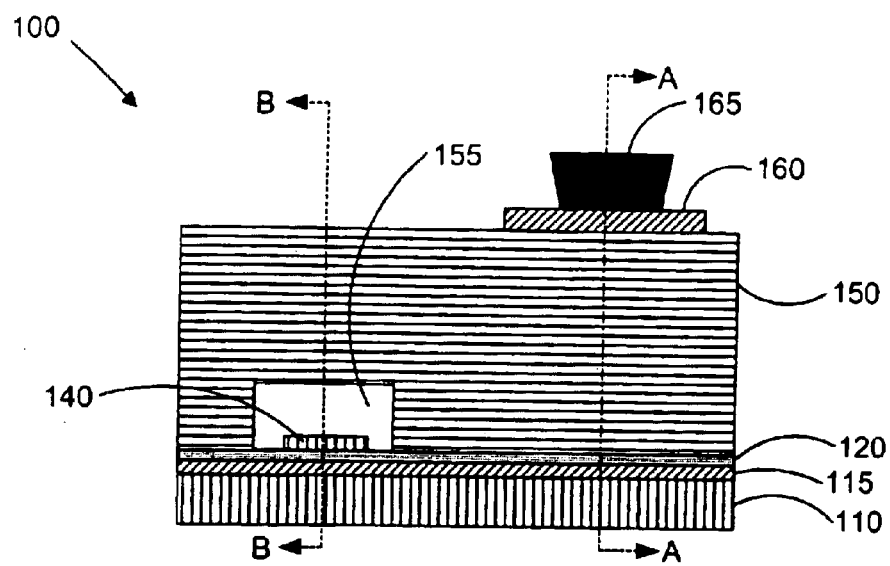
FIGS. 1A–1C are schematics that illustrate three cross-sectional views of microelectronic package 100.

In general, microelectronic packages (e.g., wafer-level or chip-level packages) of the present invention include embedded waveguides (e.g., optical dielectric or photonic crystal waveguides). Microelectronic packages with embedded waveguides allow for time-of-flight (ToF) propagation delay along global data interconnects and gate-delay limited frequencies of modulation along global clock interconnects. Microelectronic packages having waveguide interconnects allow for compact packaging of a hybrid electrical/optical system in a manner conducive to power supply and heat removal requirements of future technology generations.

In addition, the microelectronic packages of the present invention can include waveguides having either a dielectric or air-gap cladding engaging (e.g., surrounding the waveguide core of the waveguide) a portion of the waveguide core. The presence of an air-gap cladding allows for a maximization in refractive index contrast between waveguide core and cladding regions, which in turn permits tighter bends and increased waveguide density through enhanced confinement of optical power within the waveguide core region.

Further, the microelectronic packages of the present invention can include a waveguide having a coupling element disposed within and/or adjacent to the waveguide core in order to couple optical power both into and out of waveguide regions. The coupling element can be in the form of a grating coupler, total internal reflection mirror, or be represented simply by bringing the waveguide region to within close proximity of the detector region without the express definition of a specific coupling structure (i.e., evanescent coupling).

Also, hybrid-attached optoelectronic devices such as emitters or detectors could be situated within or adjacent to the package such that butt-coupling of optical power into and out of the waveguide core region(s) is allowed, thus negating the specific need for a coupling structure to be incorporated.

Furthermore, the microelectronic package can include embedded air-gap regions to a) enhance z-compliance of compliant leads when disposed substantially under a portion of each lead, b) permit the integration of micro-fluidic channels for thermal cooling, and c) provide electrical isolation between neighboring electrical interconnections.

Microelectronic packages can find application within high-performance or cost-performance microprocessors, Application Specific Integrated Circuits (ASICs), System-on-a-Chip (SoC) architectures that incorporate multiple technologies (such as RF, optical and MEMs structures), optoelectronic chips for telecommunications, or any other microelectronic device that requires or can benefit from a low-cost wafer-level batch package incorporating optical interconnect technology.

Now having described microelectronic packages in general, examples 1–8 will describe some embodiments of the microelectronic package. While embodiments of the microelectronic package are described in connection with examples 1–8 and the corresponding text and figures, there is no intent to limit embodiments of the microelectronic package to these descriptions. On the contrary, the intent is to cover all alternatives, modifications, and equivalents included within the spirit and scope of embodiments of the present invention.

EXAMPLE 1

Figure 1B:
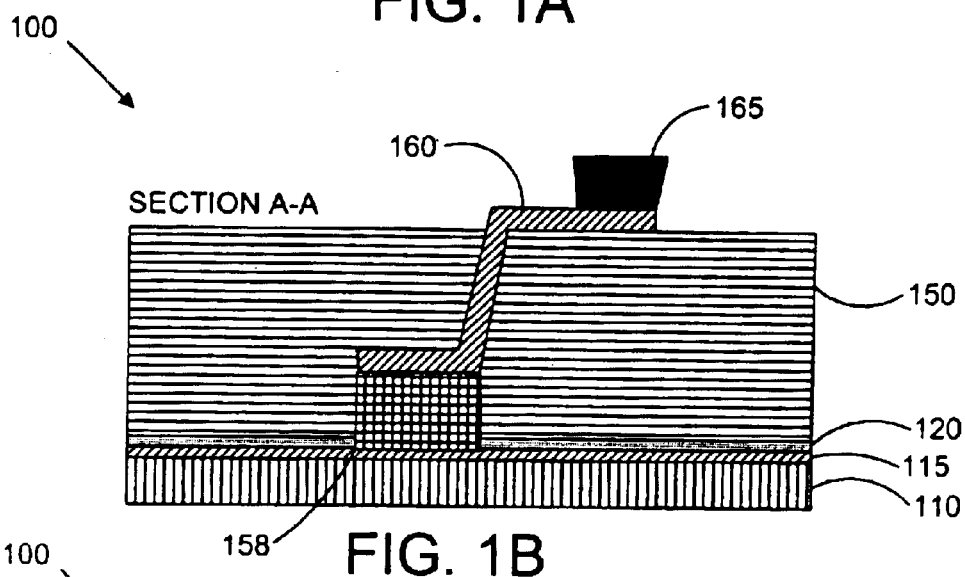
Figure 1C:
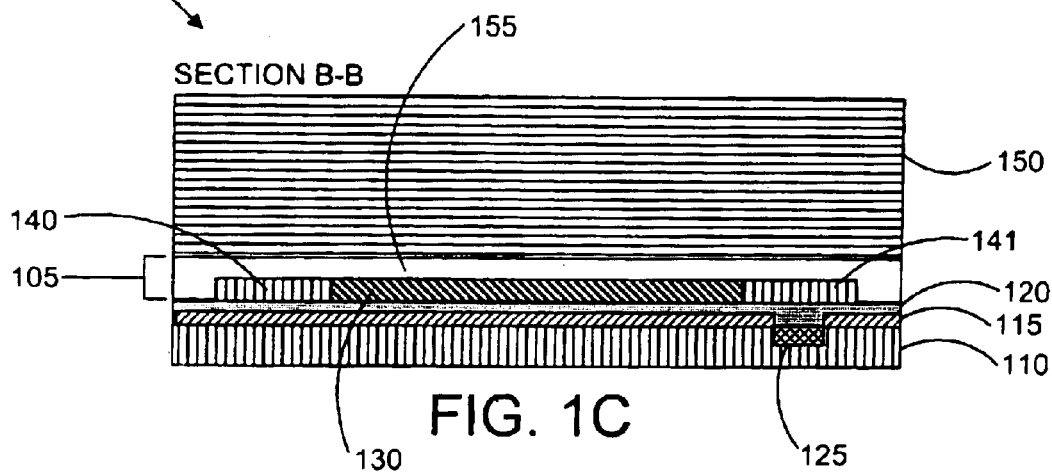

FIGS. 1A–1C are schematics that illustrate three cross-sectional views of microelectronic package 100 having a waveguide 105. FIGS. 1B and 1C are cross-sectional views of FIG. 1A in the A—A and B—B direction, respectively, as shown by the arrows in FIG. 1A.

Microelectronic package 100 includes a waveguide 105, a substrate 110, a multi-level interconnect layer 115, a passivation layer 120, a detector 125, a overcoat layer 150, a die pad 158, a lead 160, and a contact 165. The multi-level interconnect layer 115 is disposed on the substrate 110, while the passivation layer 120 is disposed on the multi-level interconnect layer 115. In this embodiment the waveguide 105 is disposed on the passivation layer 120, where the passivation layer 120 acts as the lower cladding of the waveguide 105. In addition, the die pad 158 is disposed on the multi interconnect layer 115. The overcoat layer 150 is disposed over the waveguide 105 and the passivation layer 120. The lead 160 is disposed on the die pad 158 and a portion of the overcoat layer 150. Additional details regarding the spatial relationship of the components of microelectronic package 100 depicted in FIGS. 1A–1C are discussed in FIGS. 2A–2J and 3A–3J, which illustrate an exemplary fabrication process of microelectronic package 100.

The substrate 110 can be any of a variety of substrates that can be used to support microelectronic package 100. The substrate 110 can include materials such as, for example, silicon, silicon compounds, germanium, germanium compounds, gallium, gallium compounds, indium, indium compounds, or other semiconductor materials/compounds. In addition, the substrate 110 can include non-semiconductor substrate materials such as ceramics and organic boards.

The multi-level interconnect layer 115 can be any of a variety of materials and these include copper, low-k dielectric materials, aluminum, and/or polysilicon, for example. The multi-level interconnect layer 115 functions to connect individual or groups of transistors located within different sections of the die.

The passivation layer 120 can be any of a variety of materials that, when serving as the lower cladding region, have a lower index of refraction than the waveguide core 130. The passivation layer 120 includes materials such as silicon dioxide and silicon nitride. The passivation layer serves to protect the underlying metallization and CMOS circuitry from corrosion or corruption by external elements.

The die pads 158 can be deposited upon the surface of the substrate 110, the multi-level interconnect layer 115, or the passivation layer 120 using techniques such as, for example, sputtering, evaporation, electron-beam systems, electroplating, electro-less plating, and displacement reactions.

The lead 160 can be fabricated of any single layer or layers of different metals, metal composites, dielectrics, superconductors, organic conductors, or light emitting organic materials, for example, appropriate for microelectronic package 100. The metals and metal composites include gold, gold alloys, copper, and copper alloys. The lead 160 can be fabricated by monolithically electroplating the selected metal or metal composite onto the compliant wafer device.

The lead 160 can range from about 1 to about 100 micrometers in thickness and preferably from about 4 to about 40 micrometers. The preferred embodiment has a thickness of about 15 micrometers. The lead 160 length can range from about 2 and about 400 micrometers, preferably from about 40 to about 120 micrometers. The lead 20 width can range from about 1 to about 100 micrometers, preferably from about 2 to about 40 micrometers. The preferred embodiment has a width in the range of about 15 to about 25 micrometers.

The lead 160 can be compliant in-plane and out-of-plane. The shape of the lead along with the overcoat layer 150 provides compliance in-plane. The lead 160 is compliant in-plane in the range of about 1 to about 100 micrometers, preferably from about 1 to about 50 micrometers.

Optionally, the contact 165 can be disposed on the lead 160, which can include a variety of contacts designed to make contact or attach to a pad or point on another device such as a microelectronic device, for example. The contact 165 can be, for example, a solder bump (as shown in FIG. 1A-1C), a conductive adhesive or filled polymer, or a contact probe. The contact 165 can be formed with methods such as electroplating, electroless plating, screen or stencil printing.

The waveguide 105 can be defined through multiple fabrication processes such as, but not limited to, photo-definition, wet chemical etching, thermally-induced refractive index gradients, and ion implantation. In addition, the waveguide 105 can have geometries such as, for example, raised strip geometry, buried geometry, and rib geometry.

The waveguide 105 can include a waveguide core 130 having coupling elements 140 and 141 disposed at each end of the waveguide core 130. Typically, one of the coupling elements 141 is disposed above the detector 125. In this manner, optical energy (e.g. light) can enter one coupling element 140, travel down the waveguide core 130, and exit another coupling element 141 to be detected by the detector 125. The detector 125 can include any device capable of providing optical-to-electrical conversion of optical energy incident from the waveguide 105 onto the detector region. In addition, the detector can be monolithically incorporated within the semiconductor die, or hybridly incorporated within or adjacent to the package itself.

The waveguide core 130 functions as a medium for optical energy to travel through. Therefore, waveguide 105 can communicate optical energy through the microelectronic package 100. The waveguide core 130 can be fabricated from materials such as, for example, polynorbornenes, polyimides, epoxies, or other polymer materials, low-k dielectric materials such as silicon dioxide, silicon nitride, or porous low-k dielectrics, or semiconductor or other crystalline materials. In general, any material that exhibits a) transparency to a particular optical wavelength of light, b) process compatibility with other materials such that a contrast in refractive index is achieved, c) process compatibility with standard microelectronic fabrication processes, d) suitable mechanical strength, flexibility, and durability, and e) sufficient lifetime and/or reliability characteristics can serve as a waveguide material. A reference describing polymer materials suitable for optical waveguide applications can be found in A. R. Blythe and J. R. Vinson, *Proc. 5$^{th}$ International Symposium on Polymers for Advanced Technologies*. Tokyo. Japan: pp. 601–11, August-December 2000, which is incorporated herein by reference.

The coupling elements 140 and 141 can include planar (or volume) grating couplers (as shown in FIGS. 1A–1C, 2A–2J, and 3A–3J), evanescent couplers, surface-relief grating couplers, and total internal reflection couplers. More specifically, when the couplers 140 and 141 are volume grating couplers, the volume grating coupler material can be laminated or spin-coated onto the appropriate surface. In particular, laminated volume grating couplers can be formed by holographic exposure of the grating region following lamination of the grating material. Alternatively, the laminated volume grating couplers can be formed by holographic exposure prior to lamination of the grating material. Additional details regarding grating couplers can be found in U.S. Pat. No. 6,285,813, which is herein incorporated by reference.

The grating coupler material includes materials such as, for example, polymer materials, silver halide photographic emulsions, photoresists such as dichromated gelatin, photopolymers such as polymethyl methacrylate (PMMA) or Dupont HRF photopolymer films, thermoplastic materials, photochromic materials such as crystals, glasses or organic substrates, photodichroic materials, and photorefractive crystals such as lithium niobate, for example. These materials have the characteristics of creating a refractive index modulation through a variety of mechanisms, all of which result in the creation of a phase or absorption or mixed grating. Other suitable materials are described in T. K. Gaylord and M. G. Moharam, *Proc. IEEE*, vol. 73, pp. 894–937, May 1985, which is herein incorporated by reference.

As depicted in FIGS. 1A–1C, the waveguide 105 includes an air-gap cladding layer 155 surrounding a portion of the waveguide core 130 and coupling elements 140 and 141. The air-gap cladding layer 155 has a lower index of refraction (e.g., index of refraction of 1) than the waveguide core 130. However, other types of cladding layers (e.g., dielectric cladding) can be used to surround the waveguide core 130 and coupling elements 140, so long as the refractive index of the dielectric cladding material is lower than that of the core material.

The air-gap cladding layer 155 can be formed by the removal (e.g., decomposition) of a sacrificial layer (as shown in FIGS. 2A–2J and 3A–3J and depicted as sacrificial layer 145) from the area in which the air-gap cladding layer 155 is to be located, as illustrated in FIGS. 1A–1C. The air-gap cladding layer 155 occupies a space bounded by the passivation layer 120, the waveguide core 130, the coupling elements 140 and 141, and the overcoat layer 150.

Generally, during the fabrication process of the microelectronic package 100, a sacrificial layer (illustrated in FIGS. 2A–2J and 3A–EJ) is deposited onto the passivation layer 120, the waveguide core 130, and the coupling elements 140 and 141 and patterned. Thereafter, the overcoat layer 150 is deposited around the sacrificial layer and on the passivation layer 120. Subsequently, the sacrificial layer is removed forming the air-gap cladding layer 155. The processes for depositing and removing the sacrificial layer are discussed in more detail hereinafter.

The sacrificial layer can be a polymer that slowly decomposes at a known temperature without leaving undesirable residue. The polymer should have a rate of decomposition so as to not create too great of a pressure while forming the air-gap cladding layer 155. In addition, the decomposition of the sacrificial layer produces gas molecules small enough to permeate the overcoat layer 150. Further, the sacrificial layer has a decomposition temperature less than the decomposition or degradation temperature of the overcoat layer 150.

Examples of compounds that can be used to form the the sacrificial layer include polynorbornenes, polyformaldehyde, polycarbonates, polyethers, and polyesters. More specifically, the compounds of the preferred embodiments are Promerus L. L. C. Unity™ 400, polypropylene carbonate, polyethylene carbonate, polynorborene carbonate, or combinations thereof. The sacrificial layer may also be constructed of photosensitive compounds, which are additives for patterning or decomposition.

The sacrificial layer can be deposited using any suitable technique, for example, but not limited to, spin coating, doctor-blading, spray-coating, sputtering, lamination, screen or stencil-printing, melt dispensing, chemical vapor deposition (CVD), and plasma based deposition systems.

The height of the air-gap cladding layer 155 can range from about 0.5 to about 300 micrometers, preferably in the range of about 1 to about 15 micrometers. The radius of the air-gap cladding layer 155 can range from about 1 to about 300 micrometers, and more particularly can range from about 50 to about 250 micrometers. In general, the height of the air-gap cladding layer 155 is controlled by both the weight fraction of the sacrificial polymer in solution as well as the deposition technique.

The sacrificial layer can be removed by thermal decomposition, ultra violet irradiation, for example, or patterned directly during application, (i.e. screen-printing or selective etching). The thermal decomposition of the sacrificial layer can be performed by heating electronic package 100 to the decomposition temperature of the sacrificial layer and holding at that temperature for a certain time period (e.g., 1–4 hours). Thereafter, the decomposition products diffuse through the overcoat layer 150 leaving a virtually residue-free hollow structure (air-gap cladding layer 155).

Although only one waveguide 105 is depicted in FIGS. 1A–1C, one or more waveguides 105 can be included in microelectronic package 100. In addition, one or more waveguide cores/couplers can be included in the air-gap cladding layer 155. Although only one layer of optical waveguides 105 is depicted, multiple layers can also be incorporated.

In the case where buried air-gap cladding layers 155 are incorporated, the overcoat layer 150 can be any modular polymer that includes the characteristic of being permeable or semi-permeable to the decomposition gases produced by the decomposition of the sacrificial layer while forming the air-gap cladding layer 155. In addition, the overcoat layer 150 has elastic properties so as to not rupture or collapse under fabrication and use conditions. Further, the overcoat layer 150 is stable in the temperature range in which the sacrificial layer decomposes. Furthermore, the overcoat layer 150 enables the lead 160 to be compliant in-plane (i.e., the x-y axis direction) when the lead 160 is adhered to the polymer surface.

Examples of the overcoat layer 150 include compounds such as, for example silicon dioxide, silicon nitride, polyimides, polynorbornenes, epoxides, polyarylenes ethers, and parylenes. More specifically, the overcoat layer 150 of the preferred embodiment is Amoco Ultradel™ 7501, BF Goodrich Avatrel™ Dielectric Polymer, DuPont™ 2611, DuPont™ 2734, DuPont™ 2771, DuPont™ 2555, or combinations thereof.

The overcoat layer 150 can be deposited using any suitable technique, for example, spin coating, doctor-blading, sputtering, lamination, screen or stencil-printing, chemical vapor deposition (CVD), or through the use of plasma based deposition systems.

For the purposes of illustration only, microelectronic package 100 of the present invention is described with particular reference to the below-described fabrication method. For clarity, some portions of the fabrication process are not included in FIGS. 2A–2J and 3A–3J. For example, photolithography or similar techniques can be used to define the overcoat layer 150, the sacrificial layer, waveguide 105, and/or lead 160 pattern. In this regard, the pattern can be defined by depositing material onto the surface of the substrate 110, multi-level interconnect 115, and/or the passivation layer 120 using techniques such as, for example, sputtering, chemical vapor deposition (CVD), plasma based deposition systems, evaporation, and electron-beam systems. Furthermore, the pattern can then be removed using reactive ion etching techniques (RIE), for example.

The following fabrication process is not intended to be an exhaustive list that includes every step required for fabricating microelectronic package 100. In addition, the fabrication process is flexible because the process steps may be performed in a different order than the order illustrated in FIGS. 2A–2J and 3A–3J.

FIGS. 2A–2J are cross-sectional views of the fabrication process relative to the view illustrated in FIG. 1A, while FIGS. 3A–3J are cross-sectional views of the fabrication process relative to the view in FIG. 1C, section B—B of FIG. 1A. Therefore, FIGS. 2A–2J and 3A–3J illustrate corresponding views in the fabrication process from different cross-sectional views. The varying views of the fabrication process shown in FIGS. 2A–2J and 3A–3J have been provided to illustrate aspects of the fabrication process that are not necessarily observable using only FIGS. 2A–2J or FIGS. 3A–3J. In this regard, FIGS. 2A and 3A, 2B and 3B, 2C and 3C, and so on, are discussed in tandem to illustrate various aspects of the representative fabrication process.

FIGS. 2A and 3A illustrate the multi-level interconnect layer 115 disposed on the substrate 110, while the passivation layer 120 is disposed on the multi-level interconnect layer 115. In addition, the detector 125 is embedded in the substrate layer 110.

FIGS. 2B and 3B illustrate the waveguide core 130 disposed on a portion of the passivation layer 120 after having been etched and photodefined. In this embodiment, the passivation layer 120 acts as the lower cladding of the waveguide 105.

FIGS. 2C and 3C illustrate a portion of the waveguide core 130 that has been removed and replaced with the grating material 135. FIGS. 2D and 3D illustrate the defining of the grating material 135 into grating couplers 140 and 141. In an alternate embodiment, the waveguide core 130 and grating material 135 are the same material, in which case no material is removed, and the grating couplers 140 and 141 are defined only within the labeled areas.

FIGS. 2E and 3E illustrate the sacrificial layer 145 disposed over the passivation layer 120, waveguide core 130, and the grating couplers 140 and 141.

FIGS. 2F and 3F illustrate the formation of sacrificial layer section 146 by etching or UV exposure/thermal decomposition, for example, of the sacrificial layer 145. The sacrificial layer section 146 defines the area where the air-gap cladding layer 155 will subsequently be located once the sacrificial layer section 146 is removed.

FIGS. 2G and 3G illustrate the overcoat layer 150 disposed on the passivation layer 120 and the sacrificial layer section 146.

FIGS. 2H and 3H illustrate the removal of the sacrificial layer section 146 to form the air-gap cladding layer 155 of the waveguide 105. In this embodiment, the waveguide 105 includes the passivation layer 120 (lower cladding), the waveguide core 130, the couplers 140 and 141, and the air-gap cladding layer 155 (upper and side cladding).

FIGS. 2I and 3I illustrate the lead 160 disposed upon the die pad 158 (not shown) after a via (not shown) is etched in the overcoat layer 150 in the area substantially over the die pad 158. It should be noted that the formation of the die pad 158 was omitted from earlier process steps for clarity. Alternatively, the sacrificial layer section 146 could be removed at this point in the fabrication rather than in the previous step.

FIGS. 2J and 3J illustrate the contact 165 disposed on the lead 160, thereby forming microelectronic package 100, as depicted in FIGS. 1A–1C. It should be noted that formation of the contact 165 is optional.

EXAMPLE 2

Figure 4A:
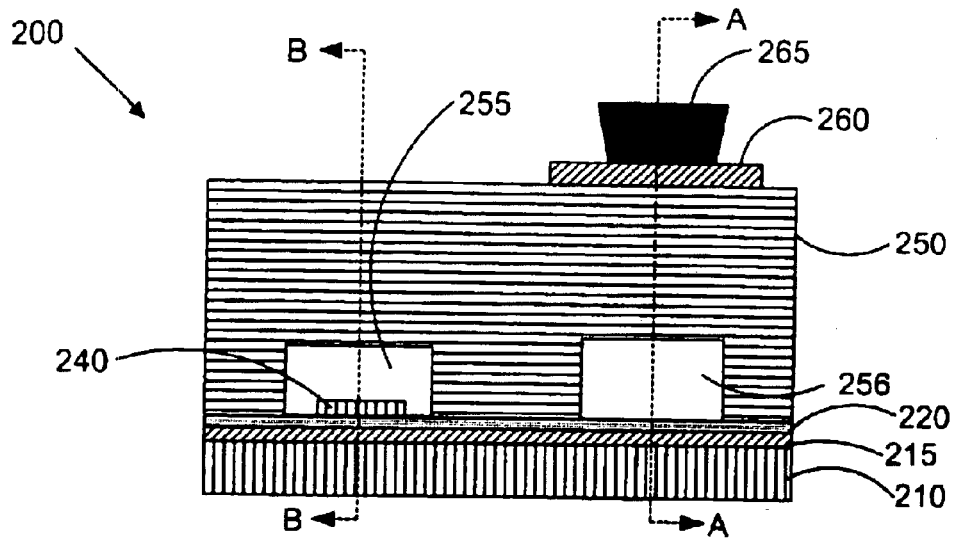
FIGS. 4A–4C are schematics that illustrate three cross-sectional views of microelectronic package 200.
Figure 4B:
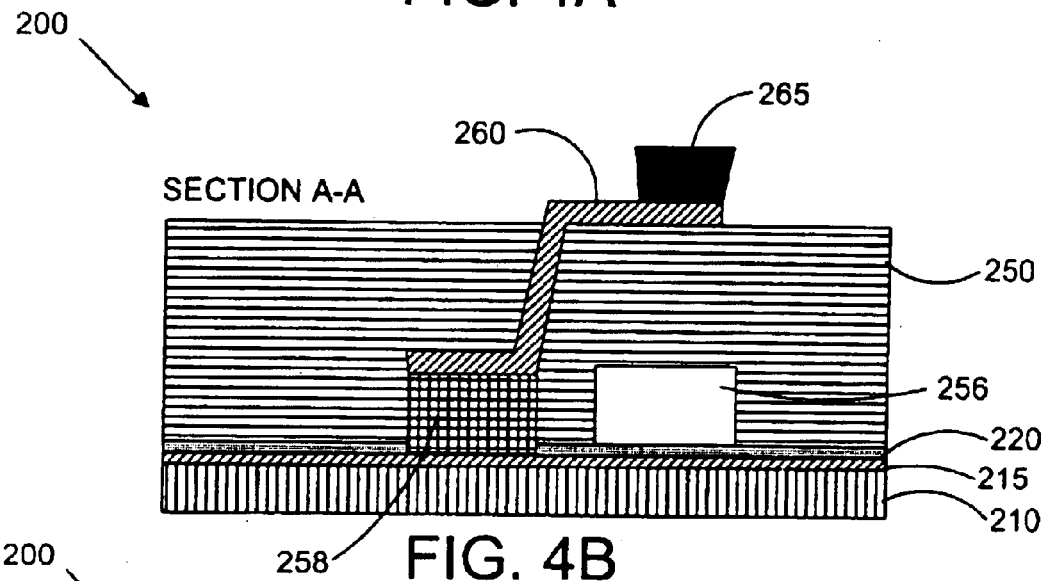
Figure 4C:
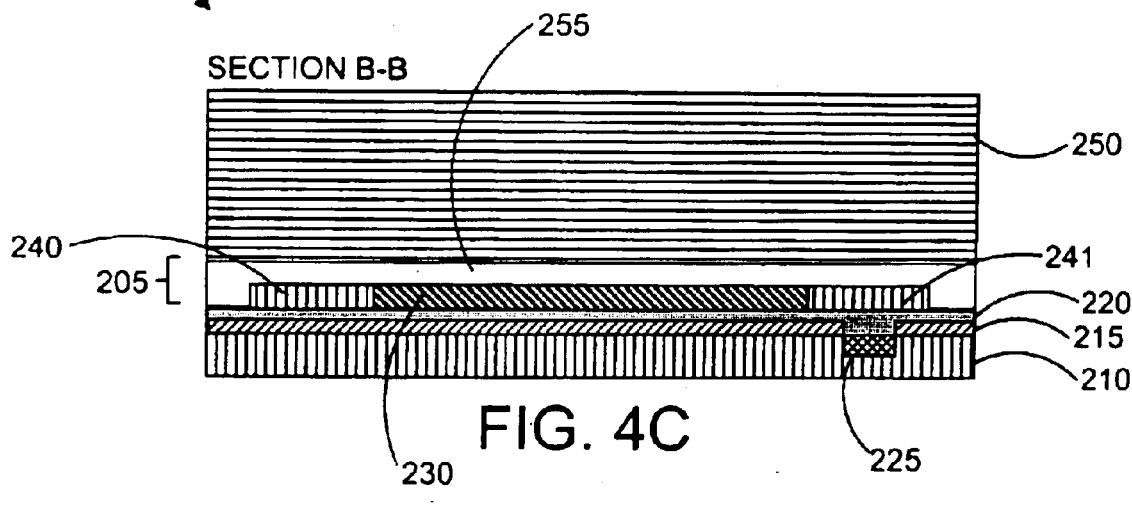

FIGS. 4A–4C are schematics that illustrate three cross-sectional views of microelectronic package 200 having a waveguide 205 and an air-gap layer 256. FIGS. 4B and 4C are cross-sectional views of FIG. 4A in the A—A and B—B direction, respectively, as shown by the arrows in FIG. 4A.

Microelectronic package 200 includes the waveguide 205, a substrate 210, a multi-level interconnect layer 215, a passivation layer 220, a detector 225, the air-gap layer 256, a overcoat layer 250, a die pad 258, a lead 260, and a contact 265. The multi-level interconnect layer 215 is disposed on the substrate 210, while the passivation layer 220 is disposed on the multi-level interconnect layer 215. In this embodiment the waveguide 205 is disposed on the passivation layer 220, where the passivation layer 220 acts as the lower cladding of the waveguide 205. In addition, the die pad 258 is disposed on the multi-level interconnect layer 215. Further, the air-gap layer 256 is disposed on the passivation layer 220. The overcoat layer 250 is disposed over the waveguide 205, the passivation layer 220 and the air-gap layer 256. The lead 260 is disposed on the die pad 258 and a portion of the overcoat layer 250. A portion of the lead 260 is disposed above the air-gap layer 256. Additional details regarding the spatial relationship of the components of microelectronic package 200 depicted in FIGS. 4A–4C are discussed in FIGS. 5A–5J and 6A–6J.

The waveguide 205, the substrate 210, the multi-interconnect layer 215, the passivation layer 220, the overcoat layer 250, the air-gap cladding layer 255, the die pad 258, the lead 260, and the contact 265, discussed in relation to FIGS. 4A–4C, are analogous or similar to the waveguide 105, the substrate 110, the multi-interconnect layer 115, the passivation layer 120, the overcoat layer 150, the air-gap cladding layer 155, the die pad 158, the lead 160, and the contact 165, discussed in reference to FIGS. 1A–1C, 2A–2J, and 3A–3J above. Therefore, additional discussion of these components will not be presented in relation to microelectronic package 200. The reader is directed to the discussion above for further explanation of these components.

In contrast to microelectronic package 100, microelectronic package 200 includes the air-gap layer 256, which can be formed by the removal (e.g., decomposition) of a sacrificial layer (as shown in FIGS. 5A–5J and 6A–6J and depicted as sacrificial layer 240) from the area in which the air-gap layer 256 is subsequently located, as illustrated in FIGS. 4A–4C. The air-gap layer 256 occupies a space bounded by the passivation layer 220 and the overcoat layer 150. The, waveguide 205 can communicate optical energy through the microelectronic package 200.

Generally, during the fabrication process of microelectronic package 200, a sacrificial layer is deposited onto the passivation layer 220 and patterned i.e., forming both the first sacrificial layer section, which corresponds to the air-gap cladding layer 255, and the second sacrificial layer section, which corresponds to the air-gap layer 256. Thereafter, the overcoat layer 250 is disposed around the first sacrificial layer section, the second sacrificial layer section, and on the passivation layer 220. Subsequently, the second sacrificial layer section is removed (e.g., decomposed) forming the air-gap layer 256. The air-gap layer 256 enables the lead 260 to be compliant out-of-plane (z axis). The processes for depositing and removing the second sacrificial layer are discussed in more detail hereinafter.

Like the sacrificial layer discussed in reference to FIG. 1A-1C, the second sacrificial layer can be virtually any polymer that slowly decomposes so as to not create too great of a pressure while forming the air-gap layer 256. In addition, the decomposition of the second sacrificial layer produces gas molecules small enough to permeate the overcoat layer 250. Further, the second sacrificial layer has a decomposition temperature less than the decomposition or degradation temperature of the overcoat layer 250.

Examples of the second sacrificial layer include compounds such as polynorbornenes, polyformaldehyde, polycarbonates, polyethers, and polyesters. More specifically, the sacrificial polymer of the preferred embodiment is Promerus L. L. C. Unity™ 400, polypropylene carbonate, polyethylene carbonate, polynorborene carbonate, or combinations thereof. The second sacrificial layer may also contain photosensitive compounds, which are additives for patterning or decomposition.

The second sacrificial layer can be deposited onto the substrate 210 using techniques such as, for example, spray coating, spin coating, doctor-blading, sputtering, lamination, screen or stencil-printing, melt dispensing, chemical vapor deposition (CVD), and plasma based deposition systems.

The height of the air-gap layer 256 can range from about 0.5 to about 300 micrometers., preferably in the range of about 5 to about 50 micrometers. The radius of the air-gap layer 256 can range from about 1 to about 300 micrometerss, and more particularly can range from about 50 to about 250 micrometers. In general, the thickness of the air-gap layer 256 (i.e., ultimately the height of the air-gap layer 256) is controlled by both the weight fraction of the sacrificial polymer in solution as well as the deposition technique.

The second sacrificial layer can be removed by thermal decomposition, ultraviolet irradiation, etc., or patterned directly during application, i.e., by screen-printing. The thermal decomposition of the second sacrificial layer can be performed by heating electronic package 200 to the decomposition temperature of the second sacrificial layer and holding at that temperature for a certain time period (e.g., 1–2 hours). Thereafter, the decomposition products diffuse through the overcoat layer 250 leaving a virtually residue-free hollow structure (air-gap).

The air-gap layer 256 can provide compliance out-of-plane for the lead 260 in the range of about 1 to about 100 micrometers, preferably from about 1 to about 50 micrometers.

Typically, the first sacrificial layer and second sacrificial layer are formed of the same material. However, the first and second sacrificial layers can be formed of different materials, which may require additional fabrication steps.

For the purposes of illustration only, microelectronic package 200 of the present invention is described with particular reference to the below-described fabrication method. For clarity, some portions of the fabrication process are not included in FIGS. 5A–5J and 6A–6J. For example, photolithography or similar techniques can be used to define the overcoat layer 250, the sacrificial layer, the waveguide 205, and/or the lead 260 pattern. In this regard, the pattern can be defined by depositing material onto the surface of the substrate 210, multi-level interconnect 215, and/or the passivation layer 220 using techniques such as, for example, sputtering, chemical vapor deposition (CVD), plasma based deposition systems, evaporation, electron-beam systems.

Furthermore, the pattern can then be removed using reactive ion etching techniques (RIE), for example.

The following fabrication processes are not intended to be an exhaustive list that includes every step required for fabricating microelectronic package 200. In addition, the fabrication process is flexible because the process steps can be performed in a different order than the order illustrated in FIGS. 5A–5J and 6A–6J.

FIGS. 5A–5J are cross-sectional views of the fabrication process relative to the view illustrated in FIG. 4A, while FIGS. 6A–6J are cross-sectional views of the fabrication process relative to the view in FIG. 4C, section B—B of FIG. 4A. Therefore, FIGS. 5A–5J and 6A–6J illustrate corresponding views in the fabrication process from different cross-sectional views. The varying views of the fabrication process shown in FIGS. 5A–5J and 6A–6J have been provided to illustrate aspects of the fabrication process that are not necessarily observable using only FIGS. 5A–5J or FIGS. 6A–6J. In this regard, FIGS. 5A and 6A, 5B and 6B, 5C and 6C, and so on, are discussed in tandem to illustrate various aspects of the fabrication process.

Figure 5A:
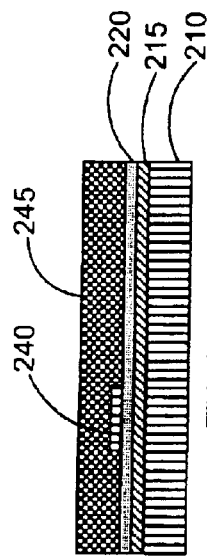

FIGS. 5A and 6A illustrate the multi-level interconnect layer 215 disposed on the substrate 210, while the passivation layer 220 disposed on the multi-level interconnect layer 215. In addition, the detector 225 is embedded in the substrate layer 215.

Figure 5B:
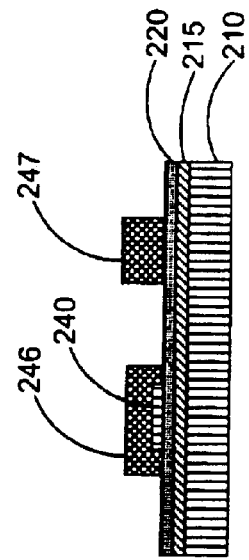

FIGS. 5B and 6B illustrate the waveguide core 230 disposed on a portion of the passivation layer 220 after having been etched or photodefined, for example. In this embodiment the passivation layer 220 is the lower cladding of the waveguide 205.

Figure 5C:
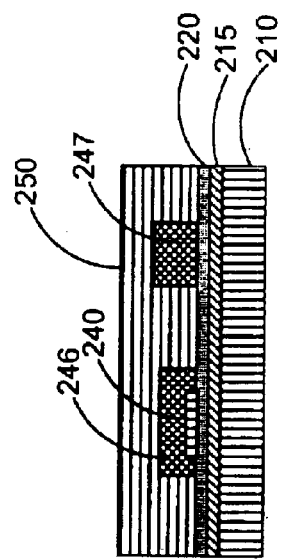

FIGS. 5C and 6C illustrate a portion of the waveguide core 230 that has been removed and replaced with grating material 235.

Figure 5D:
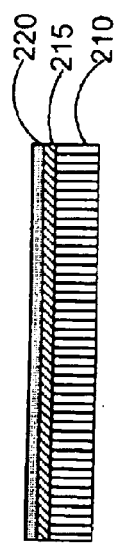

FIGS. 5D and 6D illustrate the defining and forming of the grating material 235 into grating couplers 240 and 241. In an alternate embodiment, the waveguide core and grating material are the same layer, in which case no material is removed, and the grating couplers are defined only within the labeled areas.

Figure 5E:

FIGS. 5E and 6E illustrate the sacrificial layer 245 deposited over the passivation layer 220, the waveguide core 230, and the grating couplers 240 and 241.

Figure 5F:
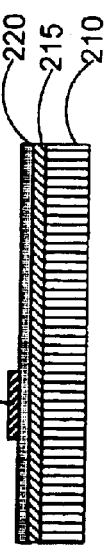

FIGS. 5F and 6F illustrate the formation of first sacrificial layer section 246, which defines the area where the air-gap cladding layer 255 will subsequently be located once the sacrificial layer 246 is removed. In addition, FIGS. 5F and 6F illustrate the formation of the second sacrificial layer section 247, which defines the area where the air-gap layer 256 will subsequently be located once the second sacrificial layer section 247 is removed. It should be noted that the first and second sacrificial layer sections 246 and 247 do not have to be made from the same sacrificial layer. In this regard, appropriate fabrication steps could be included to form the sacrificial layer sections from different sacrificial materials.

Figure 5G:
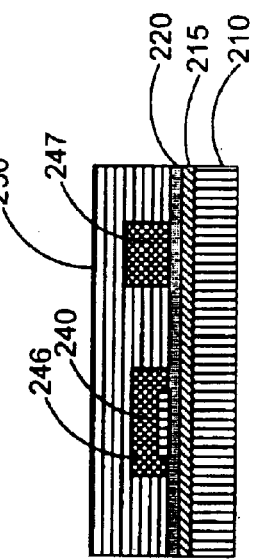

FIGS. 5G and 6G illustrate the formation of the overcoat layer 250 on the passivation layer 220, the first sacrificial layer section 246, and second sacrificial layer section 247.

Figure 5H:
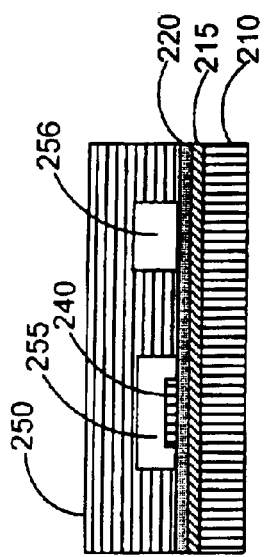

FIGS. 5H and 6H illustrate the removal of the first sacrificial layer section 246 to form the air-gap cladding layer 255 of the waveguide 205. In this embodiment, the waveguide 205 includes the passivation layer 220 (lower cladding), waveguide core 230, couplers 240 and 241, and air-gap cladding layer 255 (upper and side cladding). In addition, the second sacrificial layer section 247 is removed to form air-gap layer 256.

Figure 5I:
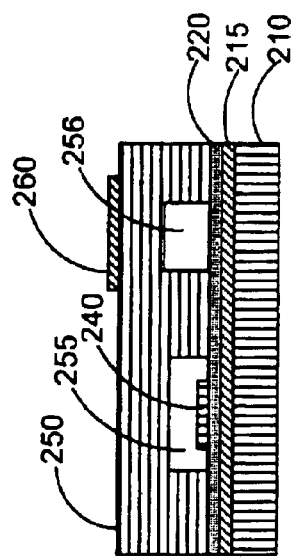

FIGS. 5I and 6I illustrate the formation of the lead 260 upon the die pad 258 (not shown) after a via (not shown) is etched in the overcoat layer 250 in the area over the die pad 258. It should be noted that the formation of the die pad 258 was omitted from earlier process steps for clarity. Alternatively, the first sacrificial layer section 246 and the second sacrificial layer section 247 could be removed at this point in the fabrication rather than in a previous step.

Figure 5J:
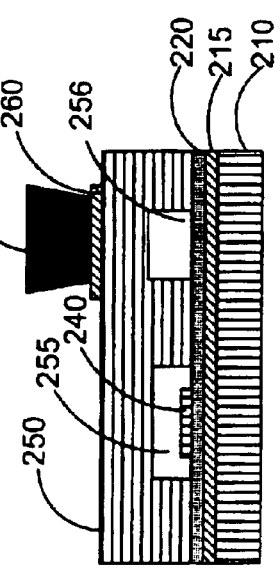

FIGS. 5J and 6J illustrate the formation of a contact 265 on the lead 260, thereby forming microelectronic package 200 as depicted in FIGS. 4A–4C. It should be noted that formation of the contact 265 is optional.

EXAMPLE 3

Figure 7A:
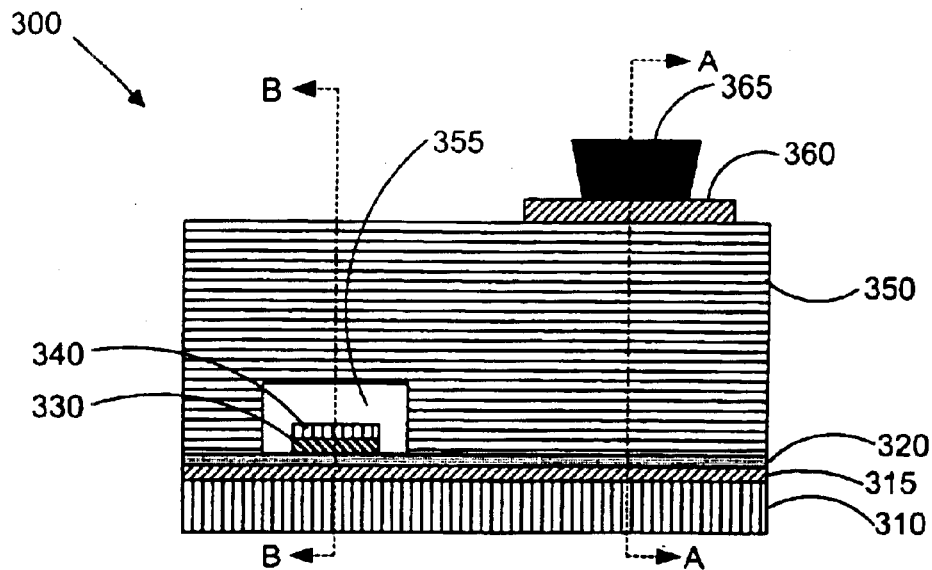
FIGS. 7A–7C are schematics that illustrate three cross-sectional views of microelectronic package 300.
Figure 7B:
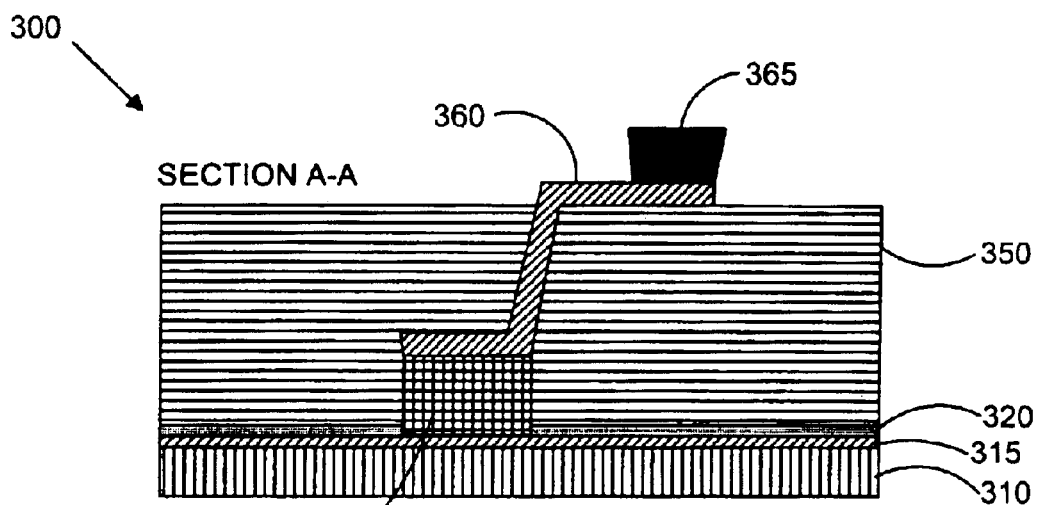
Figure 7C:
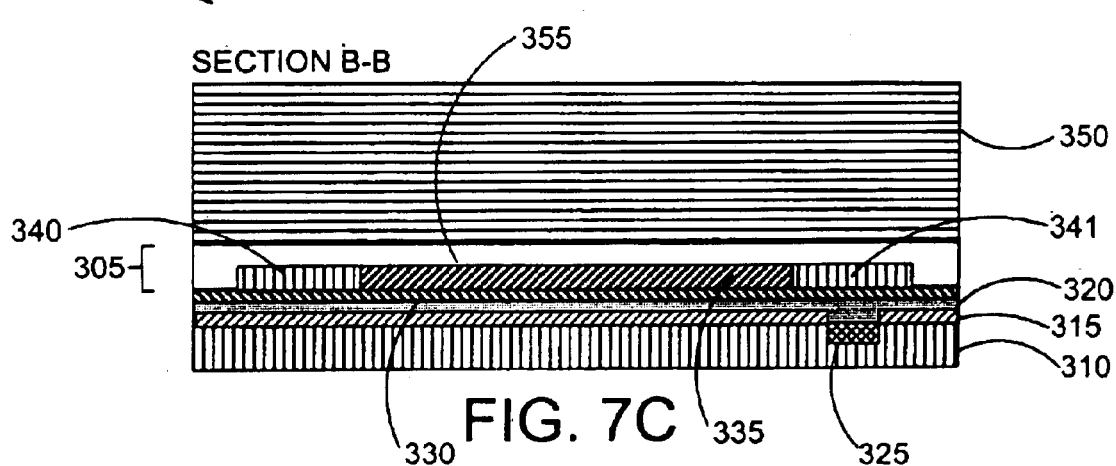

FIGS. 7A–7C are schematics that illustrate three cross-sectional views of microelectronic package 300 having a waveguide 305 with surface-mounted couplers 340 and 341. FIGS. 7B and 7C are cross-sectional views of FIG. 7A in the A—A and B—B direction, respectively, as shown by the arrows in FIG. 7A.

Microelectronic package 300 includes the waveguide 305, a substrate 310, a multi-level interconnect layer 315, a passivation layer 320, a detector 325, an overcoat layer 350, a die pad 358, a lead 360, and a contact 365. The multi-level interconnect layer 315 is disposed on the substrate 310. The passivation layer 320 is disposed on the multi-level interconnect layer 315. In this embodiment the waveguide 305 is disposed on the passivation layer 320, where the passivation layer 320 acts as the lower cladding of the waveguide 305. In addition, the die pad 358 is disposed on the multi-level interconnect layer 315. The overcoat layer 350 is disposed over the waveguide 305 and the passivation layer 320. The lead 360 is disposed on the die pad 358 and a portion of the overcoat layer 350. Additional details regarding the spatial relationship of the components of the microelectronic package 300 depicted in FIGS. 7A–7C are discussed in FIGS. 8A–8J and 9A–9J.

The substrate 310, the multi-interconnect layer 315, the passivation layer 320, the overcoat layer 350, the air-gap cladding layer 355, the die pad 358, the lead 360, and the contact 365, discussed in relation to FIGS. 7A–7C, are analogous or similar to the waveguide 205, the substrate 210, the multi-interconnect layer 215, the passivation layer 220, the overcoat layer 250, the air-gap cladding layer 255, the die pad 258, the lead 260, and the contact 265, discussed in reference to FIGS. 4A–4C and 5A–5J above. Therefore, additional discussion of these components will not be presented in relation to microelectronic package 300. The reader is directed to the discussion presented above for further explanation of these components.

The waveguide 305 includes a waveguide core 330, a grating coupler layer 335, and couplers 340 and 341. In this embodiment the couplers 340 and 341 are located above the waveguide core 330 in a surface-mount fashion. Surface-mounted coupler operates differently than the waveguide-embedded coupler system described in FIGS. 4A–4C. The surface-mounted couplers 340 and 341 operate based on evanescent interaction between the grating coupler layer 335 and waveguide core layer 330. The, waveguide 305 can communicate optical energy through the microelectronic package 300.

For the purposes of illustration only, microelectronic package 300 of the present invention is described with particular reference to the below-described fabrication method. For clarity, some portions of the fabrication process are not included in FIGS. 8A–8L and 9A–9L. For example, photolithography or similar techniques can be used to define the overcoat layer 350, the sacrificial layer, the waveguide 305, and/or the lead 360 pattern. In this regard, the pattern can be defined by depositing material onto the surface of the substrate 310, multi-level interconnect 315, and/or the passivation layer 320 using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication processes are not intended to be an exhaustive list that includes every step required for fabricating microelectronic package 300. In addition, the fabrication process is flexible because the process steps can be performed in a different order than the order illustrated in FIGS. 8A–8L and 9A–9L.

FIGS. 8A–8L are cross-sectional views of the fabrication process relative to the view illustrated in FIG. 7A, while FIGS. 9A–9L are cross-sectional views of the fabrication process relative to the view in FIG. 7C, section B—B of FIG. 7A. Therefore, FIGS. 8A–8L and 9A–9L illustrate corresponding views in the fabrication process from different cross-sectional views. The varying views of the fabrication process shown in FIGS. 8A–8L and 9A–9L have been provided to illustrate aspects of the fabrication process that are not necessarily observable using only FIGS. 8A–8L or FIGS. 9A–9L. In this regard, FIGS. 8A and 9A, 8B and 9B, 8C and 9C, and so on, are discussed in tandem to illustrate various aspects of the fabrication process.

Figure 8A:

FIGS. 8A and 9A illustrate the multi-level interconnect layer 315 disposed on the substrate 310, while the passivation layer 320 is disposed on the multi-level interconnect layer 315. In addition, the detector 325 is embedded in the substrate layer 310.

Figure 8B:
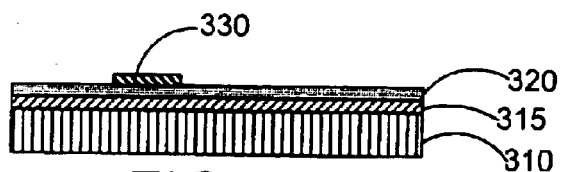

FIGS. 8B and 9B illustrate the waveguide core 330 disposed on a portion of the passivation layer 320 after having been etched or photodefined, for example. In this embodiment the passivation layer 320 is the lower cladding of the waveguide 305.

Figure 8C:
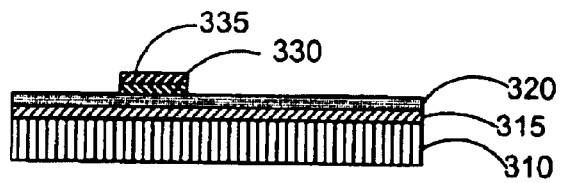
Figure 8D:
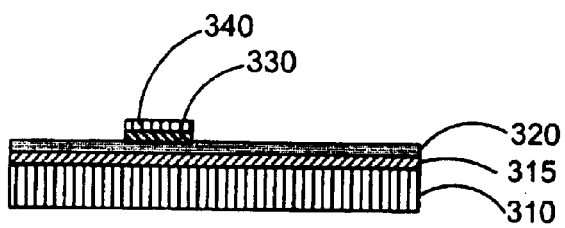

FIGS. 8C and 9C illustrate the coupler material 335 deposited on the waveguide core 330. FIGS. 8D and 9D illustrate the defining and forming of the grating material 335 into grating couplers 340 and 341.

Figure 8E:
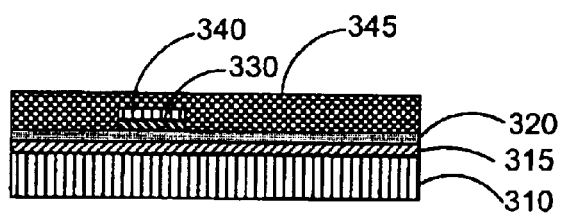

FIGS. 8E and 9E illustrate the sacrificial layer 345 deposited over the passivation layer 320, the waveguide core 330, the grating layer 335, and the grating couplers 340 and 341.

Figure 8F:
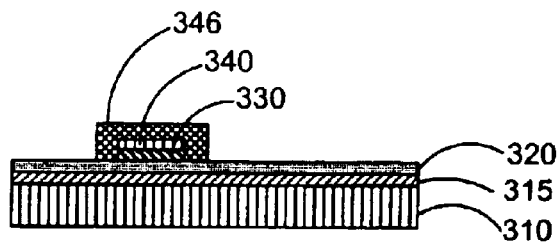
Figure 8G:
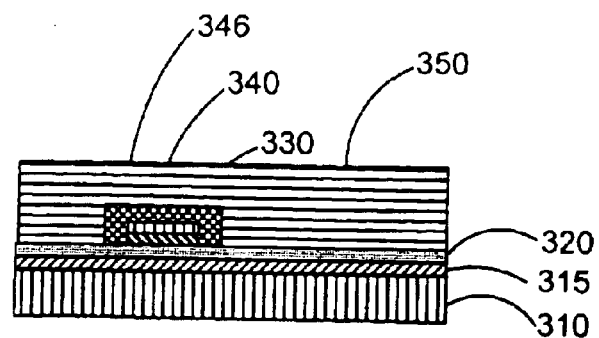

FIGS. 8F and 9F illustrate the formation of the sacrificial layer section 346, which defines the area where the air-gap cladding layer 355 will subsequently be located once the sacrificial layer section 346 is removed. FIGS. 8G and 9G illustrate the formation of the overcoat layer 350 on the passivation layer 320 and first sacrificial layer section 346.

Figure 8H:
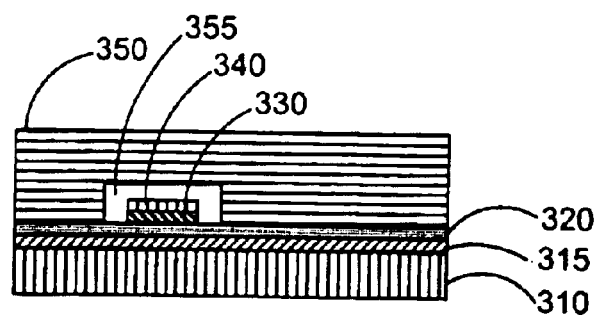
Figure 9H:
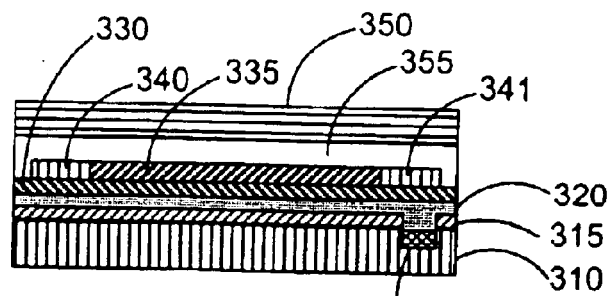

FIGS. 8H and 9H illustrate the removal of the sacrificial layer section 346 to form the air-gap cladding layer 355 and thereby forming the waveguide 305. In this embodiment, the waveguide 305 includes the passivation layer 320 (lower cladding), the waveguide core 330, the couplers 340 and 341, and the air-gap cladding layer 355 (upper and side cladding).

Figure 8I:
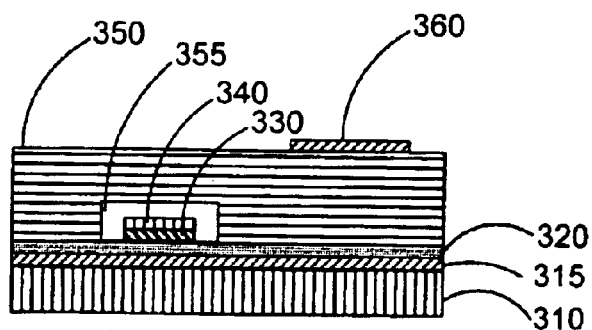
Figure 9I:
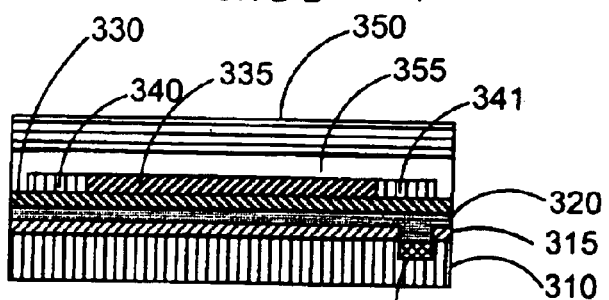

FIGS. 8I and 9I illustrate the formation of the lead 360 upon the die pad 358 (not shown) after a via (not shown) is etched in the overcoat layer 350 in the area over the die pad 358. It should be noted that the formation of the die pad 358 was omitted for clarity from earlier process steps. Alternatively, the sacrificial layer section 346 could be removed at this point in the fabrication.

Figure 8J:
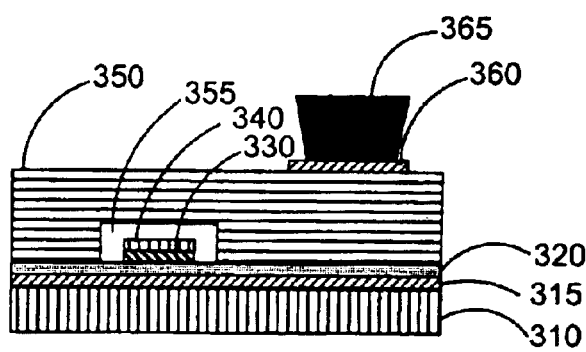
Figure 9J:
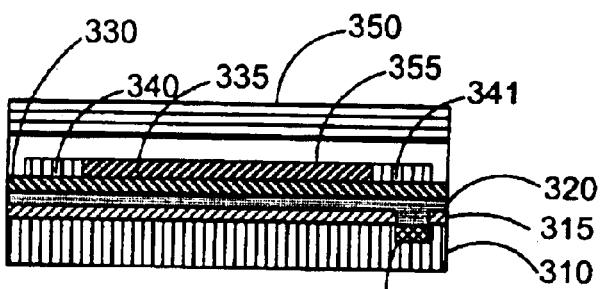
Figure 9G:
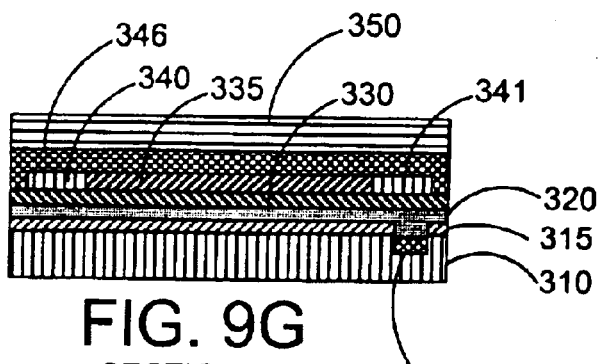

FIGS. 8J and 9J illustrate the formation of a contact 365 on the lead 360, thereby forming microelectronic package 300 depicted in FIGS. 7A–7C. It should be noted that formation of the contact 365 is optional.

EXAMPLE 4

Figure 10A:
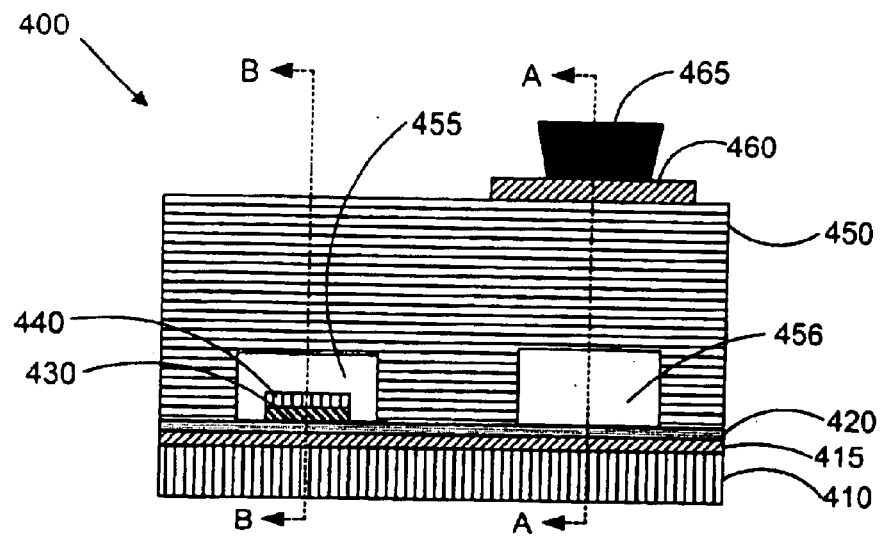
FIGS. 10A–10C are schematics that illustrate three cross-sectional views of microelectronic package 400.
Figure 10B:
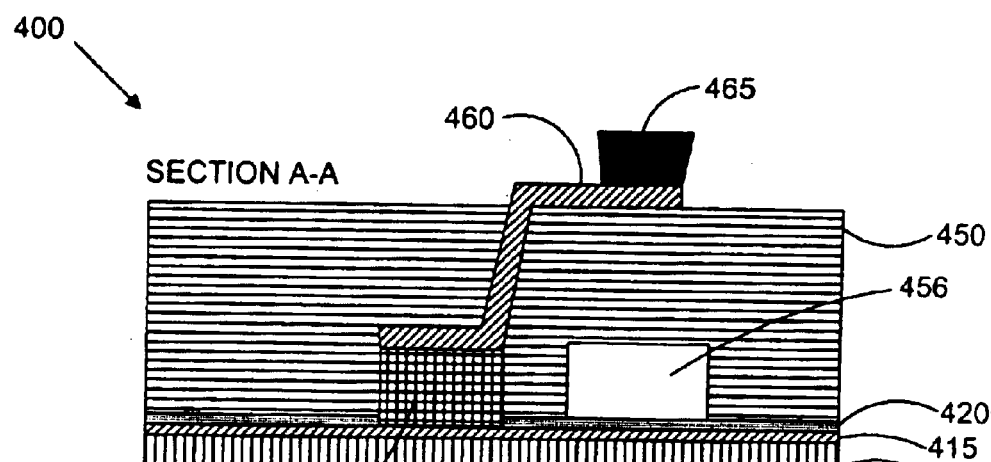
Figure 10C:
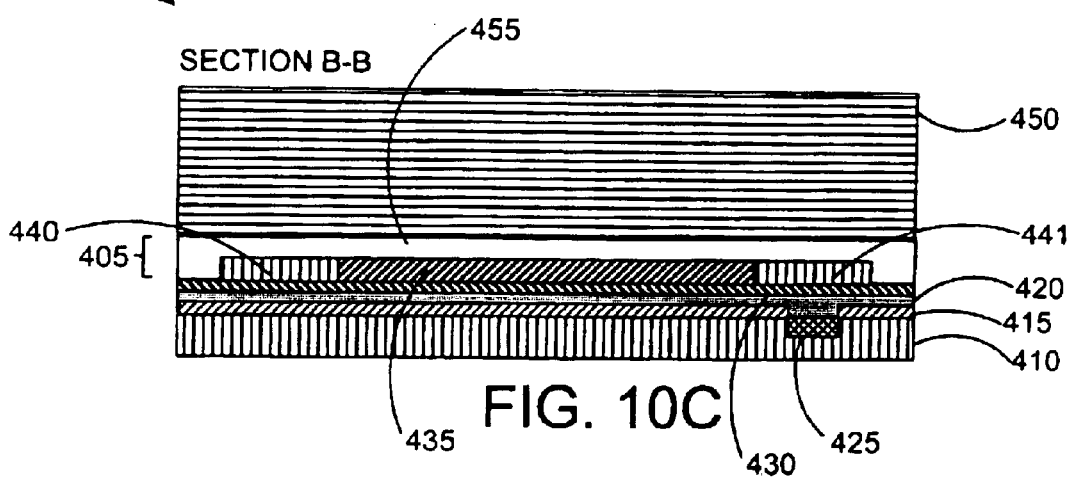

FIGS. 10A–10C are schematics that illustrate three cross-sectional views of microelectronic package 400 having a waveguide 405 with couplers 440 and 441 surface-mounted and an air-gap layer 456. FIGS. 10B and 10C are cross-sectional views of FIG. 10A in the A—A and B—B direction, respectively, as shown by the arrows in FIG. 10A.

Microelectronic package 400 includes the waveguide 405, a substrate 410, a multi-level interconnect layer 415, a passivation layer 420, a detector 425, an overcoat layer 450, the air-gap layer 456, a die pad 458, a lead 460, and a contact 465. The multi-level interconnect layer 415 is disposed on the substrate 410. The passivation layer 420 is disposed on the multi-level interconnect layer 415. In this embodiment the waveguide 405 is disposed on the passivation layer 420, where the passivation layer 420 acts as the lower cladding of the waveguide 405. In addition, the die pad 458 is disposed on the multi-level interconnect layer 415. The air-gap layer 458 is disposed on the passivation layer 420. The overcoat layer 450 is disposed over the waveguide 405, the passivation layer 420, and the air-gap layer 456. The lead 460 is disposed on the die pad 460 and a portion of the overcoat layer 450. A portion of the lead 460 is disposed above the air-gap 456. Additional details regarding the spatial relationship of the components of the microelectronic package 400 depicted in FIGS. 10A–10C are discussed in FIGS. 11A–11J and 12A–12J. The waveguide 405 can communicate optical energy through the microelectronic package 400.

The waveguide 405, the substrate 410, the multi-interconnect layer 415, the passivation layer 420, the overcoat layer 450, the air-gap cladding layer 455, the die pad 458, the lead 460, and the contact 465, discussed in relation to FIGS. 10A–10C, are analogous or similar to the substrate 310, the multi-interconnect layer 315, the passivation layer 320, the overcoat layer 350, the air-gap cladding layer-355, the die pad 358, the lead 360, and the contact 365, discussed in reference to FIGS. 7A–7C above. In addition, the air-gap layer 256 described in relation to FIGS. 4A–4C is analogous or similar to the air-gap layer 456 described in relation to FIGS. 10A–10C. Consequently, the second sacrificial layer described in relation to FIGS. 4A–4C corresponds to the second sacrificial layer used to form the area where the air-gap layer 456 is formed upon removal of the second sacrificial layer (FIGS. 11A–11J and 12A–12J). Therefore, additional discussion of these components will not be presented in relation to microelectronic package 400. The reader is directed to the discussion presented above for further explanation of these components.

For the purposes of illustration only, microelectronic package 400 of the present invention is described with particular reference to the below-described fabrication method. For clarity, some portions of the fabrication process are not included in FIGS. 11A–11J and 12A–12J. For example, photolithography or similar techniques can be used to define the overcoat layer 450, the sacrificial layer, the waveguide 405, and/or the lead 460 pattern. In this regard, the pattern can be defined by depositing material onto the surface of the substrate 410, multi-level interconnect 415, and/or the passivation layer 420 using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication processes are not intended to be an exhaustive list that includes every step required for fabricating microelectronic package 400. In addition, the fabrication process is flexible because the process steps can be performed in a different order than the order illustrated in FIGS. 11A–11J and 12A–12J.

FIGS. 11A–11J are cross-sectional views of the fabrication process relative to the view illustrated in FIG. 10A, while FIGS. 12A–12J are cross-sectional views of the fabrication process relative to the view in FIG. 10C, section B—B of FIG. 10A. Therefore, FIGS. 11A–11J and 12A–12J illustrate corresponding views in the fabrication process from different cross-sectional views. The varying views of the fabrication process shown in FIGS. 11A–11J and 12A–12J have been provided to illustrate aspects of the fabrication process that are not necessarily observable using only FIGS. 11A–11J or FIGS. 12A–12J. In this regard, FIGS. 11A and 12A, 11B and 12B, 11C and 12C, and so on, are discussed in tandem to illustrate various aspects of the fabrication process.

Figure 11A:
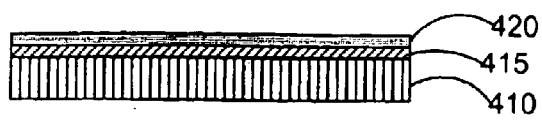
Figure 12A:
FIGS. 12A–12J are cross-sectional views of the fabrication process relative to the view in FIG. 10C, section B—B of FIG. 10A.

FIGS. 11A and 12A illustrate the multi-level interconnect layer 415 disposed on the substrate 410, while the passivation layer 420 is disposed on the multi-level interconnect layer 415. In addition, the detector 425 is embedded in the substrate layer 410.

Figure 11B:
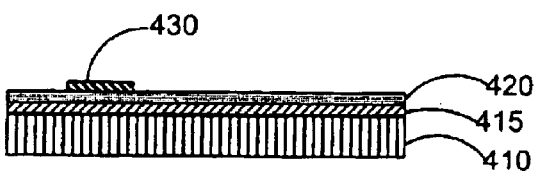
Figure 12B:
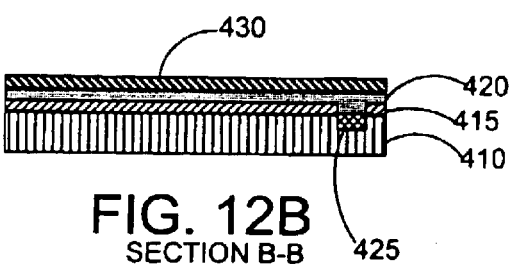

FIGS. 11B and 12B illustrate the waveguide core 430 disposed on a portion of the passivation layer 420 after having been etched or photodefined, for example. In this embodiment the passivation layer 420 is the lower cladding of the waveguide 405.

Figure 11C:
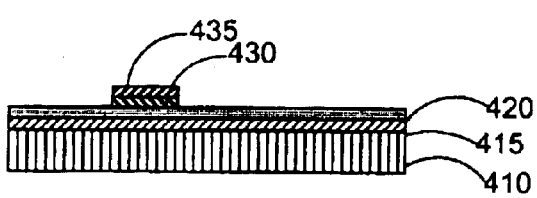
Figure 11D:
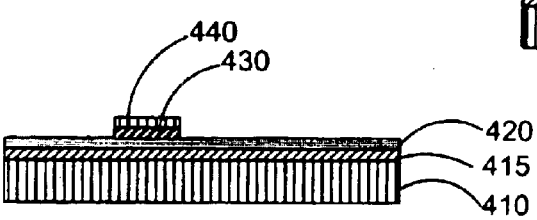
Figure 12C:
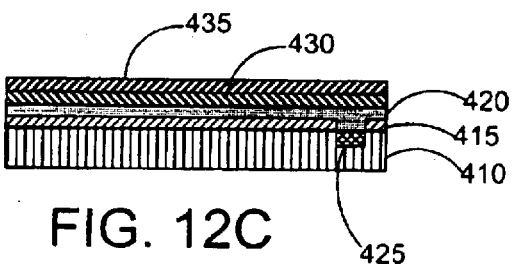
Figure 12D:
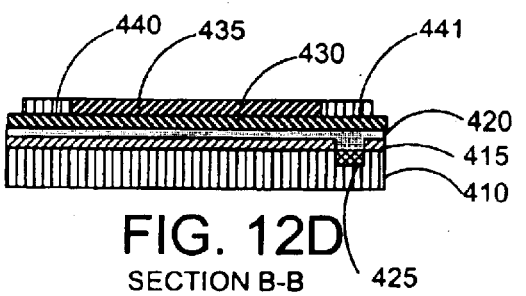

FIGS. 11C and 12C illustrate the coupler material 435 deposited on the waveguide core 430. FIGS. 11D and 12D illustrate the defining and forming the grating material 435 into grating couplers 440 and 441.

Figure 11E:
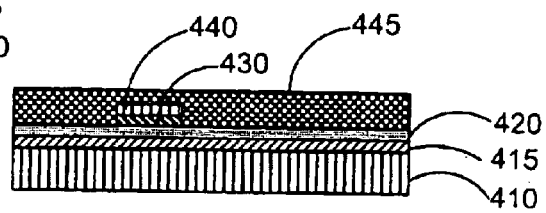
Figure 12E:
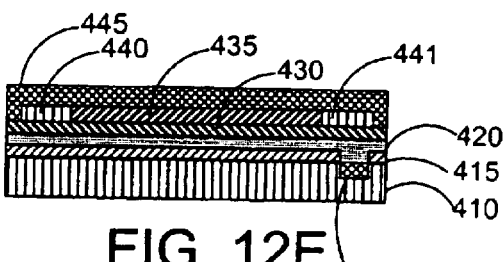

FIGS. 11E and 12E illustrate the sacrificial layer 445 deposited over the passivation layer 420, the waveguide core 430, the grating layer 435, and the grating couplers 440 and 441.

Figure 11F:
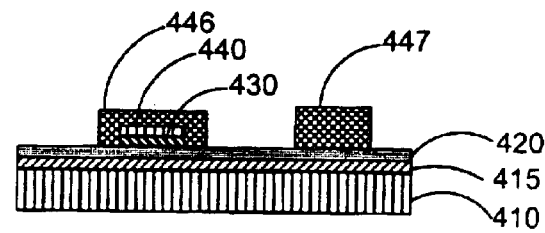
Figure 12F:
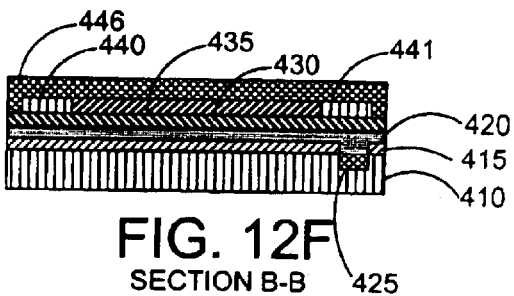
Figure 12:
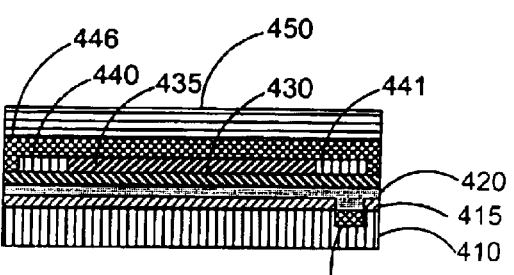

FIGS. 11F and 12F illustrate the formation of the first sacrificial layer section 446, which defines the area where the air-gap cladding layer 455 will subsequently be located once the sacrificial layer section 446 is removed. In addition, FIGS. 11F and 12F illustrate the formation of the second sacrificial layer section 447, which defines the area where the air-gap layer 456 will subsequently be located once the second sacrificial layer section 447 is removed. It should be noted that the first and second sacrificial layer sections 446 and 447 do not have to be made from the same sacrificial layer. In this regard, appropriate fabrication steps could be included to form the sacrificial layer sections having different sacrificial layers.

Figure 11G:
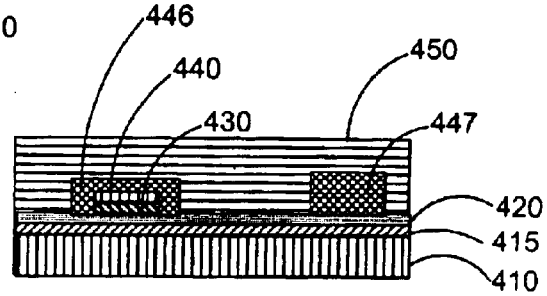

FIGS. 11G and 12G illustrate the formation of the overcoat layer 450 on the passivation layer 420, first sacrificial layer section 446, and the second sacrificial layer section 447.

Figure 11H:
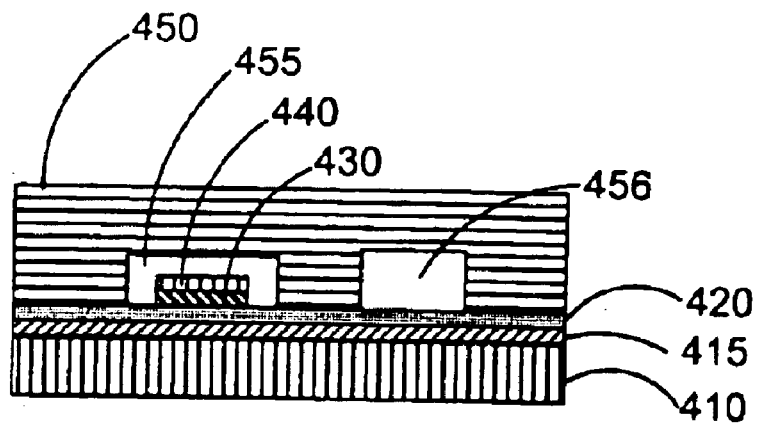
Figure 12H:
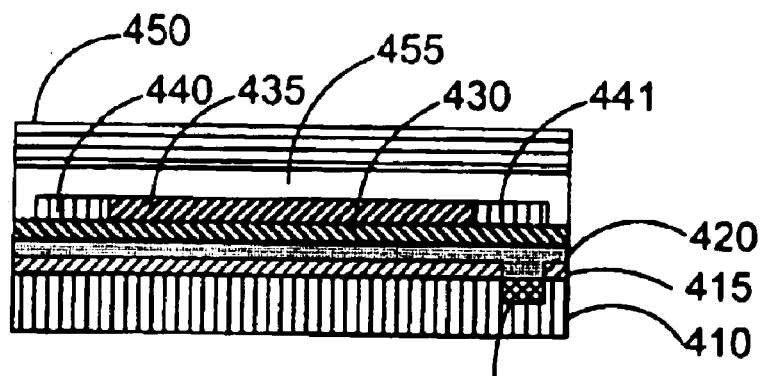

FIGS. 11H and 12H illustrate the removal of the first sacrificial layer section 446 to form the air-gap cladding layer 455 and thereby forming the waveguide 405. In this embodiment, the waveguide 405 includes the passivation layer 420 (lower cladding), the waveguide core 430, the couplers 440 and 441, and the air-gap cladding layer 455 (upper and side cladding). In addition, the second sacrificial layer section 447 is removed to form air-gap layer 456.

Figure 11I:
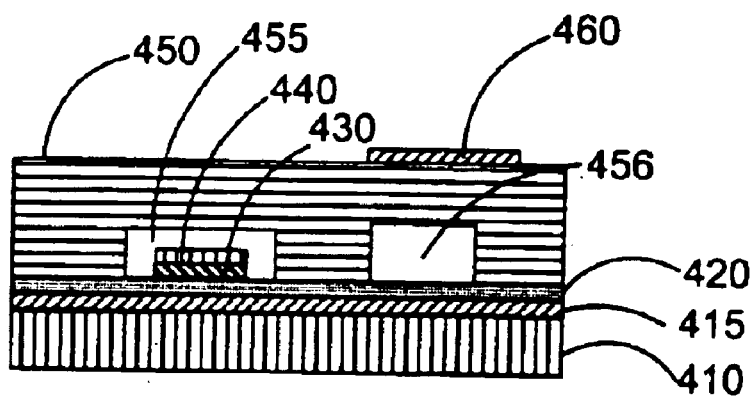
Figure 12I:
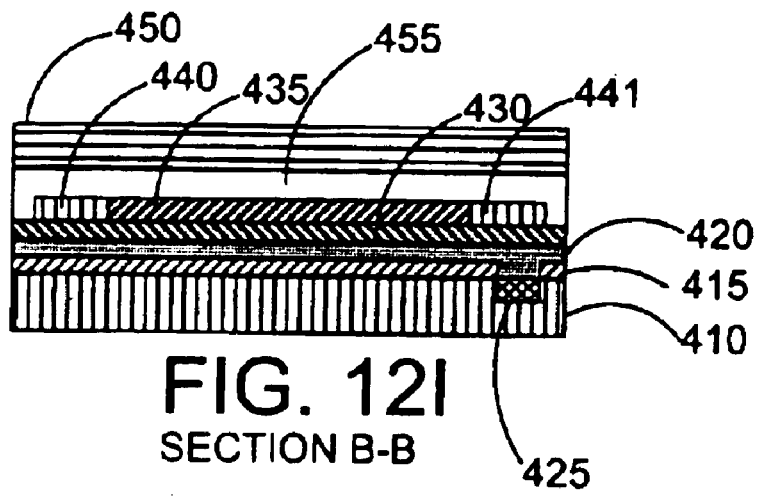

FIGS. 11I and 12I illustrate the formation of the lead 460 upon the die pad 458 (not shown) after a via (not shown) is etched in the overcoat layer 450 in the area over the die pad 458. It should be noted that the formation of the die pad 458 was omitted from earlier process steps for clarity. Alternatively, the sacrificial layer section 446 could be removed at this point in the fabrication.

Figure 11J:
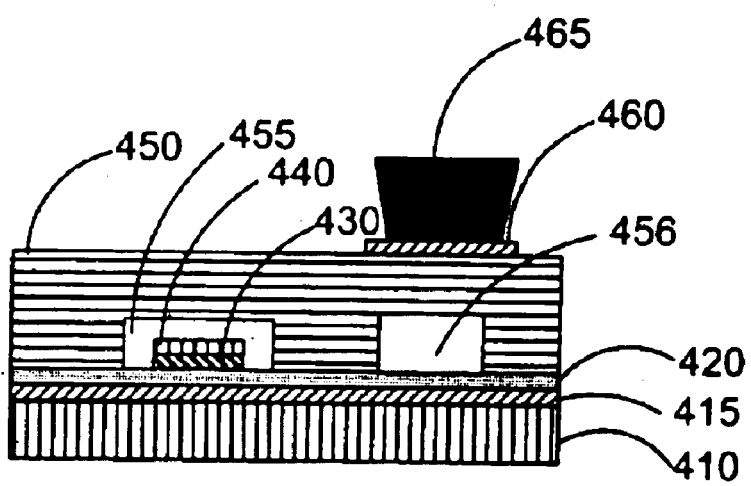
Figure 12J:
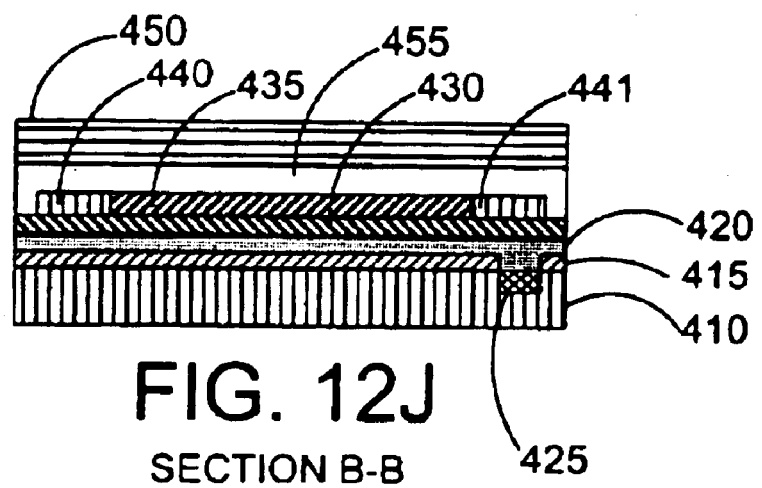

FIGS. 11J and 12J illustrate the formation of a contact 465 on the lead 460, thereby forming microelectronic package 400 depicted in FIGS. 10A–10C. It should be noted that formation of the contact 465 is optional.

EXAMPLE 5

Figure 13A:
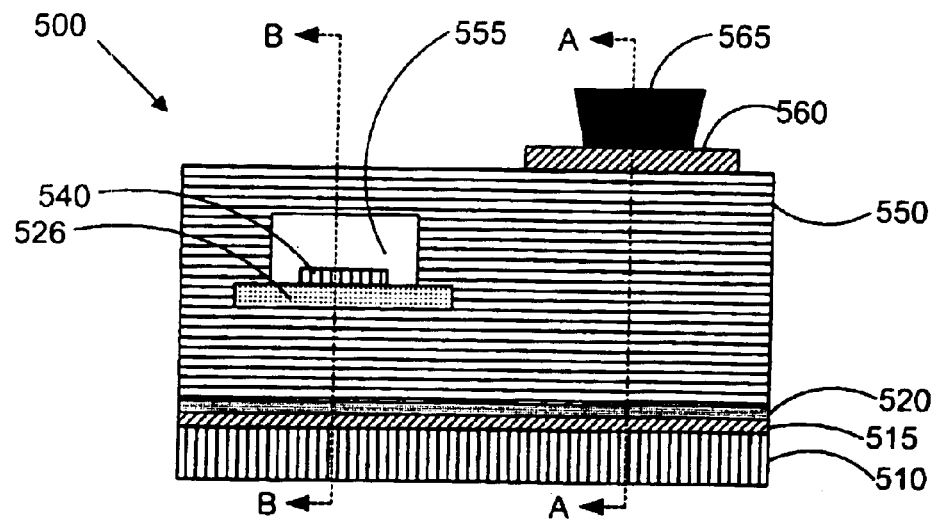
FIGS. 13A–13C are schematics that illustrate three cross-sectional views of microelectronic package 500.
Figure 13B:
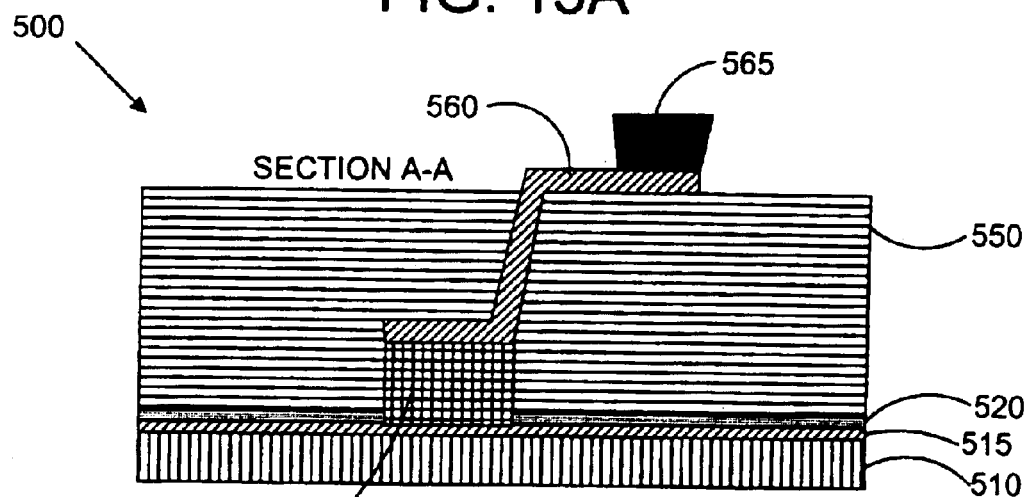
Figure 13C:
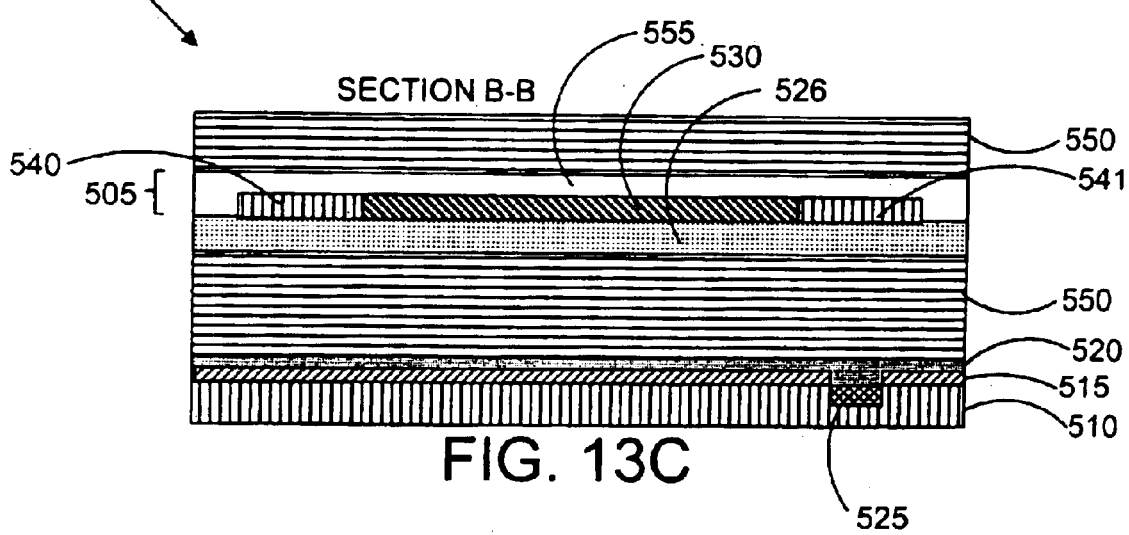

FIGS. 13A–13C are schematics that illustrate three cross-sectional views of microelectronic package 500 having a suspended waveguide layer 505. FIGS. 13B and 13C are cross-sectional views of FIG. 13A in the A—A and B—B direction, respectively, as shown by the arrows in FIG. 13A.

Microelectronic package 500 includes the waveguide 505, a substrate 510, a multi-level interconnect layer 515, a passivation layer 520, a detector 525, a lower cladding layer 526, an overcoat layer 550, a die pad 558, a lead 560, and a contact 565. The multi-level interconnect layer 515 is disposed on the substrate 510 while the passivation layer 520 is disposed on the multi-level interconnect layer 515. In addition, the die pad 558 is disposed on the multi-level interconnect layer 515. The overcoat layer 550 is disposed on the passivation layer 520. The lower cladding 526 is disposed upon the overcoat layer 550. In this embodiment the waveguide 505 is disposed on the lower cladding 526. Another overcoat layer 550 is disposed on the waveguide 505 and the lower cladding 526. The lead 560 is disposed on the die pad 558 and a portion of the overcoat layer 550. Additional details regarding the spatial relationship of the components of microelectronic package 500 depicted in FIGS. 13A–13C are discussed in FIGS. 14A–14L and 15A–15L, which illustrate an exemplary fabrication process of microelectronic package 500. The, waveguide 505 can communicate optical energy through the microelectronic package 500.

The substrate 510, the multi-interconnect layer 515, the passivation layer 520, the air-gap cladding layer 555, the die pad 558, the lead 560, and the contact 565, discussed in relation to FIGS. 13A–13C, are analogous or similar to the substrate 410, the multi-interconnect layer 415, the passivation layer 420, the overcoat layer 450, the air-gap cladding layer 455, the die pad 458, the lead 460, and the contact 465, discussed in relation to FIGS. 13A–13C above. Therefore, additional discussion of these components will not be presented in relation to microelectronic package 500. The reader is directed to the discussion presented above for further explanation of these components.

In this embodiment, the overcoat layer 550 is deposited in two fabrication steps. Although additional fabrication steps are used to deposit the overcoat layer 550, the overcoat layer 550 is analogous or similar to the overcoat layer 450 described in FIGS. 13A–13C. Alternatively, the overcoat layer 550 can be composed of two different overcoat layer materials.

The lower cladding layer 526 includes materials having a lower index of retraction than the waveguide core 530 (FIGS. 14A–14L and 15A–15L). The lower cladding layer 526 can be fabricated from materials the same as or similar in nature to those materials employed for the waveguide core 530. Consequently, the passivation layer 520 does not have to have a lower index of refraction than the waveguide core 530 (FIGS. 14A–14L and 15A–15L).

For the purposes of illustration only, microelectronic package 500 of the present invention is described with particular reference to the below-described fabrication method. For clarity, some portions of the fabrication process are not included in FIGS. 14A–14L and 15A–15L. For example, photolithography or similar techniques can be used to define the overcoat layer 550, the sacrificial layer, the waveguide 505, and/or the lead 560 pattern. In this regard, the pattern can be defined by depositing material onto the surface of the substrate 510, multi-level interconnect 515, and/or the passivation layer 520 using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication processes are not intended to be an exhaustive list that includes every step required for fabricating microelectronic package 500. In addition, the fabrication process is flexible because the process steps may be performed in a different order than the order illustrated in FIGS. 14A–14L and 15A–15L.

FIGS. 14A–14L are cross-sectional views of the fabrication process relative to the view illustrated in FIG. 13A, while FIGS. 15A–15L are cross-sectional views of the fabrication process relative to the view in FIG. 13C, section B—B of FIG. 13A. Therefore, FIGS. 14A–14L and 15A–15L illustrate corresponding views in the fabrication process from different cross-sectional views. The varying views of the fabrication process shown in FIGS. 14A–14L and 15A–15L have been provided to illustrate aspects of the fabrication process that are not necessarily observable using only FIGS. 14A–14L or FIGS. 15A–15L. In this regard. FIGS. 14A and 15A, 14B and 15B, 14C and 15C, and so on are discussed in tandem to illustrate various aspects of the representative fabrication process.

Figure 14A:
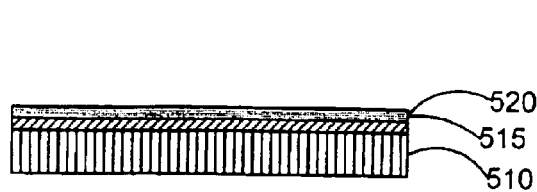

FIGS. 14A and 15A illustrate the multi-level interconnect layer 515 disposed on the substrate 510, while the passivation layer 520 is disposed on the multi-level interconnect layer 515. In addition, the detector 525 is embedded in the substrate layer 510.

Figure 14B:
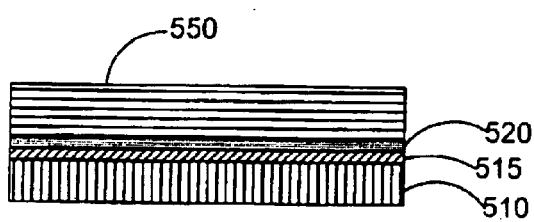
Figure 14C:
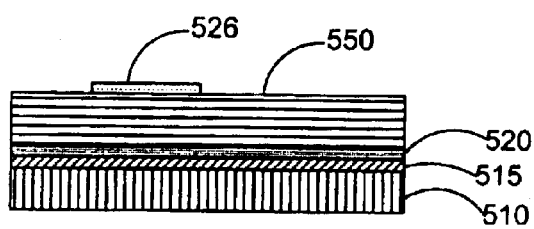
Figure 14D:
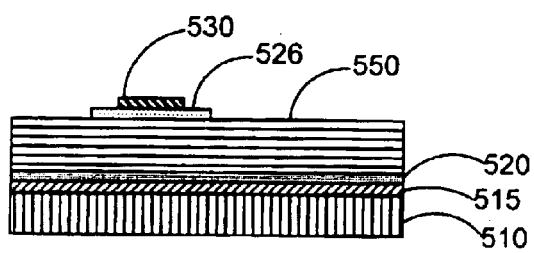

FIGS. 14B and 15B illustrate the formation of the overcoat layer 550A on the passivation layer 520. FIGS. 14C and 15C illustrate the lower cladding 526 disposed on a portion of the overcoat 550A. FIGS. 14D and 15D illustrate the waveguide core 530 disposed on a portion of the lower cladding 526.

Figure 14E:
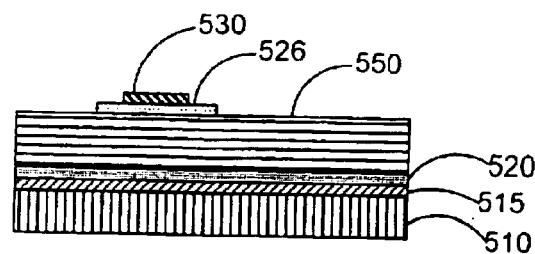

FIGS. 14E and 15E illustrate a portion of the waveguide core 530 that has been removed and replaced with grating material 535. In an alternate embodiment, the waveguide core layer and grating material are the same layer, in which case no material is removed, and the grating couplers are defined only within the labeled areas.

Figure 14F:
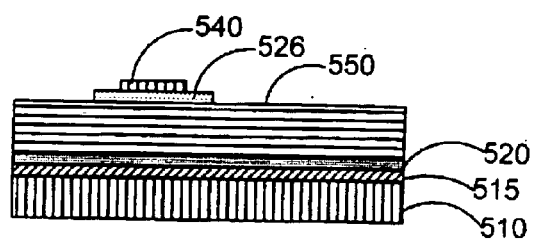
Figure 14G:
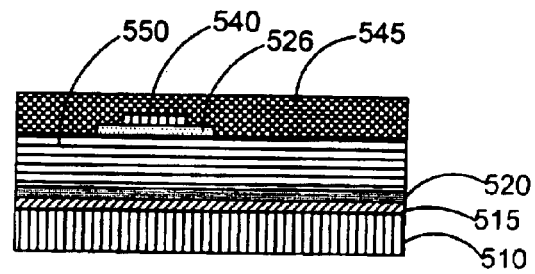

FIGS. 14F and 15F illustrate the defining and forming of the grating material 535 into grating couplers 540 and 541. FIGS. 14G and 15G illustrate the sacrificial layer 545 disposed over the overcoat layer 550A, the lower cladding 526, the waveguide core 530, and the grating couplers 540 and 541.

Figure 14H:
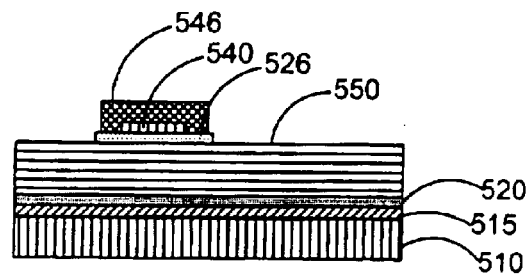

FIGS. 14H and 15H illustrate the formation of sacrificial layer section 546 by etching the sacrificial layer 545, for example. The sacrificial layer section 546 defines the area where the air-gap cladding layer 555 will subsequently be located once the sacrificial layer section 546 is removed.

Figure 14I:
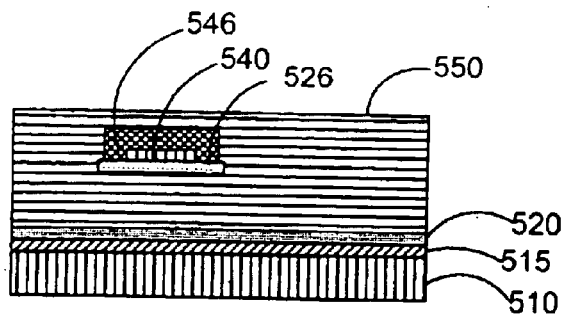

FIGS. 14I and 15I illustrate the overcoat layer 550B disposed on the overcoat layer 550A and the sacrificial layer section 546. Overcoat layers 550A and 550B form overcoat layer 550.

Figure 14J:
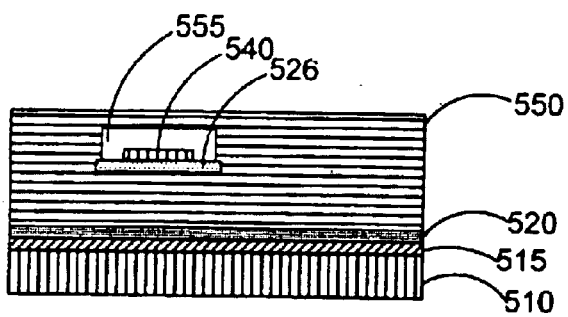
Figure 15J:
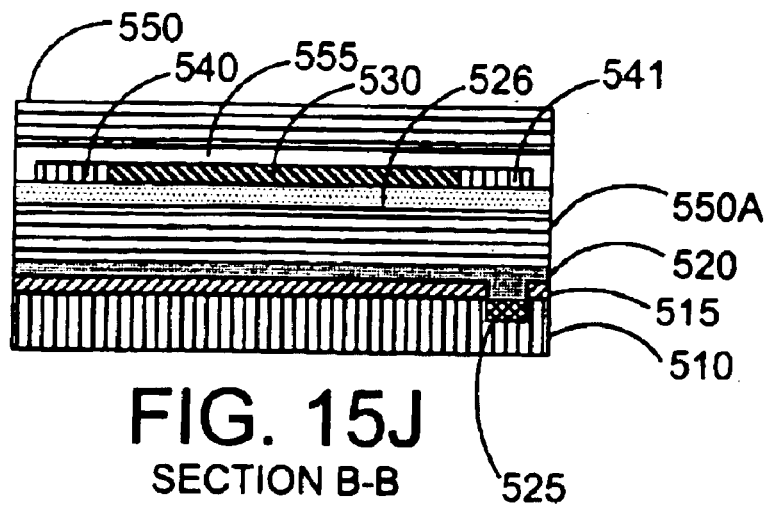

FIGS. 14J and 15J illustrate the removal of the sacrificial layer section 546 to form the air-gap cladding layer 555 and thereby forming the waveguide 505. In this embodiment, the waveguide 505 includes the lower cladding layer 526, the waveguide core 530, the couplers 540 and 541, and the air-gap cladding layer 555 (upper and side cladding).

Figure 14K:
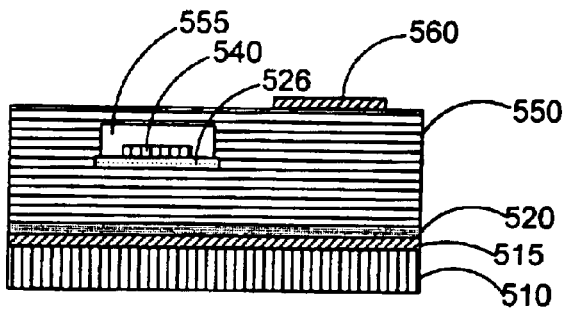
Figure 15K:
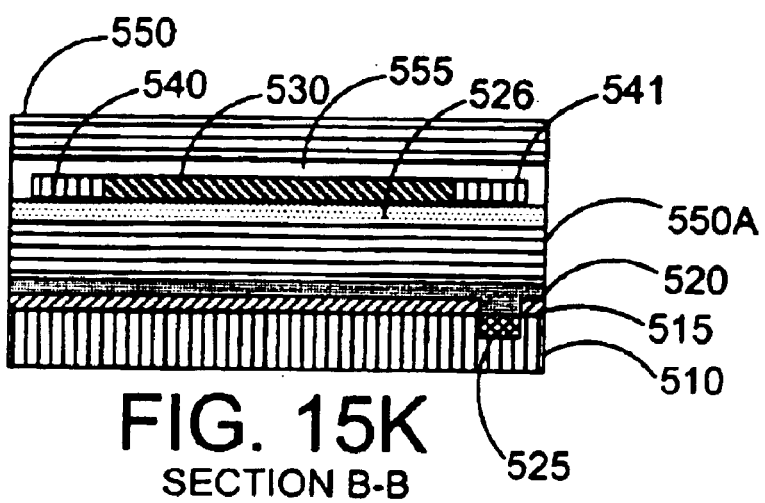

FIGS. 14K and 15K illustrate the formation of the lead 560 upon the die pad 558 (not shown) after a via (not shown) is etched in the overcoat layer 550 in the area substantially over the die pad 558. It should be noted that the formation of the die pad 558 was omitted from earlier process steps for clarity. Alternatively, the sacrificial layer section 546 could be removed at this point in the fabrication rather than in the previous step.

Figure 14L:
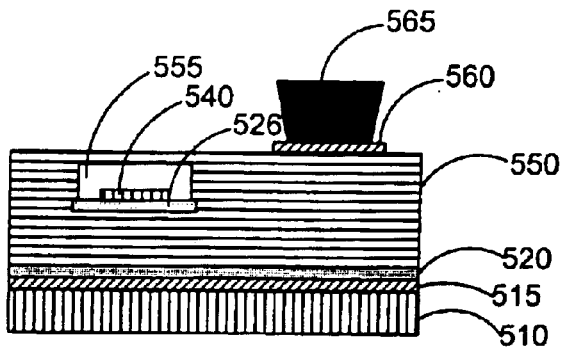
Figure 15L:
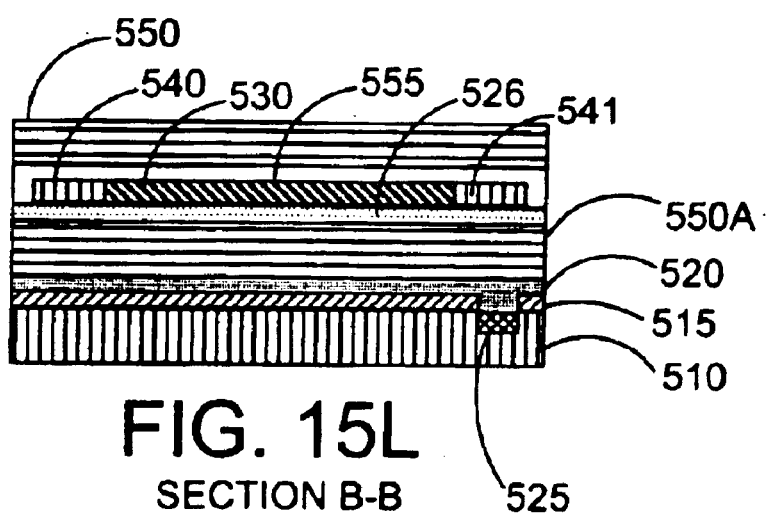

FIGS. 14L and 15L illustrate the formation of a contact 565 on the lead 560, thereby forming microelectronic package 500, as depicted in FIGS. 13A–13C. It should be noted that formation of the contact 565 is optional.

EXAMPLE 6

Figure 16A:
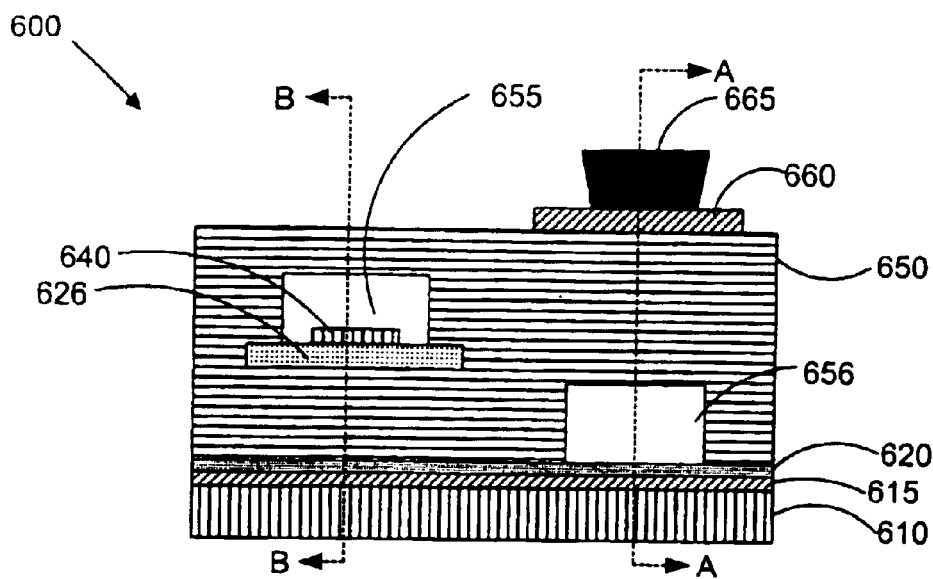
FIGS. 16A–16C are schematics that illustrate three cross-sectional views of microelectronic package 600.
Figure 16B:
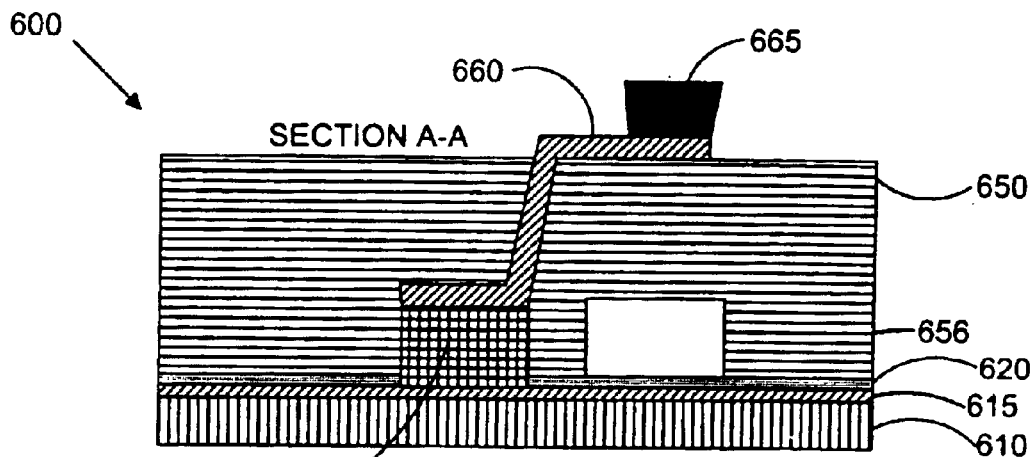
Figure 16C:
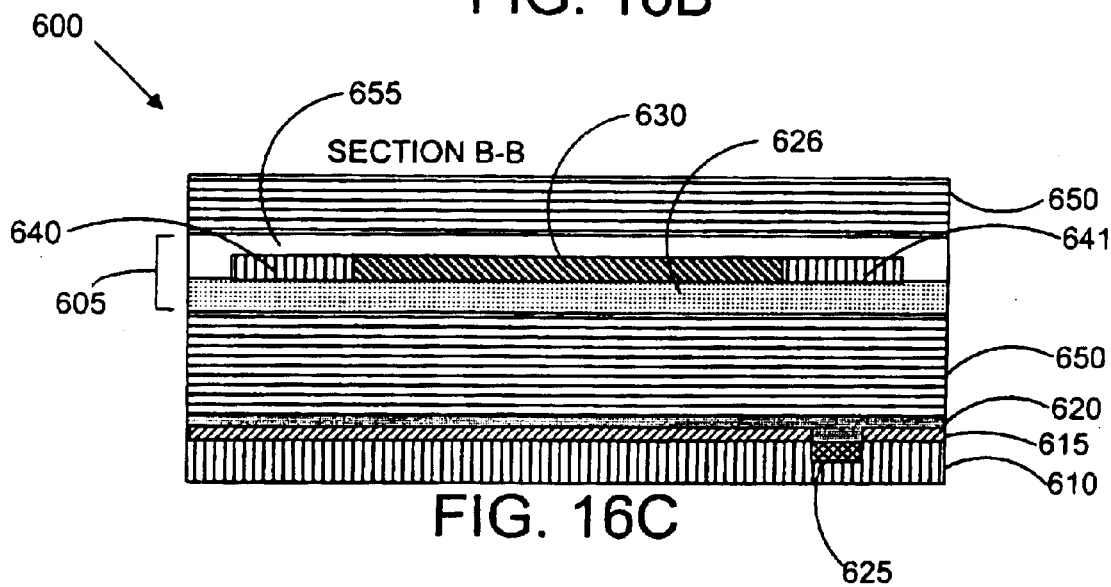

FIGS. 16A–16C are schematics that illustrate three cross-sectional views of microelectronic package 600 having a raised waveguide 605 and an air-gap layer 656. FIGS. 16B and 16C are cross-sectional views of FIG. 16A in the A—A and B—B direction, respectively, as shown by the arrows in FIG. 16A.

Microelectronic package 600 includes the waveguide 605, a substrate 610, a multi-level interconnect layer 615, a passivation layer 620, a detector 625, a lower cladding layer 626, a overcoat layer 650, the air-gap layer 656, a die pad 658, a lead 660, and a contact 665. The multi-level interconnect layer 615 is disposed on the substrate 610, while the passivation layer 620 is disposed on the multi-level interconnect layer 615. In addition, air-gap layer 656 is disposed on the passivation layer 620. The die pad 658 is disposed on the multi-level interconnect layer 615. The overcoat layer 650 is disposed on the passivation layer 620. The lower cladding 626 is disposed upon the overcoat layer 650. In this embodiment the waveguide 605 is disposed on the lower cladding 626. Another overcoat layer 650 is disposed on the waveguide 605 and the lower cladding 626. The lead 660 is disposed on the die pad 658 and a portion of the overcoat layer 650. Additional details regarding the relationship of the components of microelectronic package 600 depicted in FIGS. 16A–16C are discussed in FIGS. 17A–17N and 18A–18N, which illustrate an exemplary fabrication process of microelectronic package 600. The, waveguide 605 can communicate optical energy through the microelectronic package 600.

The waveguide 605, substrate 610, the multi-interconnect layer 615, the passivation layer 620, the lower cladding 626, the air-gap cladding layer 655, the die pad 658, the lead 660, and the contact 665, discussed in relation to FIGS. 16A–16C, are analogous or similar to the substrate 510, the multi-interconnect layer 515, the passivation layer 520, the overcoat layer 550, the air-gap cladding layer 555, the die pad 558, the lead 560, and the contact 565, discussed in relation to FIGS. 13A–13C above.

In addition, the air-gap layer 656 described in relation to FIGS. 16A–16C is analogous or similar to the air-gap layer 456 described in relation to FIGS. 10A–10C. Consequently, the second sacrificial layer described in relation to FIGS. 10A–10C corresponds to the second sacrificial layer used to form the area where the air-gap layer 656 is formed upon removal of the second sacrificial layer (FIGS. 17A–17N and 18A–18N). Therefore, additional discussion of these components will not be presented in relation to microelectronic package 600. The reader is directed to the discussion presented above for further explanation of these components.

In contrast to FIGS. 10A–10C, the air-gap cladding layer 655 and the air-gap layer 656 are formed in different fabrication steps. The fabrication process is described below in relation to FIGS. 17A–17N and 18A and 18N.

For the purposes of illustration only, microelectronic package 600 of the present invention is described with particular reference to the below-described fabrication method. For clarity, some portions of the fabrication process are not included in FIGS. 14A–14L and 15A–15L. For example, photolithography or similar techniques can be used to define the overcoat layer 650, the sacrificial layer, the waveguide 605, and/or the lead 660 pattern. In this regard, the pattern can be defined by depositing material onto the surface of the substrate 610, the multi-level interconnect 615, and/or the passivation layer 620 using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication processes are not intended to be an exhaustive list that includes every step required for fabricating microelectronic package 600. In addition, the fabrication process is flexible because the process steps may be performed in a different order than the order illustrated in FIGS. 14A–14L and 15A–15L.

Figure 17A:
Figure 17E:
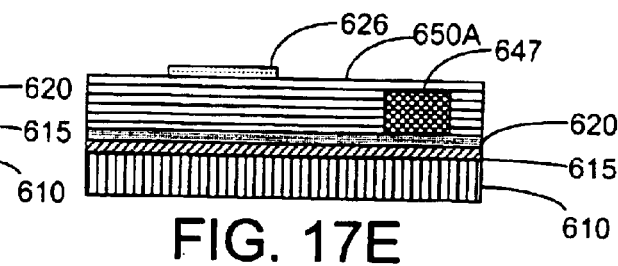
Figure 17B:
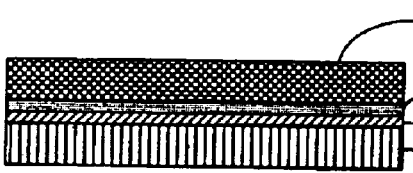
Figure 17F:
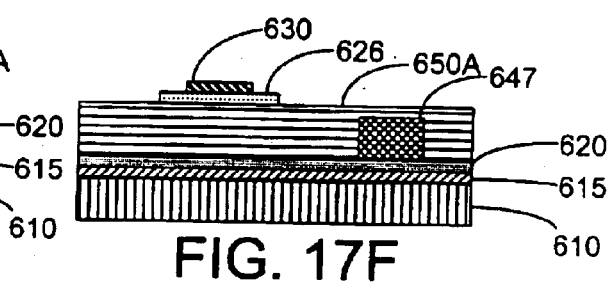
Figure 17C:
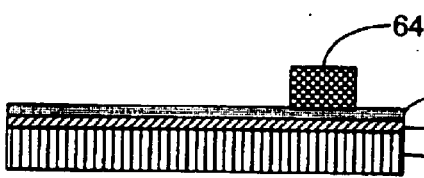
Figure 17G:
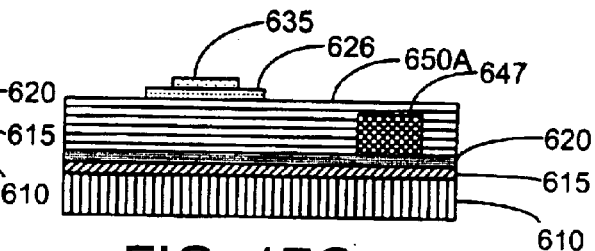
Figure 17D:
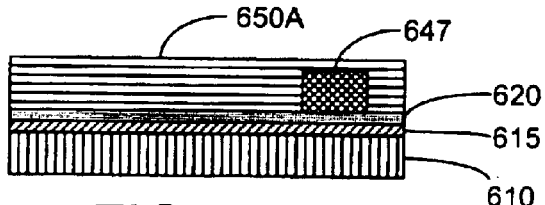
Figure 17H:
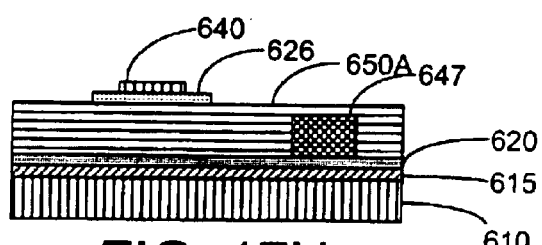
Figure 17I:
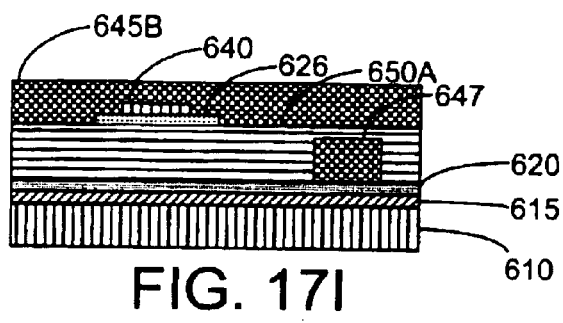
Figure 17L:
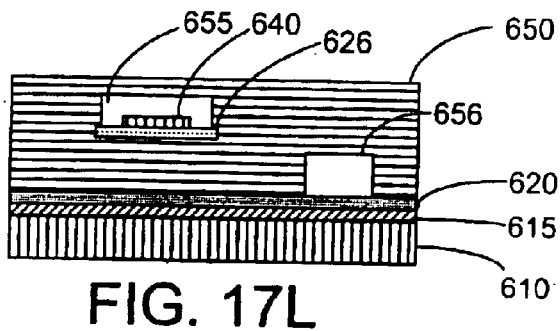
Figure 17J:
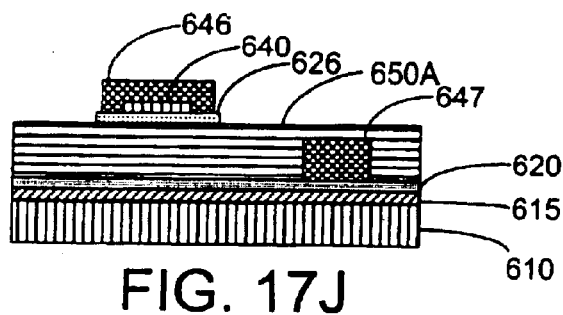
Figure 17M:
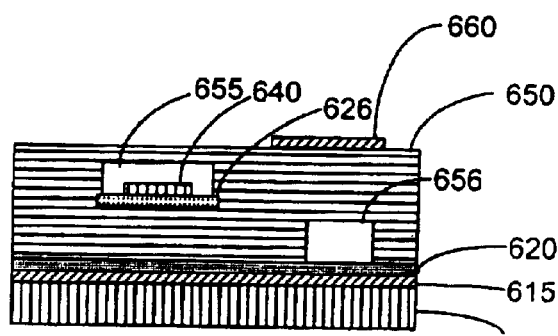
Figure 17K:
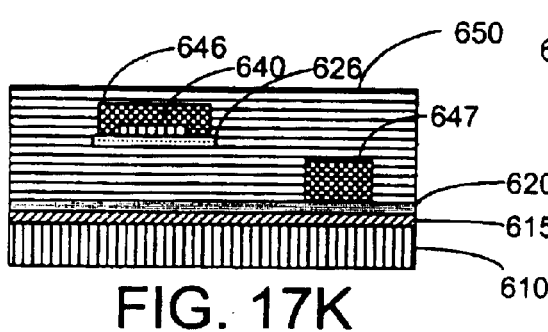
Figure 17N:
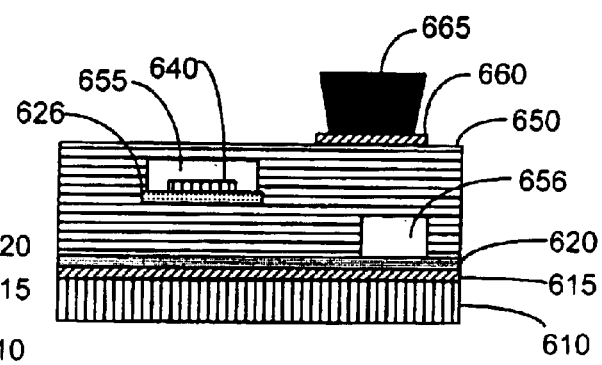
Figure 18I:
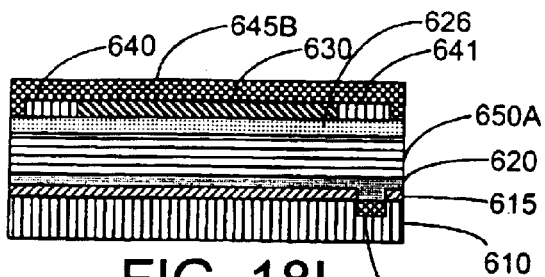
FIGS. 18A–18N are cross-sectional views of the fabrication process relative to the view in FIG. 16C, section B—B of FIG. 16A.
Figure 18L:
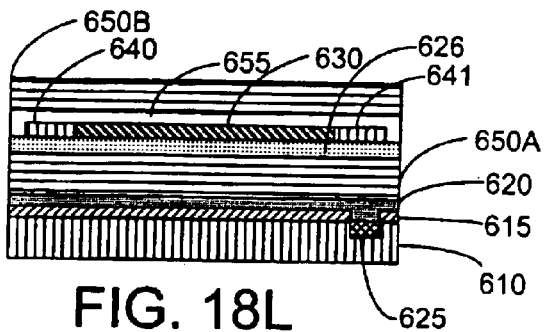
Figure 18J:
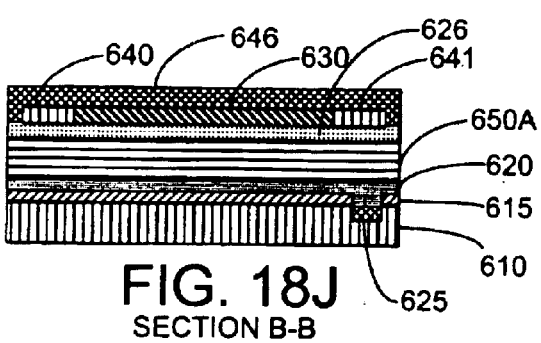
Figure 18M:
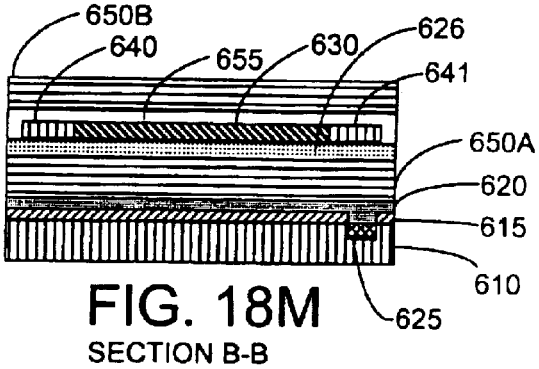
Figure 18K:
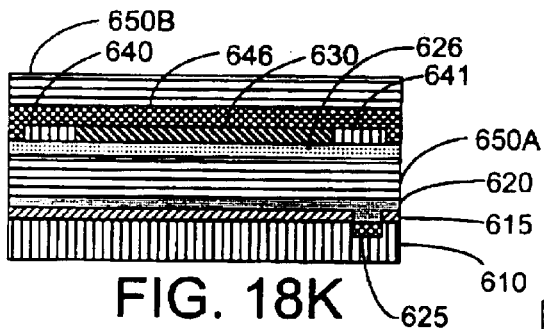
Figure 18N:
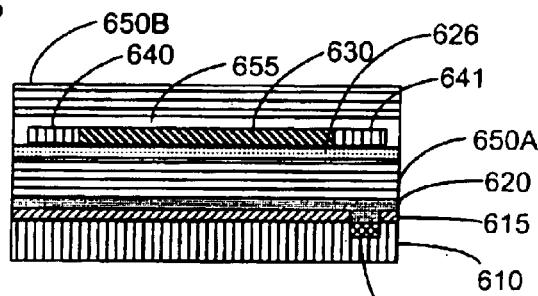

FIGS. 17A–17N are cross-sectional views of the fabrication process relative to the view illustrated in FIG. 16A, while FIGS. 18A–18N are cross-sectional views of the fabrication process relative to the view in FIG. 16C, section B—B of FIG. 16A. Therefore, FIGS. 17A–17N and 18A–18N illustrate corresponding views in the fabrication process from different cross-sectional views. The varying views of the fabrication process shown in FIGS. 17A–17N and 18A–18N have been provided to illustrate aspects of the fabrication process that are not necessarily observable using only FIGS. 17A–17N or FIGS. 18A–18N. In this regard, FIGS. 17A and 18A, 17B and 18B, 17C and 18C, and so on, are discussed in tandem to illustrate various aspects of the representative fabrication process.

FIGS. 17A and 18A illustrate the multi-level interconnect layer 615 disposed on the substrate 610, while the passivation layer 620 is disposed on the multi-level interconnect layer 615. In addition, the detector 625 is embedded in the substrate layer 610. FIGS. 17B and 18B illustrate the sacrificial layer 645A deposited over the passivation layer 620.

FIGS. 17C and 18C illustrate the formation of the second sacrificial layer section 647 by etching the sacrificial layer 645A, for example. The second sacrificial layer section 646 defines the area where the air-gap layer 655 will subsequently be located once the sacrificial layer section 647 is removed.

FIGS. 17D and 18D illustrate the formation of the overcoat layer 650A on the passivation layer 620 and second sacrificial layer section 647. FIGS. 17E and 18E illustrate the lower cladding 626 disposed on a portion of the overcoat 650A. FIGS. 17F and 18F illustrate the waveguide core 630 disposed on a portion of the lower cladding 626.

FIGS. 17G and 18G illustrate a portion of the waveguide core 630 that has been removed and replaced with grating material 635. In an alternate embodiment, the waveguide core layer and grating material are the same layer, in which case no material is removed, and the grating couplers are defined only within the labeled areas.

FIGS. 17H and 18H illustrate the defining and forming of the grating material 635 into grating couplers 640 and 641. FIGS. 17I and 18I illustrate the sacrificial layer 645B deposited over the overcoat layer 650A, the lower cladding 626, the waveguide core 630, and the grating couplers 640 and 641.

FIGS. 17J and 18J illustrate the formation of a first sacrificial layer section 646 by etching the sacrificial layer 645B, for example. The first sacrificial layer section 646 defines the area where the air-gap cladding layer 655 will subsequently be located once the sacrificial layer section 646 is removed.

FIGS. 17K and 18K illustrate the formation of the overcoat layer 650B on the overcoat layer 650A, the first sacrificial layer section 647, and the second sacrificial layer section 647. Overcoat layers 650A and 650B form entire overcoat layer 650.

FIGS. 17L and 18L illustrate the removal of the first sacrificial layer section 646 to form the air-gap cladding layer 655 and thereby forming the waveguide 605. In this embodiment, the waveguide 605 includes the lower cladding layer 626, the waveguide core 630, the couplers 640 and 641, and the air-gap cladding layer 655 (upper and side cladding). In addition, the second sacrificial layer 647 is removed to form the air-gap layer 656.

FIGS. 17M and 18M illustrate the formation of the lead 660 upon the die pad 658 (not shown) after a via (not shown) is etched in the overcoat layer 650 in the area substantially over the die pad 658. It should be noted that the formation of the die pad 658 was omitted from earlier process steps for clarity. Alternatively, the first sacrificial layer section 646 and second sacrificial layer section 647 could be removed at this point in the fabrication rather than in the previous step.

FIGS. 17N and 18N illustrate the formation of a contact 665 on the lead 660, thereby forming microelectronic package 600, as depicted in FIGS. 16A–16C. It should be noted that formation of the contact 665 is optional.

EXAMPLE 7

Figure 19A:
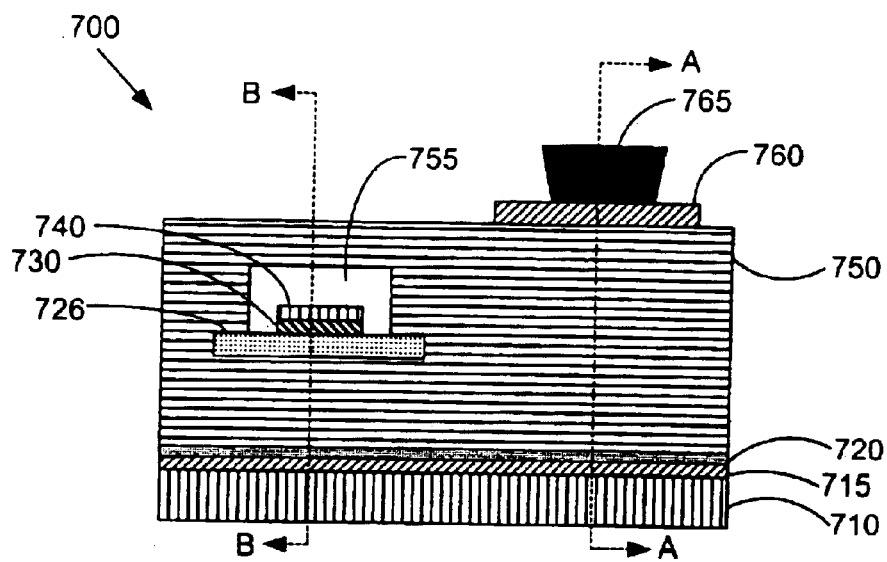
FIGS. 19A–19C are schematics that illustrate three cross-sectional views of microelectronic package 700.
Figure 19B:
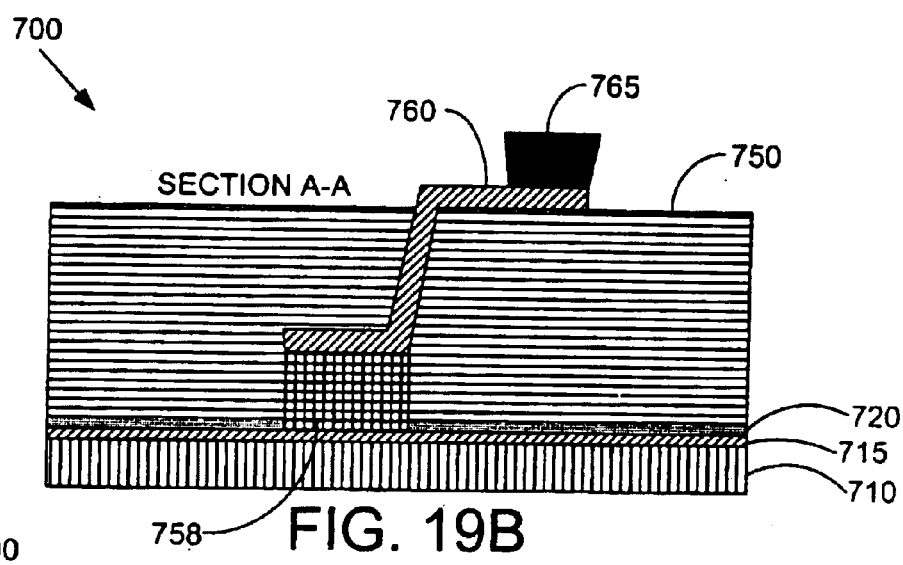
Figure 19C:
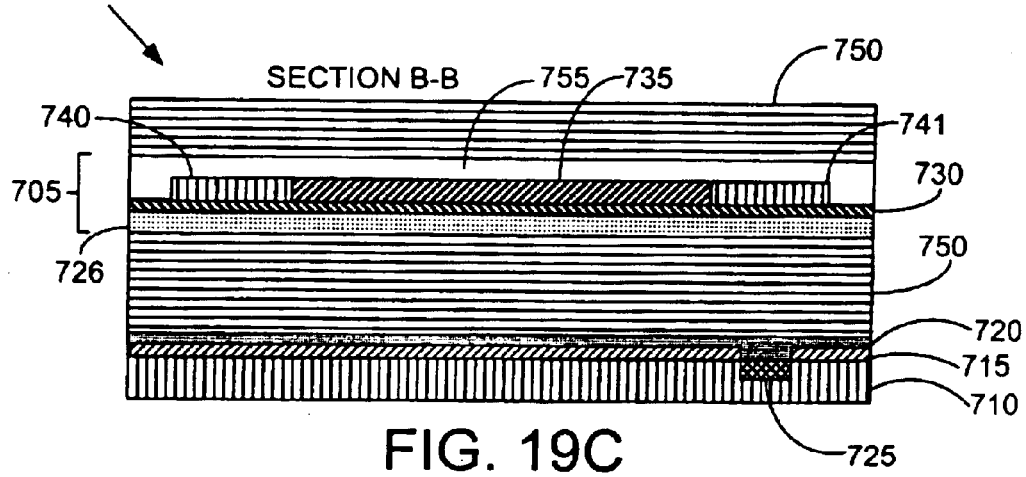

FIGS. 19A–19C are schematics that illustrate three cross-sectional views of microelectronic package 700 having a raised waveguide 705 with surface-mounted couplers 740 and 741. FIGS. 19B and 19C are cross-sectional views of FIG. 19A in the A—A and B—B direction, respectively, as shown by the arrows in FIG. 19A.

Microelectronic package 700 includes the waveguide 705, a substrate 710, a multi-level interconnect layer 715, a passivation layer 720, a detector 725, a lower cladding layer 726, a overcoat layer 750, a die pad 758, a lead 760, and a contact 765. The multi-level interconnect layer 715 is disposed on the substrate 710, while the passivation layer 720 is disposed on the multi-level interconnect layer 715. In addition, the die pad 758 is disposed on the multi-level interconnect layer 715. The overcoat layer 750 is disposed on the passivation layer 720. The lower cladding 726 is disposed upon the overcoat layer 750. In this embodiment the waveguide 705 is disposed on the lower cladding 726. Another overcoat layer 750 is disposed on the waveguide 705 and the lower cladding 726. The lead 760 is disposed on the die pad 758 and a portion of the overcoat layer 750. Additional details regarding the spatial relationship of the components of microelectronic package 700 depicted in FIGS. 19A–19C are discussed in FIGS. 20A–20N and 21A–21N, which illustrate an exemplary fabrication process of microelectronic package 700. The, waveguide 705 can communicate optical energy through the microelectronic package 700.

The waveguide 705, substrate 710, the multi-interconnect layer 715, the passivation layer 720, the air-gap cladding layer 755, the die pad 758, the lead 760, and the contact 765, discussed in relation to FIGS. 19A–19C, are analogous or similar to the waveguide 405, substrate 410, the multi-interconnect layer 415, the passivation layer 420, the overcoat layer 450, the air-gap cladding layer 455, the die pad 458, the lead 460, and the contact 465, discussed in relation to FIGS. 10A–10C above. Therefore, additional discussion of these components will not be presented in relation to microelectronic package 700. The reader is directed to the discussion presented above for further explanation of these components.

For the purposes of illustration only, microelectronic package 700 of the present invention is described with particular reference to the below-described fabrication method. For clarity, some portions of the fabrication process are not included in FIGS. 20A–20N and 21A–21N. For example, photolithography or similar techniques can be used to define the overcoat layer 750, the sacrificial layer, the waveguide 705, and/or the lead 760 pattern. In this regard, the pattern can be defined by depositing material onto the surface of the substrate 710, the multi-level interconnect 715, and/or the passivation layer 720 using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication processes are not intended to be an exhaustive list that includes every step required for fabricating microelectronic package 700. In addition, the fabrication process is flexible because the process steps may be performed in a different order than the order illustrated in FIGS. 20A–20N and 21A–21N.

Figure 20A:
Figure 20B:
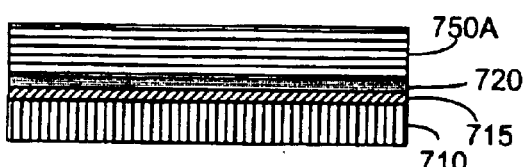
Figure 20C:
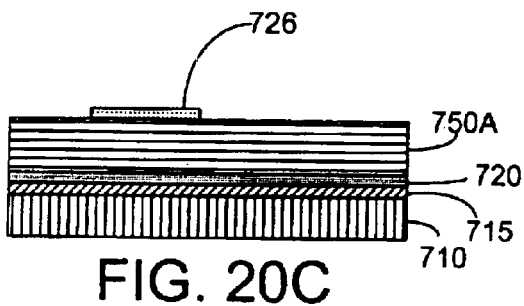
Figure 21A:
FIGS. 21A–21L are cross-sectional views of the fabrication process relative to the view in FIG. 19C, section B—B of FIG. 19A.

FIGS. 20A–20N are cross-sectional views of the fabrication process relative to the view illustrated in FIG. 19A, while FIGS. 21A–21N are cross-sectional views of the fabrication process relative to the view in FIG. 19C, section B—B of FIG. 19A. Therefore, FIGS. 20A–20N and 21A–21N illustrate corresponding views in the fabrication process from different cross-sectional views. The varying views of the fabrication process shown in FIGS. 20A–20N and 21A–21N have been provided to illustrate aspects of the fabrication process that are not necessarily observable using only FIGS. 20A–20N or FIGS. 21A–21N. In this regard, FIGS. 20A and 21A, 20B and 21B, 20C and 21C, and so on, are discussed in tandem to illustrate various aspects of the representative fabrication process.

FIGS. 20A and 21A illustrate the multi-level interconnect layer 715 disposed on the substrate 710, while the passivation layer 720 is disposed on the multi-level interconnect layer 715. In addition, the detector 725 is embedded in the substrate layer 710.

Figure 20D:
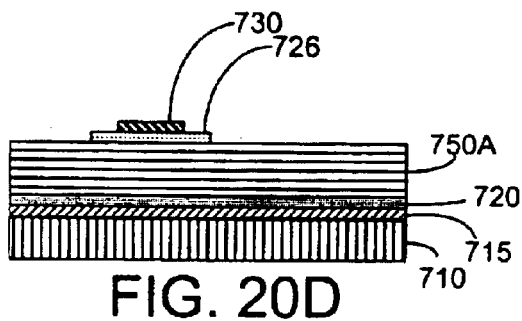
Figure 20E:
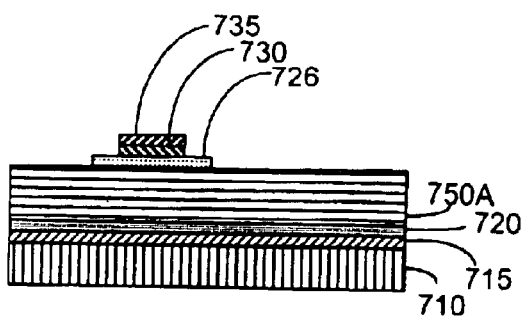
Figure 21E:
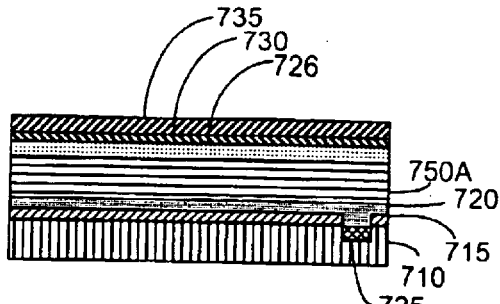
Figure 21B:
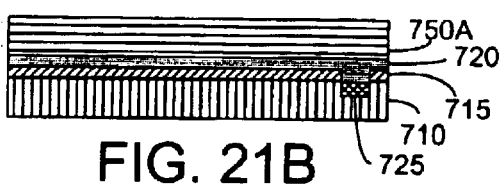

FIGS. 20B and 21B illustrate the formation of the overcoat layer 750A on the passivation layer 720. FIGS. 20C and 21C illustrate the lower cladding 726 disposed on a portion of the overcoat 750A. FIGS. 20D and 21D illustrate the waveguide core 730 disposed on a portion of the lower cladding 726. FIGS. 20E and 21E illustrate the coupler material 735 deposited on the waveguide core 730.

Figure 20F:
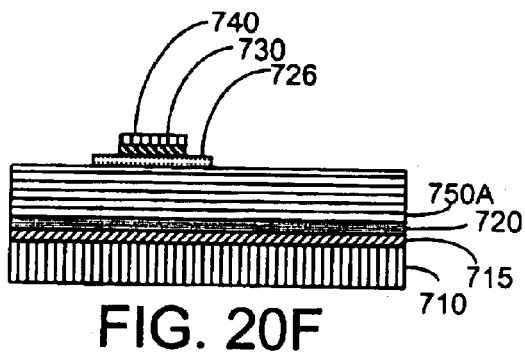
Figure 21F:
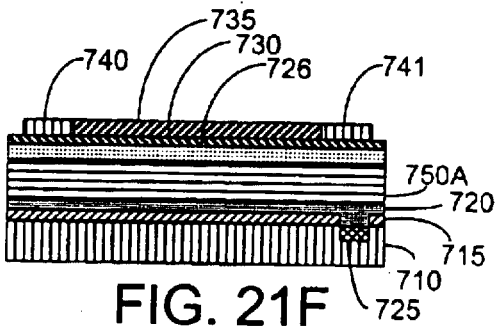
Figure 21C:
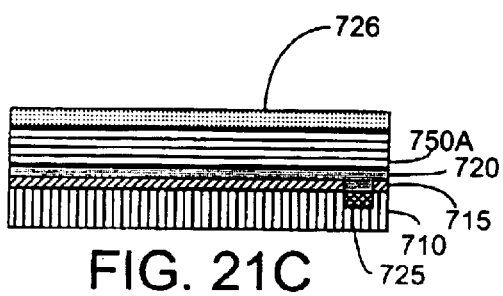

FIGS. 20F and 21F illustrate the defining and forming the grating material 735 into grating couplers 740 and 741.

Figure 20G:
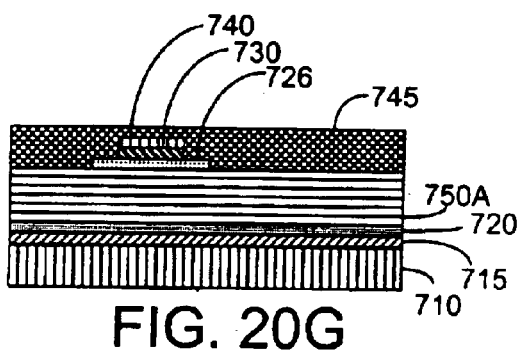
Figure 21G:
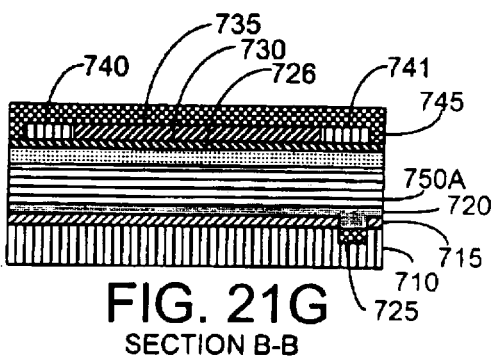
Figure 21D:
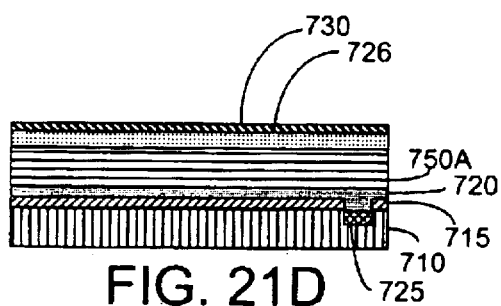

FIGS. 20G and 21G illustrate the sacrificial layer 745 deposited over the overcoat layer 750A, the lower cladding 726, the waveguide core 730, and the grating couplers 740 and 741.

Figure 20H:
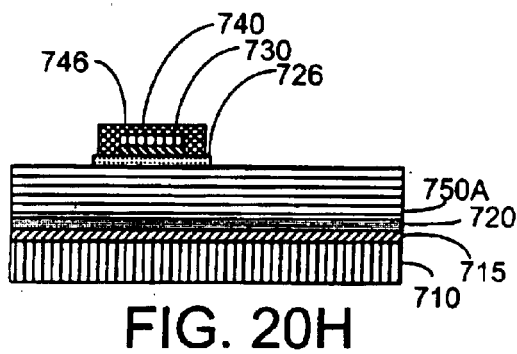
Figure 21H:
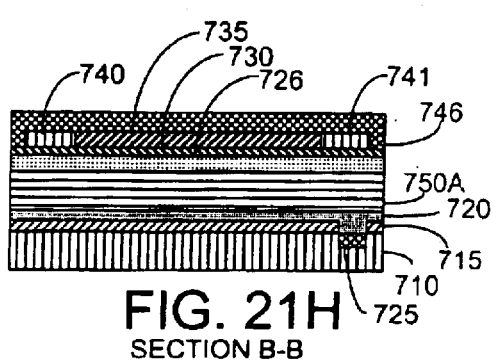

FIGS. 20H and 21H illustrate the formation of sacrificial layer section 746 by etching the sacrificial layer 745, for example. The sacrificial layer section 746 defines the area where the air-gap cladding layer 755 will subsequently be located once the sacrificial layer section 746 is removed.

Figure 20I:
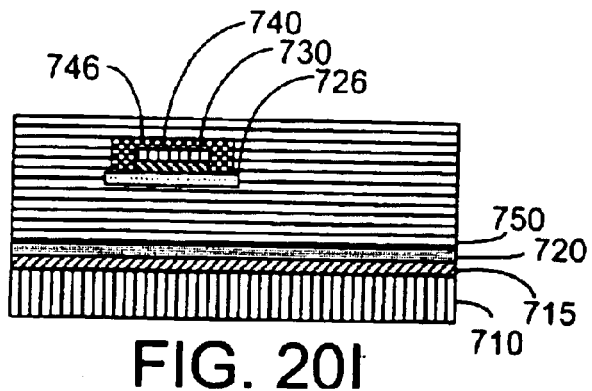
Figure 21I:
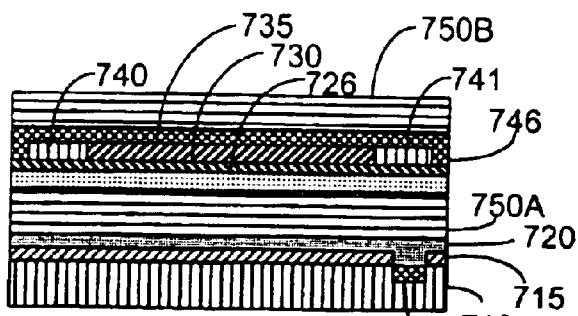

FIGS. 20I and 21I illustrate the formation of the overcoat layer 750B on the overcoat layer 750A and the sacrificial layer section 746. Overcoat layers 750A and 750B form overcoat layer 750.

Figure 20J:
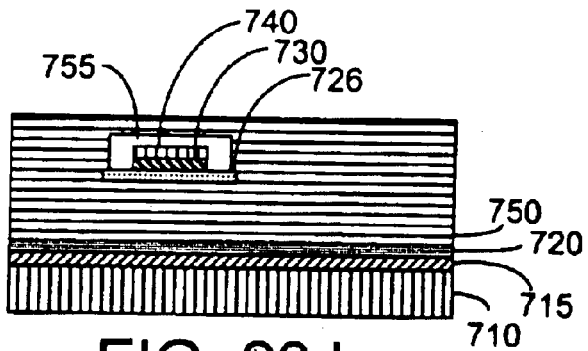
Figure 21J:
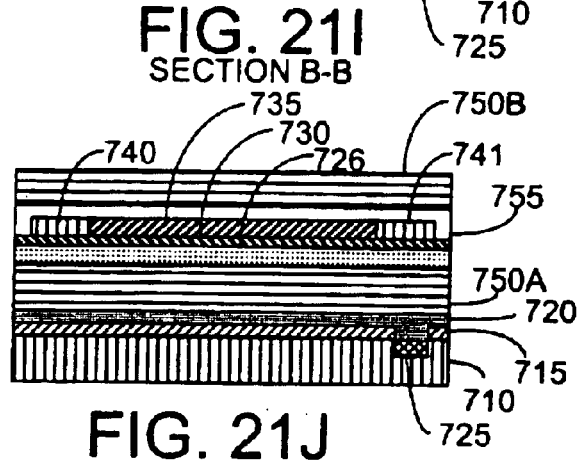

FIGS. 20J and 21J illustrate the removal of the sacrificial layer section 746 to form the air-gap cladding layer 755 and thereby forming the waveguide 705. In this embodiment, the waveguide 705 includes the lower cladding layer 526, the waveguide core 730, the couplers 740 and 741, and the air-gap cladding layer 755 (upper and side cladding).

Figure 20K:
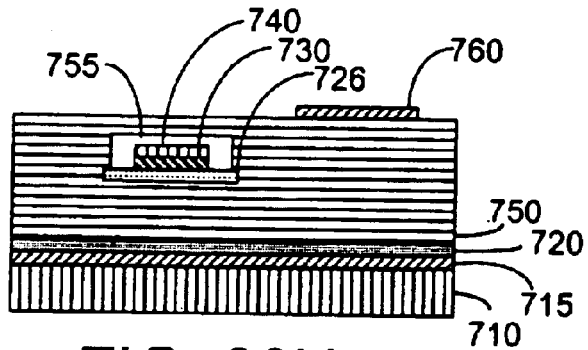
Figure 21K:
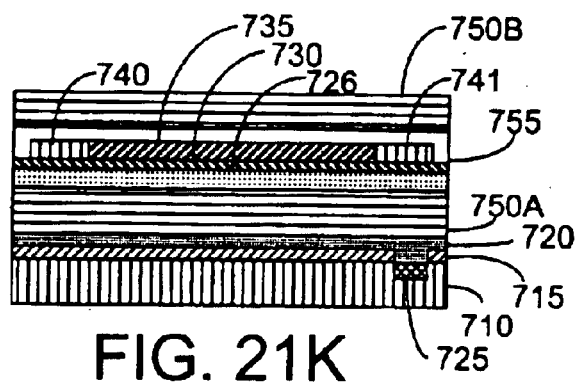

FIGS. 20K and 21K illustrate the formation of the lead 760 upon the die pad 758 (not shown) after a via (not shown) is etched in the overcoat layer 750 in the area substantially over the die pad 758. It should be noted that the formation of the die pad 758 was omitted from earlier process steps for clarity. Alternatively, the sacrificial layer section 746 could be removed at this point in the fabrication rather than in the previous step.

Figure 20L:
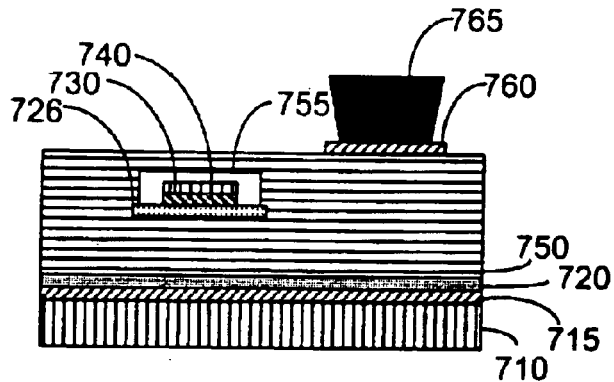
Figure 21L:
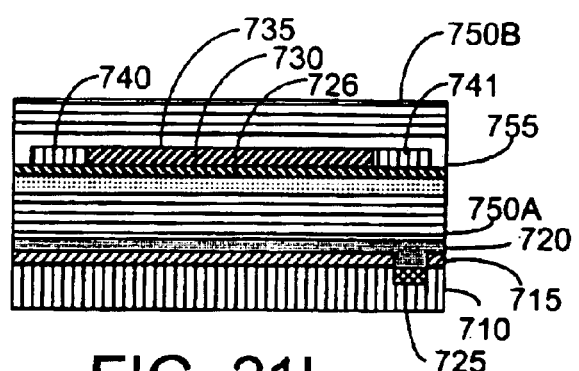

FIGS. 20L and 21L illustrate the formation of a contact 765 on the lead 760, thereby forming microelectronic package 700, as depicted in FIGS. 19A–19C. It should be noted that formation of the contact 765 is optional.

EXAMPLE 8

Figure 22A:
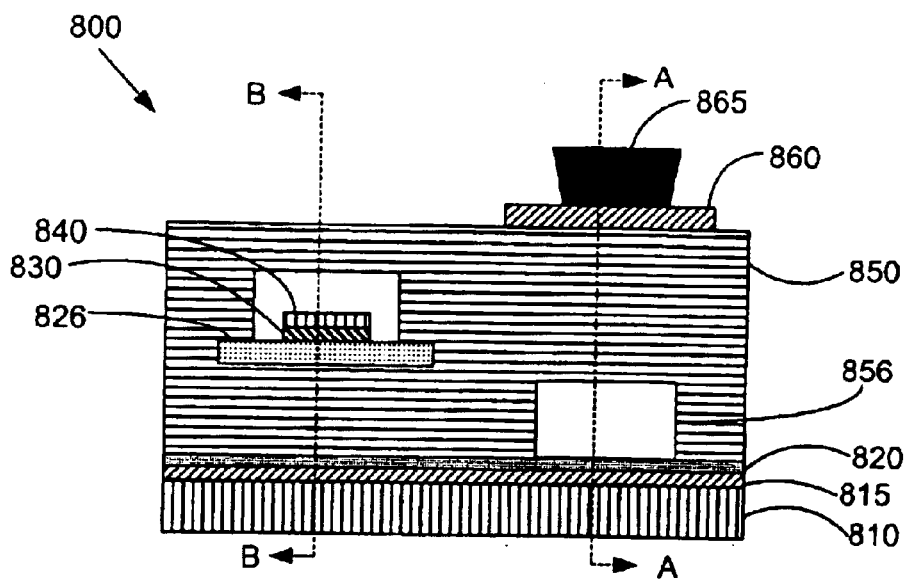
FIGS. 22A–22C are schematics that illustrate three cross-sectional views of microelectronic package 800.
Figure 22B:
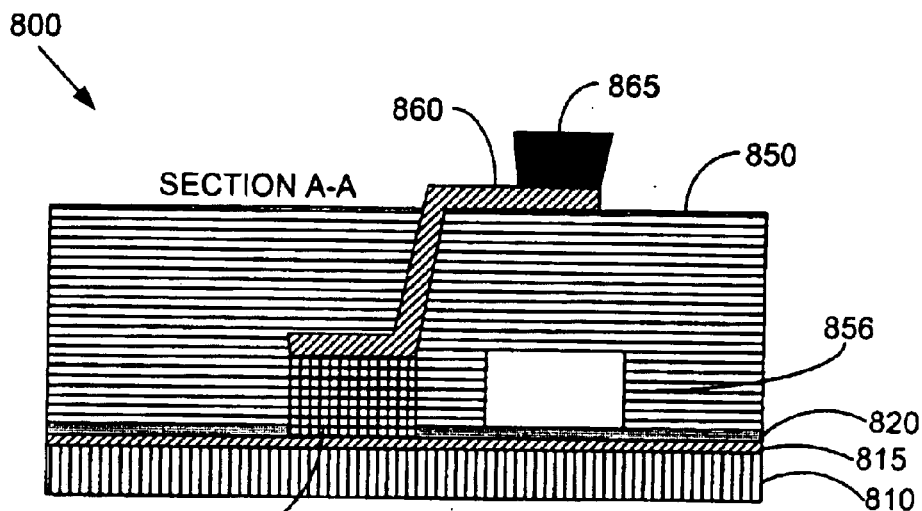
Figure 22C:
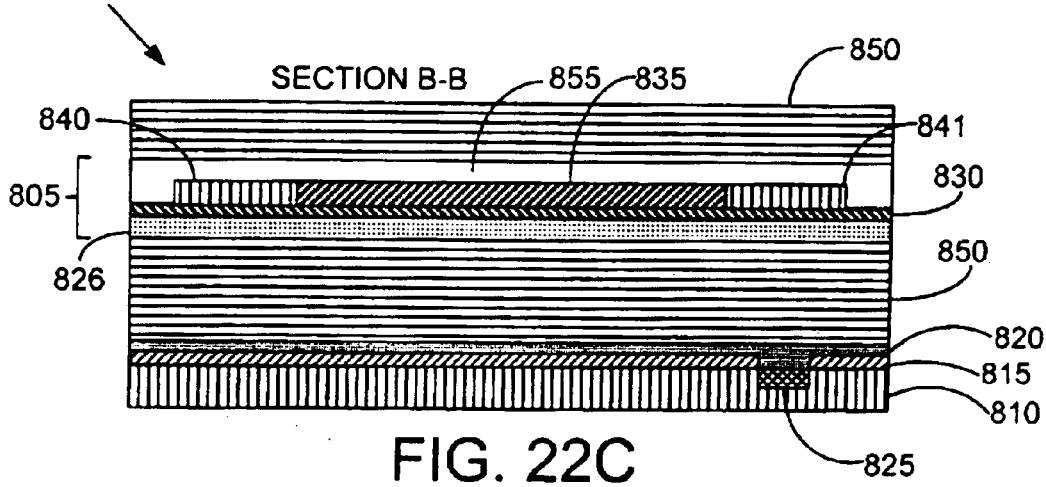

FIGS. 22A–22C are schematics that illustrate three cross-sectional views of microelectronic package 800 having a raised waveguide 805 with surface-mounted couplers 840 and 841 and an air-gap layer 856. FIGS. 22B and 22C are cross-sectional views of FIG. 22A in the A—A and B—B direction, respectively, as shown by the arrows in FIG. 22A.

Microelectronic package 800 includes the waveguide 805, a substrate 810, a multi-level interconnect layer 815, a passivation layer 820, a detector 825, a lower cladding layer 826, a overcoat layer 850, the air-gap layer 856, a die pad 858, a lead 860, and a contact 865. The multi-level interconnect layer 815 is disposed on the substrate 810, while the passivation layer 820 is disposed on the multi-level interconnect layer 815. In addition, the air-gap layer 856 is disposed on the passivation layer 820. The die pad 858 is disposed on the multi-level interconnect layer 815. The overcoat layer 850 is disposed on the passivation layer 820. The lower cladding 826 is disposed upon the overcoat layer 850. In this embodiment the waveguide 805 is disposed on the lower cladding 826. Another overcoat layer 850 is disposed on the waveguide 805 and the lower cladding 826. The lead 860 is disposed on the die pad 858 and a portion of the overcoat layer 850. In addition, the lead 860 is disposed over a portion of the air-gap layer 856. Additional details regarding the spatial relationship of the components of microelectronic package 800 depicted in FIGS. 22A–22C are discussed in FIGS. 23A–23N and 24A–24N, which illustrate an exemplary fabrication process of microelectronic package 800. The waveguide 805 can communicate optical energy through the microelectronic package 800.

The waveguide 805, substrate 810, the multi-interconnect layer 815, the passivation layer 820, the air-gap cladding layer 855, the air-gap layer 856, the die pad 858, the lead 860, and the contact 865, discussed in relation to FIGS. 22A–22C, are analogous or similar to the waveguide 405, substrate 410, the multi-interconnect layer 415, the passivation layer 420, the overcoat layer 450, the air-gap cladding layer 455, the air-cladding layer 456, the die pad 458, the lead 460, and the contact 465, discussed in relation to FIGS. 10A–10C above. In addition, the lower cladding 726 discussed in reference to FIGS. 19A–19C is the same or similar to the lower cladding 826 discussed in reference to FIGS. 22A–22C. Therefore, additional discussion of these components will not be presented in relation to microelectronic package 800. The reader is directed to the discussion presented above for further explanation of these components.

For the purposes of illustration only, microelectronic package 800 of the present invention is described with particular reference to the below-described fabrication method. For clarity, some portions of the fabrication process are not included in FIGS. 23A–23N and 24A–24N. For example, photolithography or similar techniques can be used to define the overcoat layer 850, the sacrificial layer, the waveguide 805, and/or the lead 860 pattern. In this regard, the pattern can be defined by depositing material onto the surface of the substrate 810, the multi-level interconnect 815, and/or the passivation layer 820 using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication processes are not intended to be an exhaustive list that includes every step required for fabricating microelectronic package 800. In addition, the fabrication process is flexible because the process steps may be performed in a different order than the order illustrated in FIGS. 23A–23N and 24A–24N.

Figure 23A:
Figure 23B:
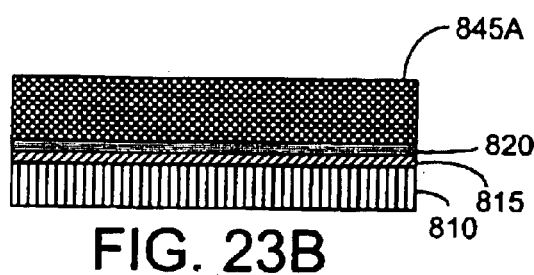
Figure 23C:
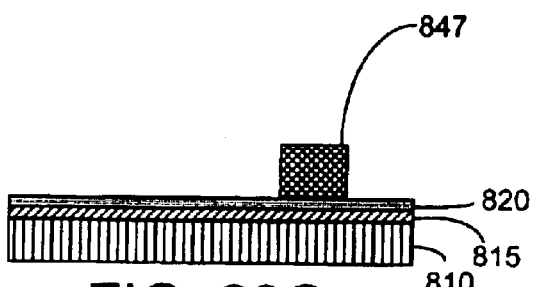
Figure 23D:
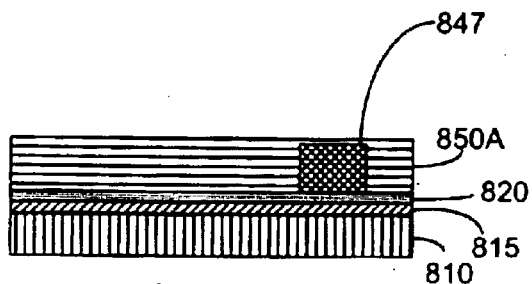
Figure 23E:
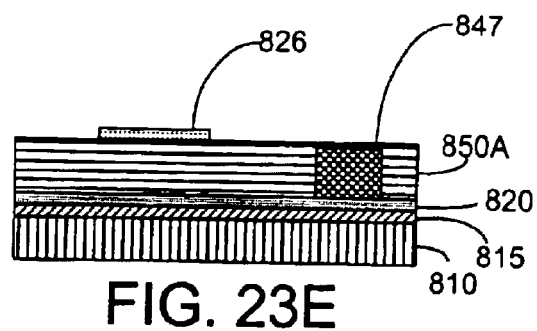
Figure 23F:
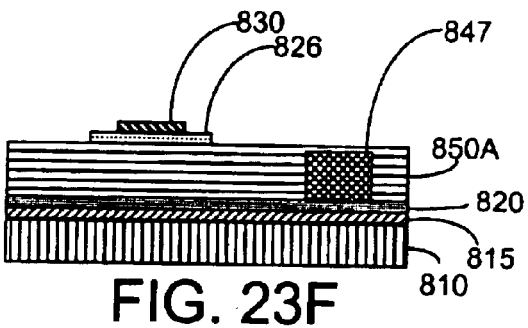
Figure 23G:
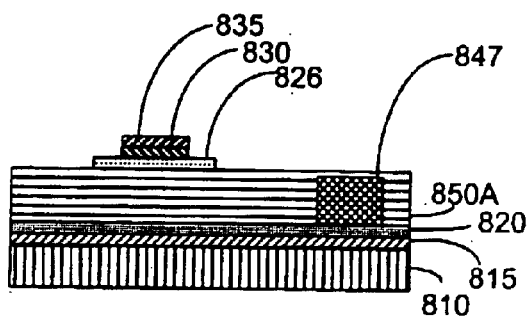
Figure 23H:
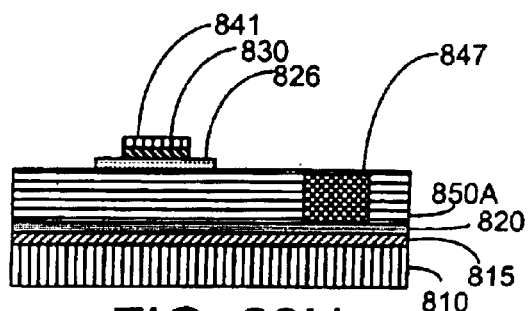
Figure 23I:
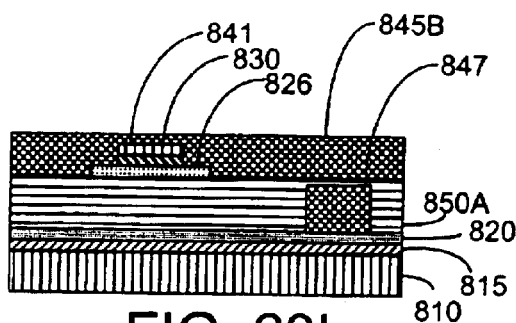
Figure 23L:
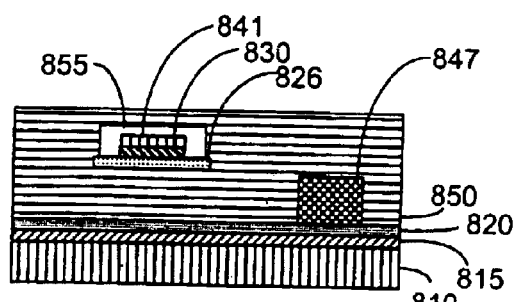
Figure 23J:
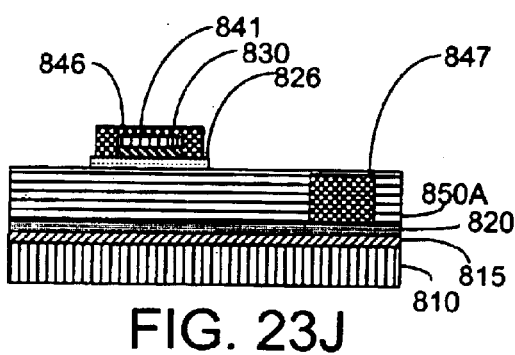
Figure 23M:
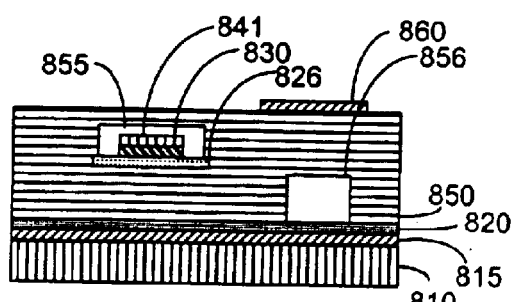
Figure 23K:
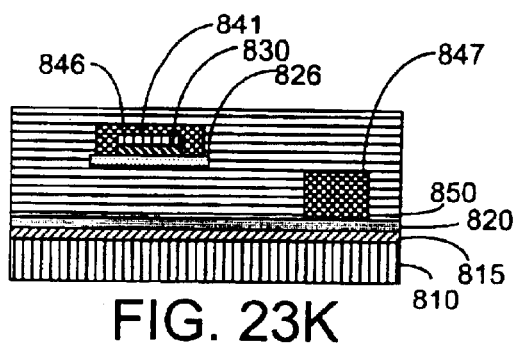
Figure 23N:
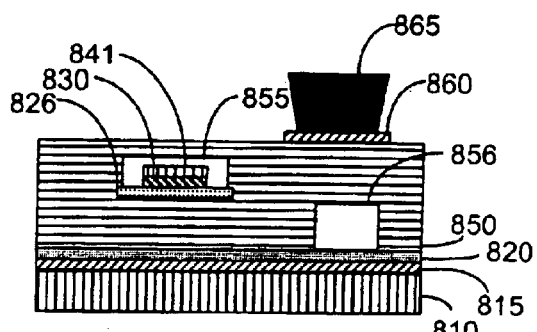
Figure 24A:
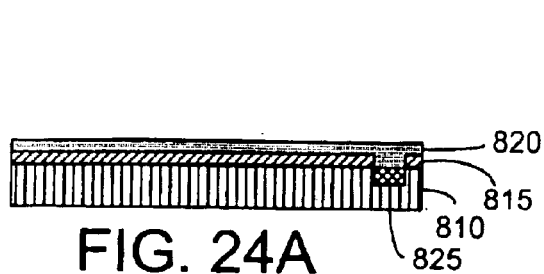
FIGS. 24A–24N are cross-sectional views of the fabrication process relative to the view in FIG. 22C, section B—B of FIG. 22A.
Figure 24E:
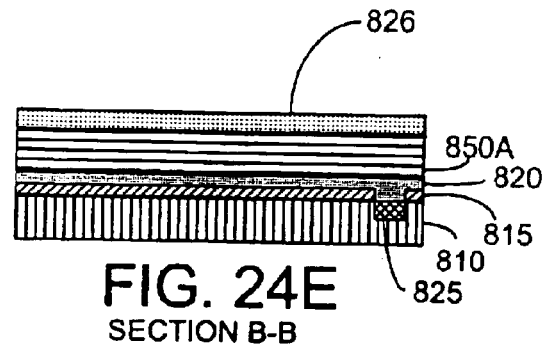
Figure 24B:
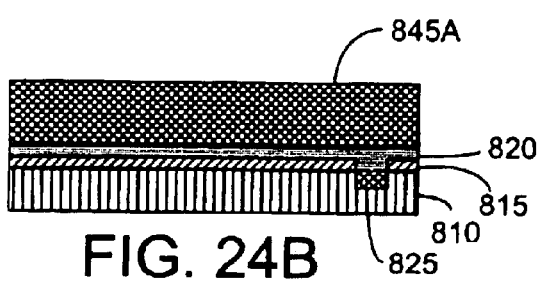
Figure 24F:
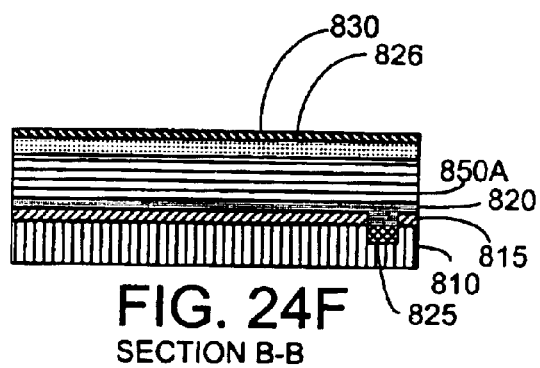
Figure 24C:
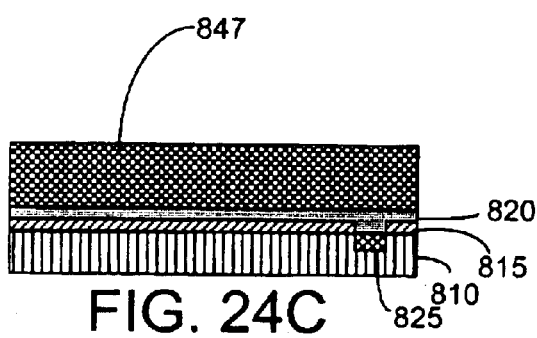
Figure 24G:
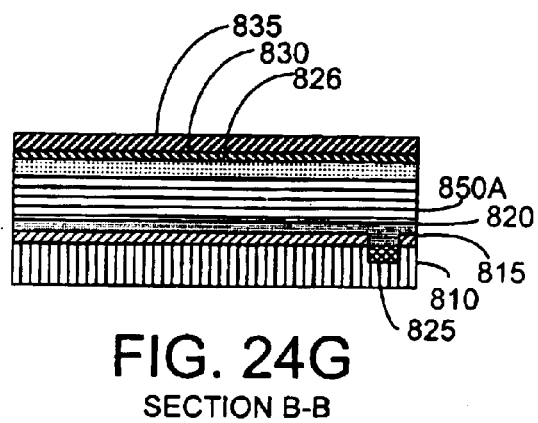
Figure 24D:
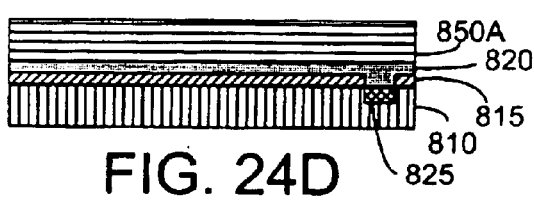
Figure 24H:
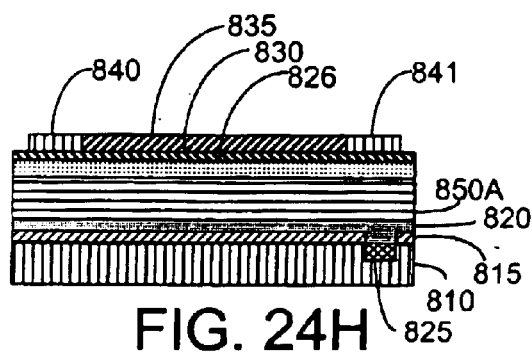
Figure 24I:
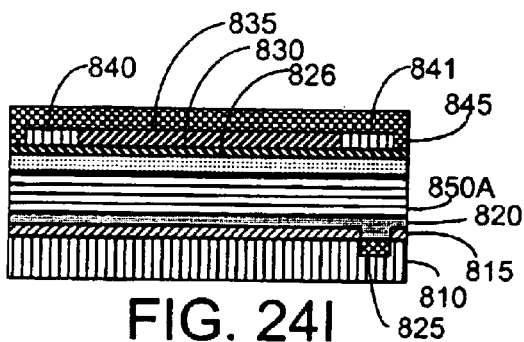
Figure 24L:
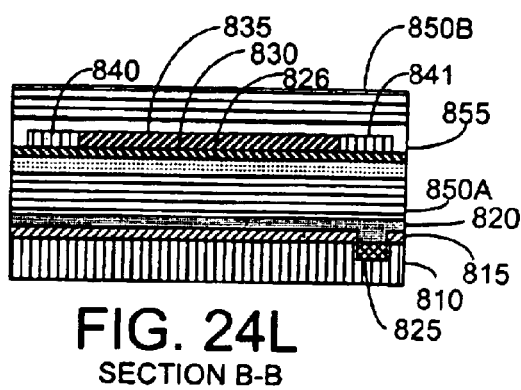
Figure 24J:
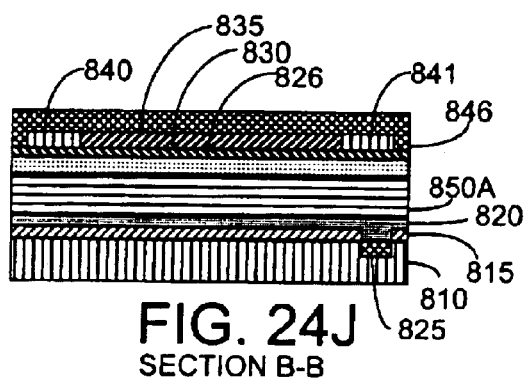
Figure 24M:
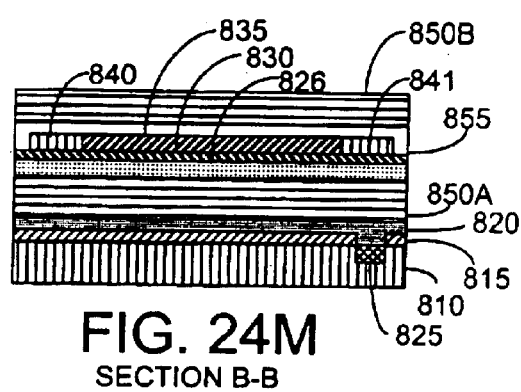
Figure 24K:
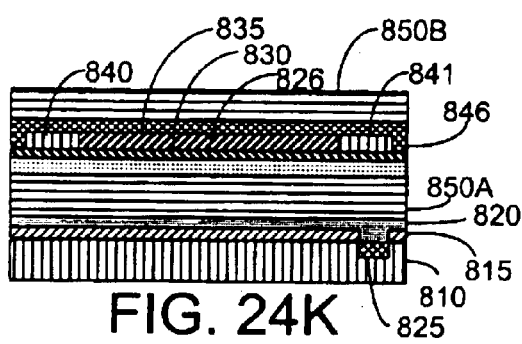
Figure 24N:
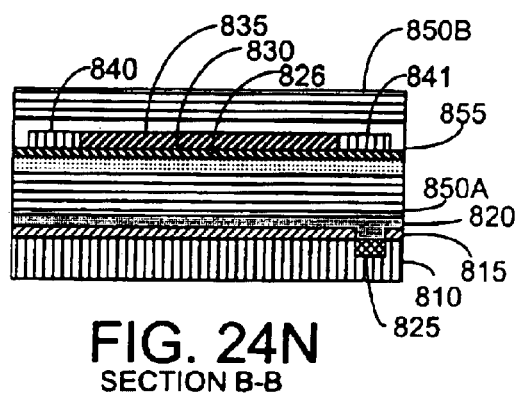

FIGS. 23A–23N are cross-sectional views of the fabrication process relative to the view illustrated in FIG. 22A, while FIGS. 24A–24N are cross-sectional views of the fabrication process relative to the view in FIG. 22C, section B—B of FIG. 22A. Therefore, FIGS. 23A–23N and 24A–24N illustrate corresponding views in the fabrication process from different cross-sectional views. The varying views of the fabrication process shown in FIGS. 23A–23N and 24A–24N have been provided to illustrate aspects of the fabrication process that are not necessarily observable using only FIGS. 23A–23N or FIGS. 24A–24N. In this regard, FIGS. 23A and 24A, 23B and 24B, 23C and 24C, and so on, are discussed in tandem to illustrate various aspects of the representative fabrication process.

FIGS. 23A and 24A illustrate the multi-level interconnect layer 815 disposed on the substrate 810, while the passivation layer 820 is disposed on the multi-level interconnect layer 815. In addition, the detector 825 is embedded in the multi-level interconnect layer 815. FIGS. 23B and 24B illustrate the sacrificial layer 845A deposited over the passivation layer 820.

FIGS. 23C and 24C illustrate the formation of the second sacrificial layer section 847 by etching the sacrificial layer 845A, for example. The second sacrificial layer section 846 defines the area where the air-gap layer 855 will subsequently be located once the sacrificial layer section 846 is removed.

FIGS. 23D and 24D illustrate the formation of the overcoat layer 850A on the passivation layer 820. FIGS. 23E and 24E illustrate the lower cladding 826 disposed on a portion of the overcoat 850A. FIGS. 23F and 24F illustrate the waveguide core 830 disposed on a portion of the lower cladding 826.

FIGS. 23G and 24G illustrate the coupler material 835 deposited on the waveguide core 830. FIGS. 23H and 24H illustrate the defining and forming the grating material 835 into grating couplers 840 and 841.

FIGS. 23I and 24I illustrate the second sacrificial layer 845B deposited over the overcoat layer 850A, the lower cladding 826, the waveguide core 830, and the grating couplers 840 and 841.

FIGS. 23J and 24J illustrate the formation of first sacrificial layer section 846 by etching the second sacrificial layer 845B, for example. The sacrificial layer section 846 defines the area where the air-gap cladding layer 855 will subsequently be located once the sacrificial layer section 846 is removed.

FIGS. 23K and 24K illustrate the formation of the overcoat layer 850B on the overcoat layer 850A and the first sacrificial layer section 846. Overcoat layers 850A and 850B form overcoat layer 850.

FIGS. 23L and 24L illustrate the removal of the first sacrificial layer section 846 to form the air-gap cladding layer 855 and thereby forming the waveguide 805. In this embodiment, the waveguide 805 includes the lower cladding layer 826, the waveguide core 830, the couplers 840 and 841, and the air-gap cladding layer 855 (upper and side cladding). In addition, the second sacrificial layer section 847 is removed to form the air-gap layer 856.

FIGS. 23M and 24M illustrate the formation of the lead 860 upon the die pad 858 (not shown) after a via (not shown) is etched in the overcoat layer 850 in the area substantially over the die pad 858. It should be noted that the formation of the die pad 858 was omitted from earlier process steps for clarity. Alternatively, the first sacrificial layer section 846 and the second sacrificial layer 847 could be removed at this point in the fabrication rather than in the previous step.

FIGS. 23N and 24N illustrate the formation of a contact 865 on the lead 860, thereby forming microelectronic package 800, as depicted in FIGS. 22A–22C. It should be noted that formation of the contact 865 is optional.

It should be emphasized that the above-described embodiments of the present invention are merely possible examples of implementations, merely set forth for a clear understanding of the principles of the invention. Many variations and modifications may be made to the above-described embodiments. For example, a plurality of air-gap layers can be included in the microelectronic package. In addition, the air-gap layer can occupy space only bound by the overcoat layer (i.e. suspended above the passivation layer). Further, an additional air-gap can be located between the lead and the compliant layer. Furthermore, the detector can be embedded (i.e., suspended above the substrate) within the electronic package and connected to the multi-level interconnect layer. All such modifications and variations are intended to be included herein within the scope of this disclosure and protected by the following claims.

Therefore, having thus described the invention, at least the following is claimed:

1. A chip-level electronic package, comprising:
   at least one monolithic waveguide having a waveguide core in a fixed position on a lower cladding, a sacrificial layer around a portion of the waveguide core, and an overcoat layer engaging a portion of the sacrificial layer and engaging the lower cladding.

2. The chip-level electronic package of claim 1, wherein the sacrificial layer is bound on all sides by the overcoat layer, the lower cladding, and the waveguide core.

3. The chip-level electronic package of claim 1, wherein the overcoat layer is selected from silicon dioxide, silicon nitride, polyimides, polynorbornenes, epoxides, polyarylenes ethers, parylenes, and combinations thereof.

4. The chip-level electronic package of claim 1, wherein the sacrificial layer is selected from polyimides, polynorbornenes, epoxides, polyarylenes ethers, parylenes, and combinations thereof.

5. The chip-level electronic package of claim 1, wherein the sacrificial layer is a polynorbornenes.

6. The chip-level electronic package of claim 1, wherein the sacrificial layer is selected from polypropylene carbonate, polyethylene carbonate, polynorborene carbonate, and combinations thereof.

7. The chip-level electronic package of claim 1, further comprising:
   a coupling element adjacent to the waveguide core and engaging the sacrificial layer.

8. The chip-level electronic package of claim 1, wherein the waveguide core includes at least one coupling element.

9. The chip-level electronic package of claim 8, wherein the at least one coupling element is a volume grating coupling element.

10. The chip-level electronic package of claim 1, wherein the sacrificial layer is disposed around a portion of one of the at least one coupling element.

* * * * *

UNITED STATES PATENT AND TRADEMARK OFFICE
CERTIFICATE OF CORRECTION

PATENT NO. : 6,954,576 B2
DATED : October 11, 2005
INVENTOR(S) : Mule et al.

It is certified that error appears in the above-identified patent and that said Letters Patent is hereby corrected as shown below:

Column 11,
Line 28, delete "micrometers.," and replace with -- micrometers, --.
Line 30, delete "micrometerss" and replace with -- micrometers --.

Column 18,
Line 32, delete "regard." and replace with -- regard, --.

Column 22,
Line 1, delete "The," and replace with -- The --.

Signed and Sealed this

Twentieth Day of December, 2005

JON W. DUDAS
*Director of the United States Patent and Trademark Office*